(12) United States Patent
Van Ee

(10) Patent No.: US 11,920,340 B2
(45) Date of Patent: Mar. 5, 2024

(54) GIGACUBES BLOCK SYSTEM

(71) Applicant: Jonathan Hendrik Van Ee, Dublin, CA (US)

(72) Inventor: Jonathan Hendrik Van Ee, Dublin, CA (US)

(*) Notice: Subject to any disclaimer, the term of this patent is extended or adjusted under 35 U.S.C. 154(b) by 163 days.

(21) Appl. No.: 17/305,444

(22) Filed: Jul. 7, 2021

(65) Prior Publication Data

US 2022/0042298 A1 Feb. 10, 2022

Related U.S. Application Data

(60) Provisional application No. 62/706,235, filed on Aug. 6, 2020.

(51) Int. Cl.
*E04B 1/343* (2006.01)
*A63H 33/10* (2006.01)

(52) U.S. Cl.
CPC ......... *E04B 1/34331* (2013.01); *A63H 33/10* (2013.01)

(58) Field of Classification Search
CPC . E04B 1/34315; E04B 1/34331; A63H 33/04; A63H 33/10; A63H 33/101; A63H 33/107
See application file for complete search history.

(56) References Cited

U.S. PATENT DOCUMENTS

| | | | | |
|---|---|---|---|---|
| 3,747,261 A | * | 7/1973 | Salem | B23Q 1/545 446/124 |
| 4,792,319 A | * | 12/1988 | Svagerko | A63H 33/08 446/104 |
| 6,050,873 A | * | 4/2000 | Reisman | A63H 33/062 446/128 |
| 2005/0075035 A1 | * | 4/2005 | Hatting | A63H 33/101 446/85 |
| 2012/0032393 A1 | * | 2/2012 | Leicht | A63H 33/04 273/156 |
| 2013/0165012 A1 | * | 6/2013 | Klauber | A63H 33/04 446/102 |
| 2017/0014727 A1 | * | 1/2017 | Chen | A63H 33/086 |
| 2018/0339237 A1 | * | 11/2018 | Lim | A63H 33/106 |
| 2020/0238190 A1 | * | 7/2020 | Tusacciu | A63H 33/08 |
| 2021/0282373 A1 | * | 9/2021 | Boileau | A63H 33/062 |

* cited by examiner

*Primary Examiner* — William V Gilbert

(57) ABSTRACT

The Invention is a series of blocks and block areas with interfaces and dimensions that enable them to be assembled into a wide range of useful 3D objects. The blocks, poles, spheres, and their interfaces can build a wide range of useful constructions in the manner similar to how an alphabet describes a wealth of human experience. With knobs, screws, hooks, snaps, magnetic interfaces and combinations of these interfaces, the pieces of the Invention pull themselves together with the strength needed in a particular circumstance. They can also be easily disassembled to form new constructions as needed. The blocks, and their interfaces, are modular and they can in turn build modular objects and constructions, like modular homes.

2 Claims, 74 Drawing Sheets

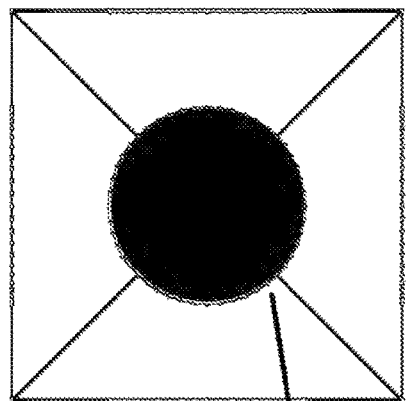
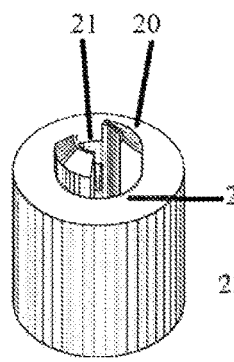
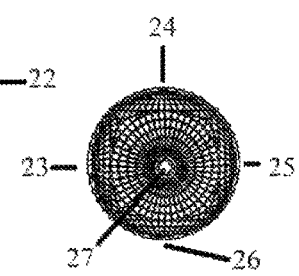
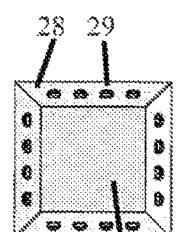
Fig. 1C    Fig. 2    Fig. 3    Fig. 4
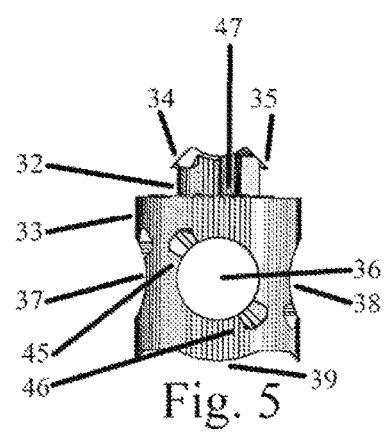
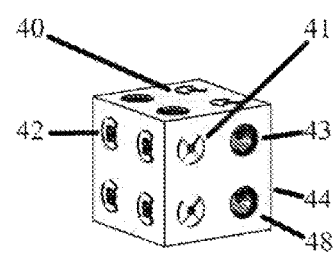
Fig. 5    Fig. 6

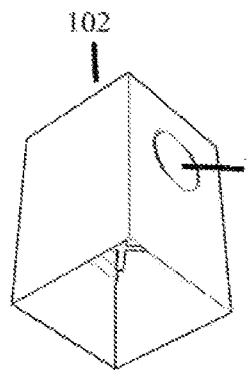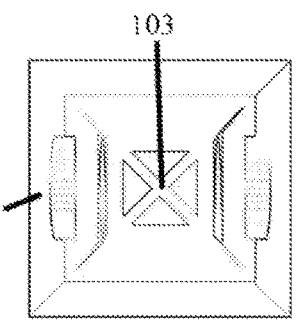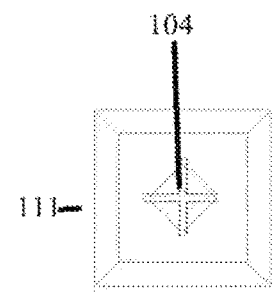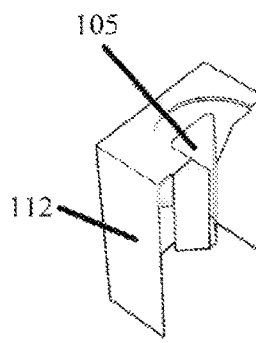
Fig. 22B     Fig. 22C     Fig. 22D     Fig. 22E
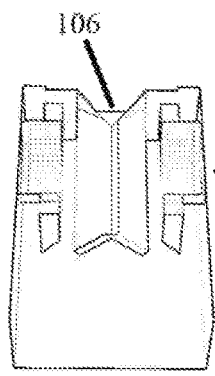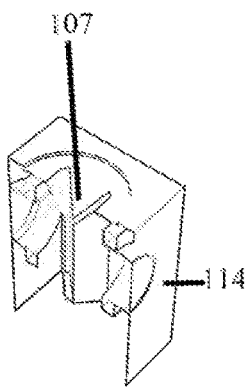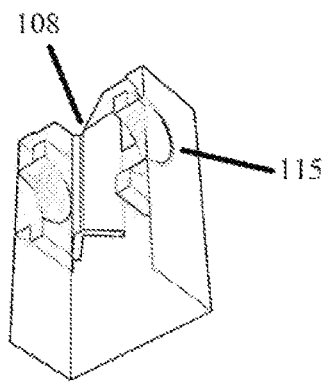
Fig. 22F     Fig. 22G     Fig. 22H

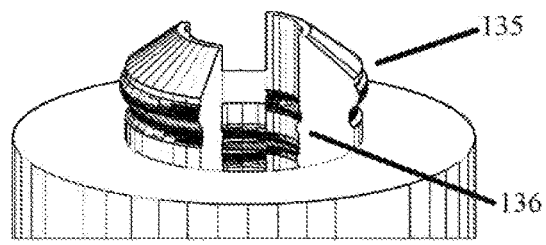
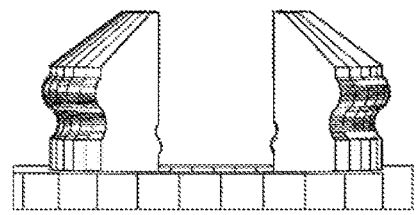
Fig. 30A  Fig. 30B
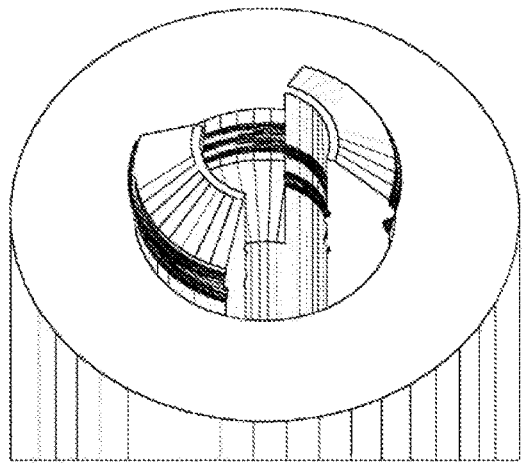
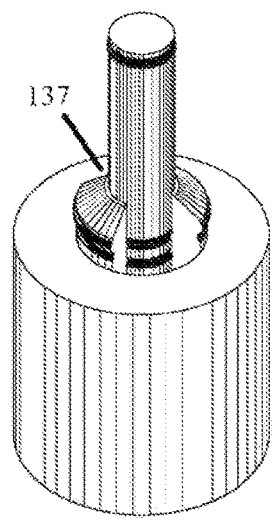
Fig. 30C  Fig. 31  Fig. 32

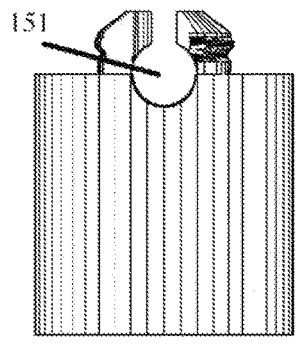 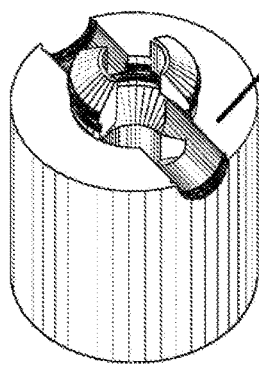 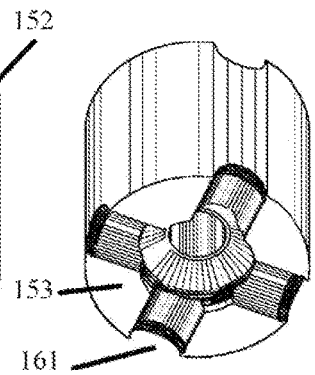 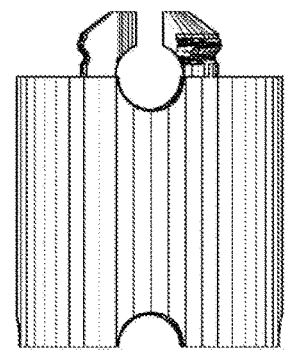
Fig. 36A  Fig. 36B  Fig. 37A  Fig. 37B
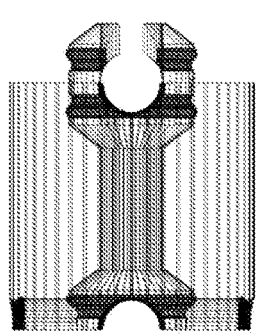 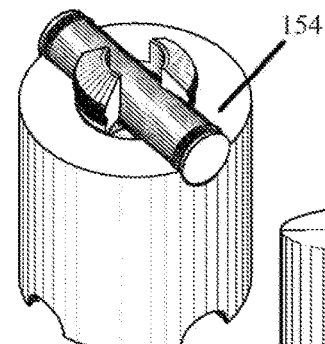
Fig. 37C  Fig. 38A
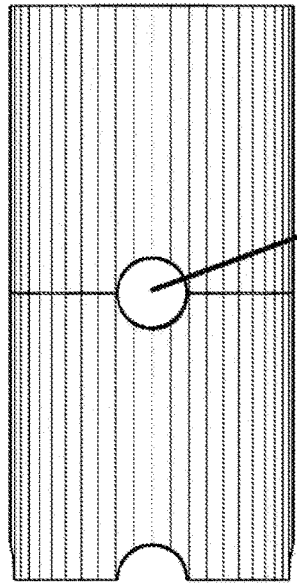 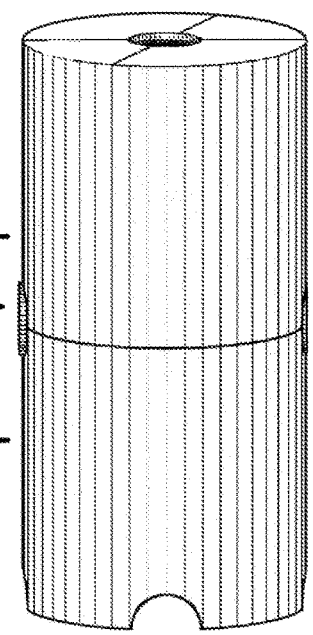 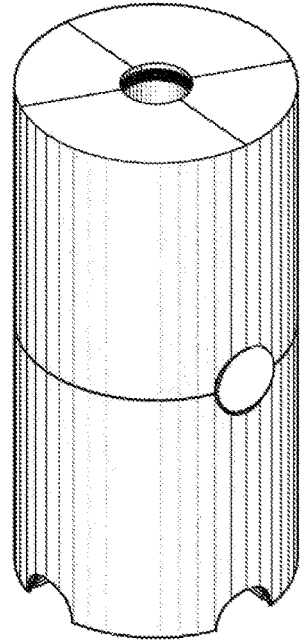
Fig. 38D  Fig. 38B  Fig. 38C

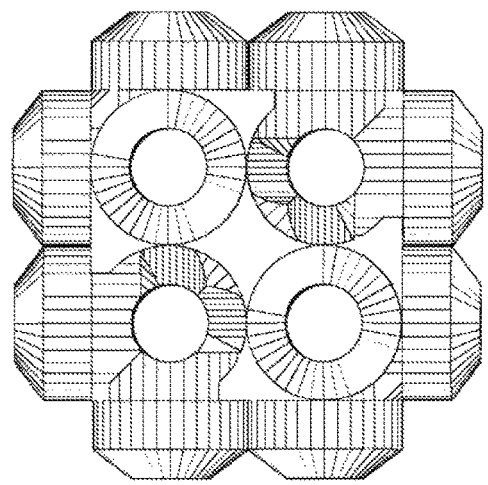
Fig. 45B
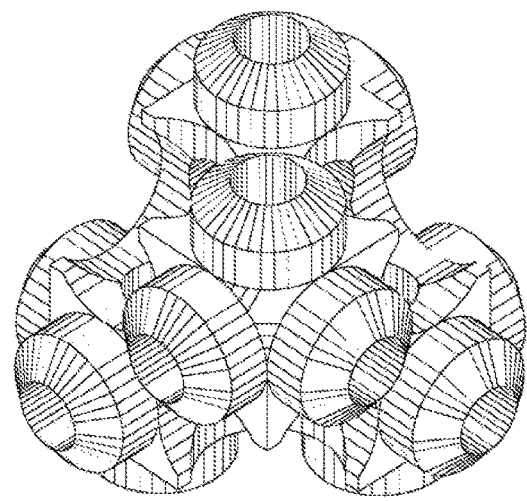
Fig. 45C
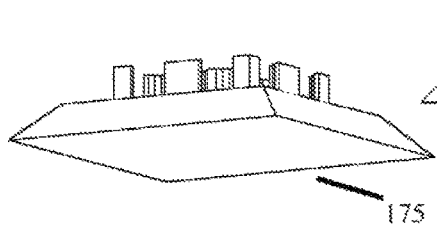
Fig. 46A
Fig. 46B
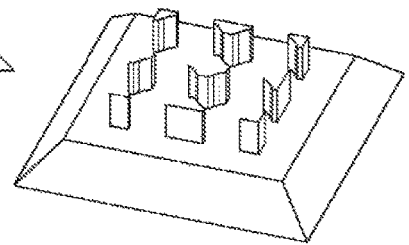
Fig. 46C
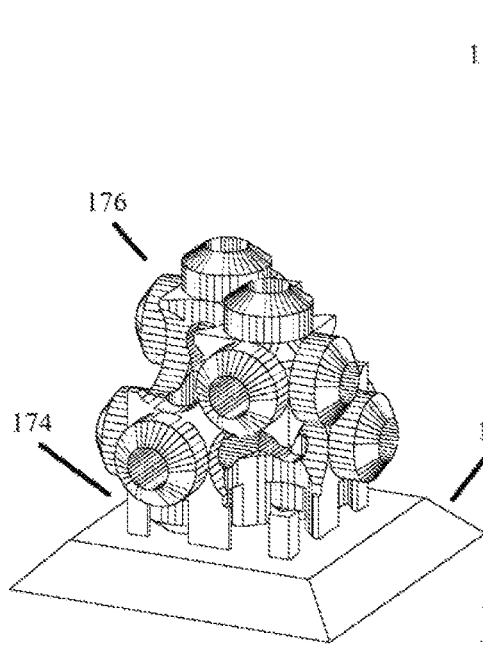
Fig. 47A
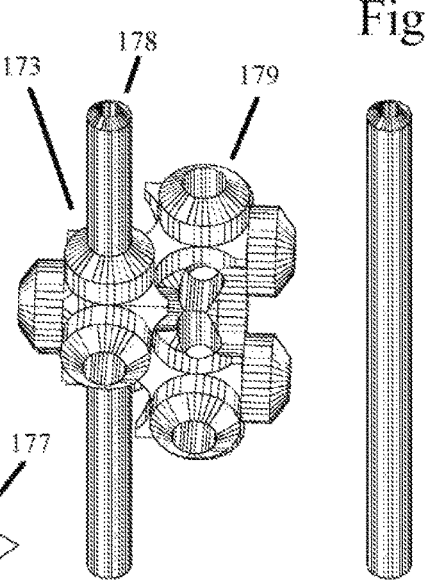
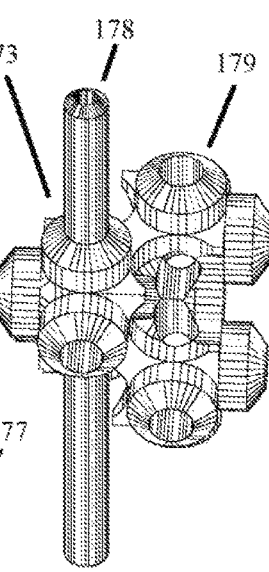
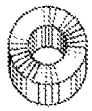
Fig. 47B    Fig. 48A   Fig. 48B

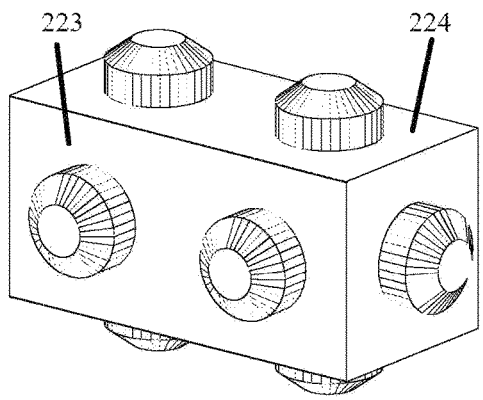
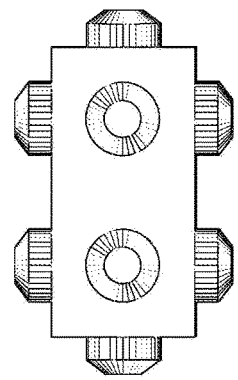
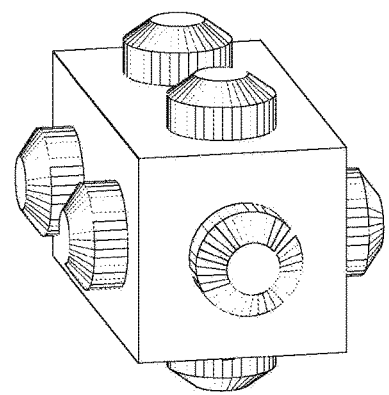
Fig. 63A   Fig. 63B   Fig. 63C
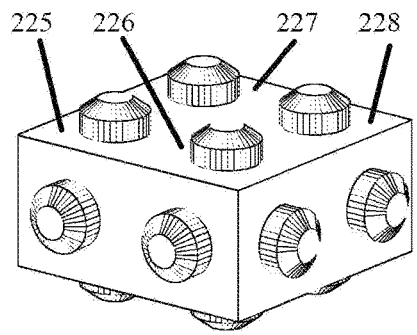
Fig. 64
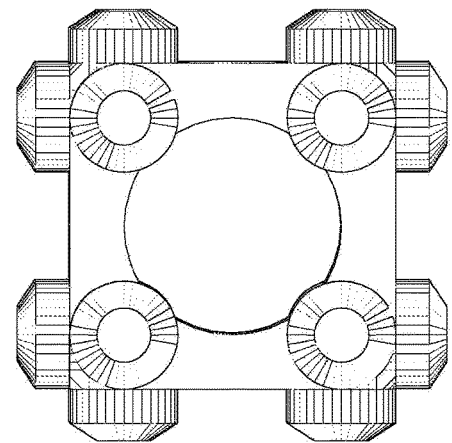
Fig. 65A
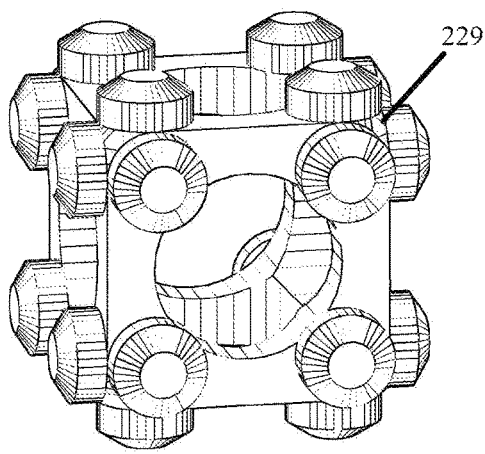
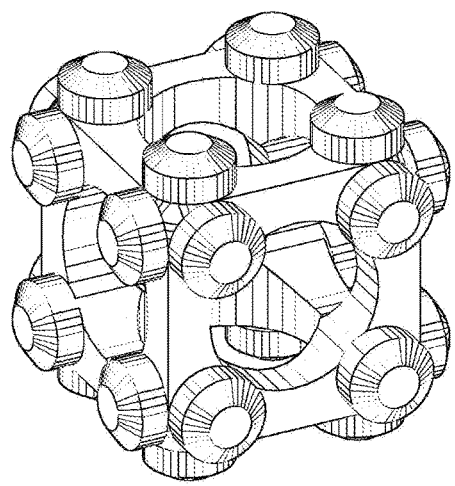
Fig. 65B   Fig. 65C

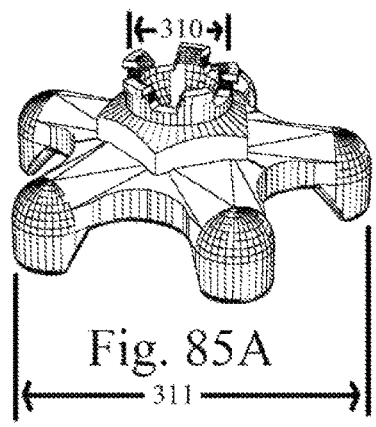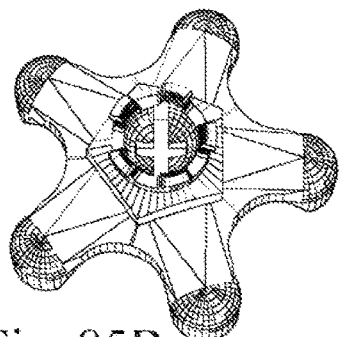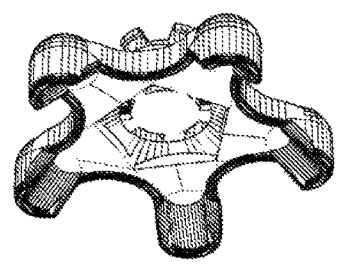
Fig. 85A  Fig. 85B  Fig. 85C
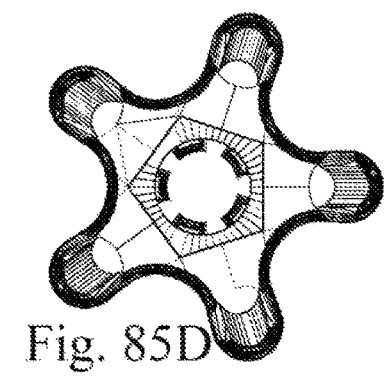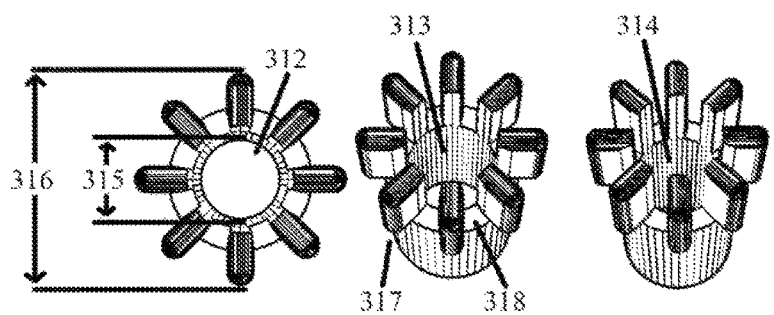
Fig. 85D  Fig. 86A  Fig. 86B  Fig. 86C
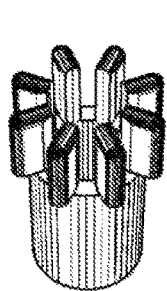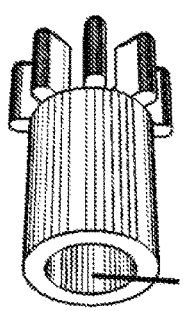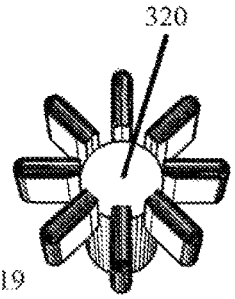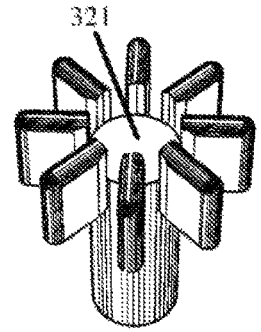
Fig. 86D  Fig. 86E  Fig. 86F  Fig. 86G
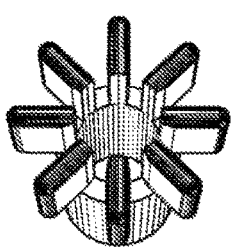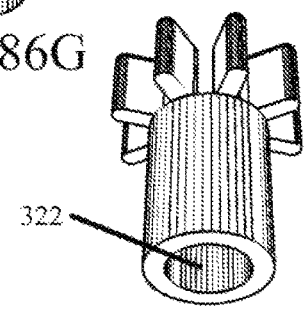
Fig. 87A  Fig. 87B

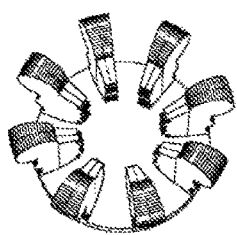 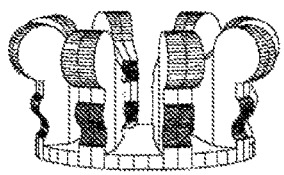 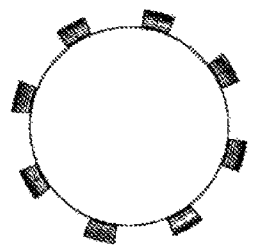 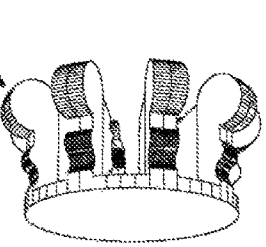
Fig. 93A  Fig. 93B  Fig. 93C  Fig. 93D
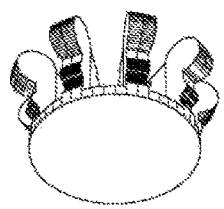 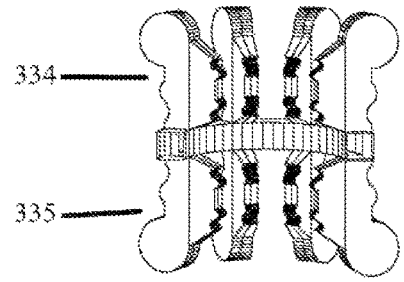 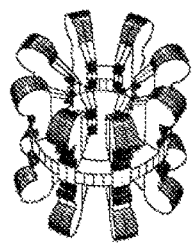 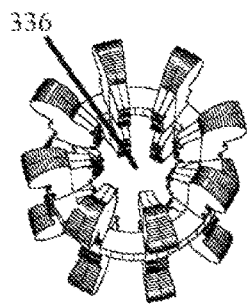
Fig. 93E  Fig. 94A  Fig. 94B  Fig. 94C
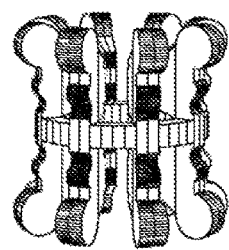 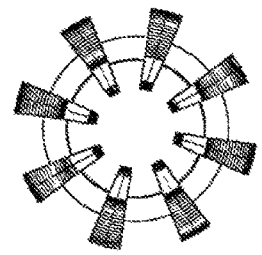
Fig. 94D  Fig. 94E

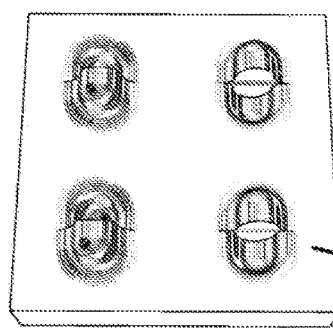
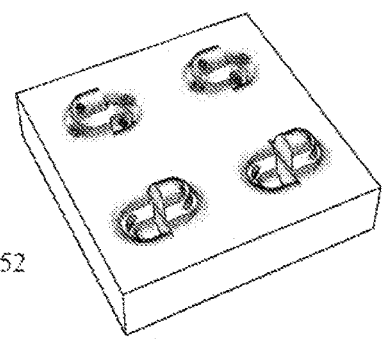
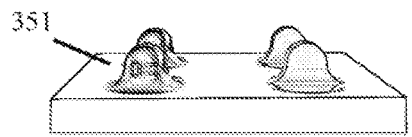
Fig. 104A
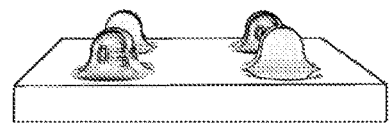
Fig. 104B    Fig. 104C    Fig. 105A
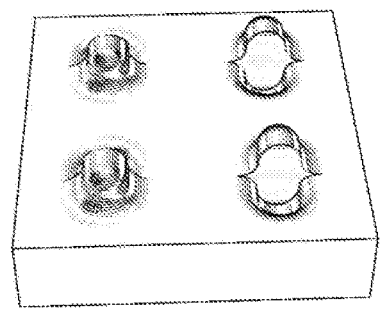
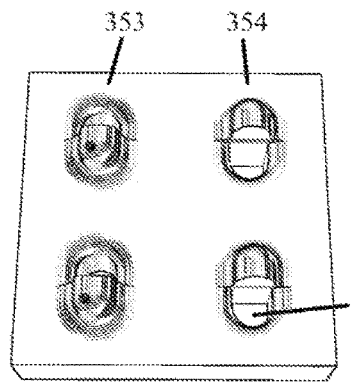
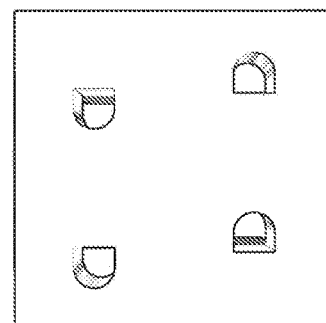
Fig. 105B    Fig. 105C    Fig. 105D
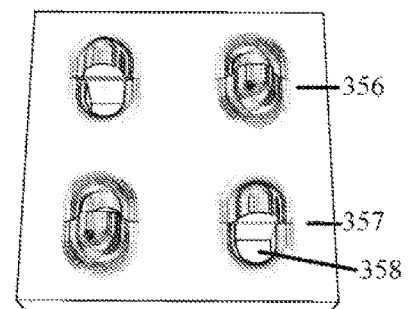
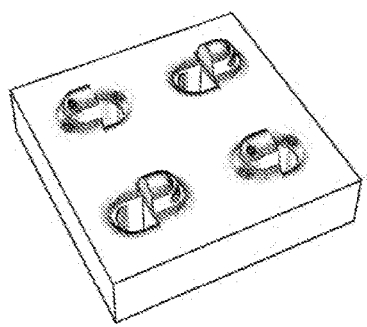
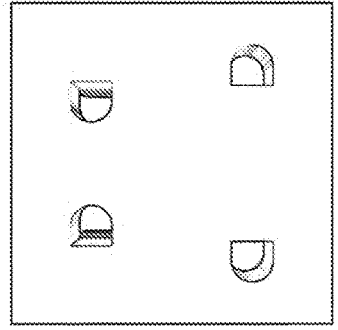
Fig. 106A    Fig. 106B    Fig. 106C

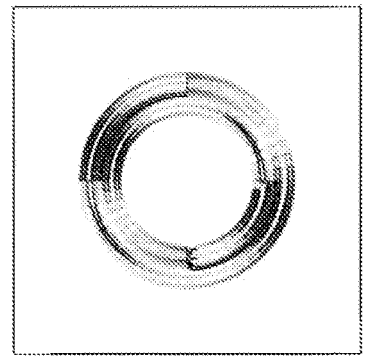
Fig. 112A
Fig. 113A
Fig. 113B
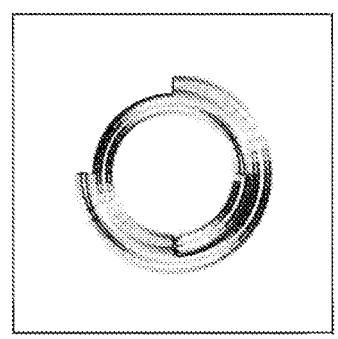
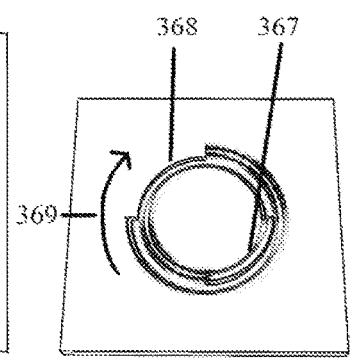
Fig. 112B
Fig. 112C
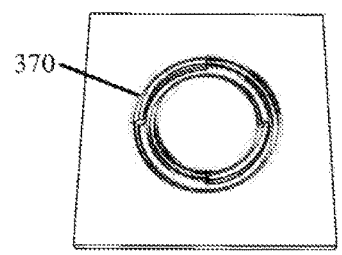
Fig. 113C
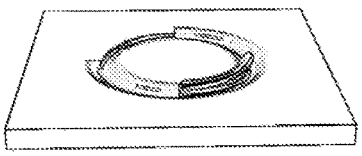
Fig. 113D
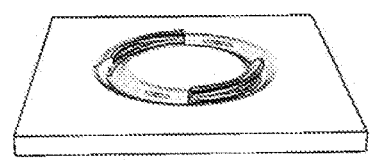
Fig. 112D
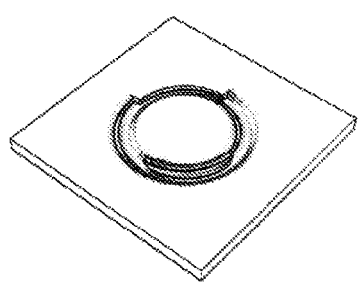
Fig. 112E
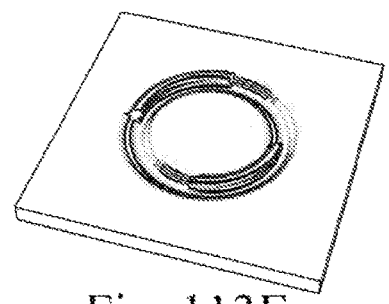
Fig. 113E

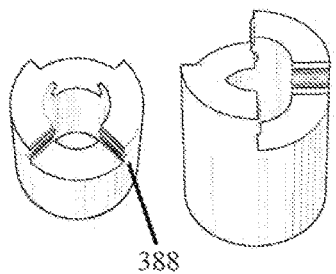 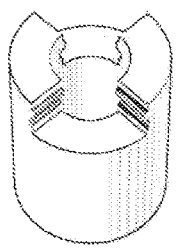 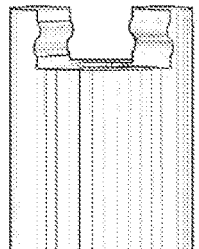 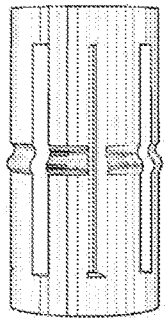
Fig.121A  Fig. 121B  Fig. 121C  Fig. 121D
Fig. 122A
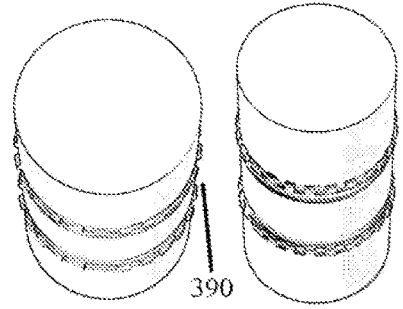 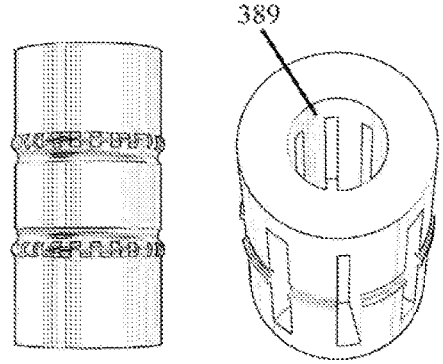 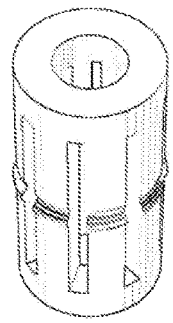
Fig. 123A  Fig. 123B  Fig. 123C  Fig. 122B  Fig. 122C
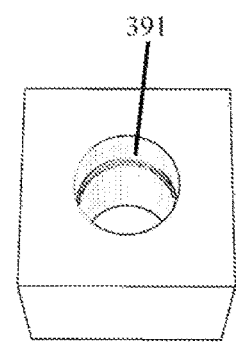 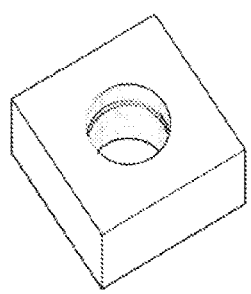 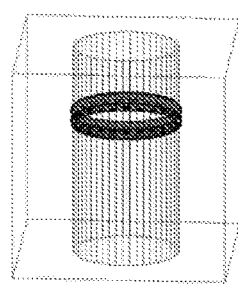
Fig. 124A  Fig. 124B  Fig. 124C

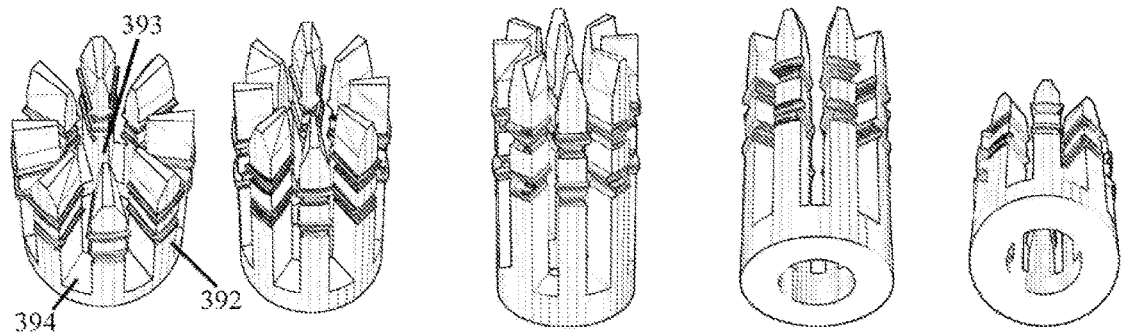
Fig. 125A  Fig. 125B  Fig. 125C  Fig. 125D  Fig. 125E
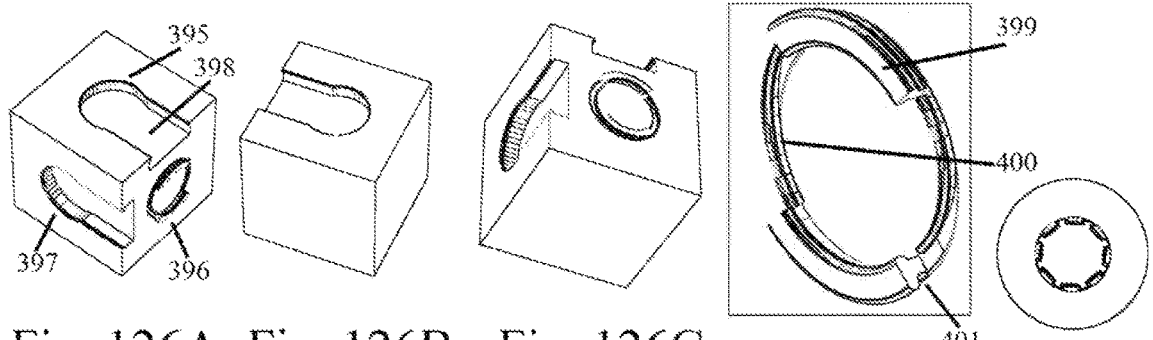
Fig. 126A  Fig. 126B  Fig. 126C
Fig. 126D  Fig. 125F
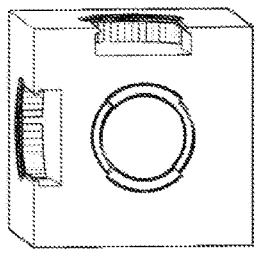
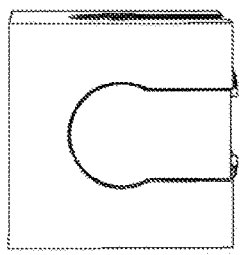
Fig. 126E  Fig. 126F
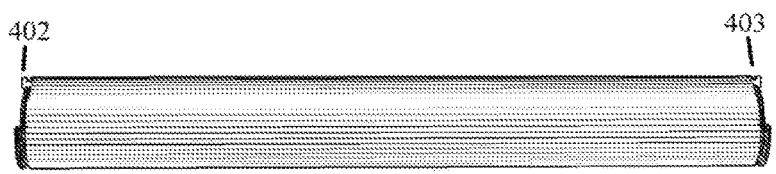
Fig. 127A
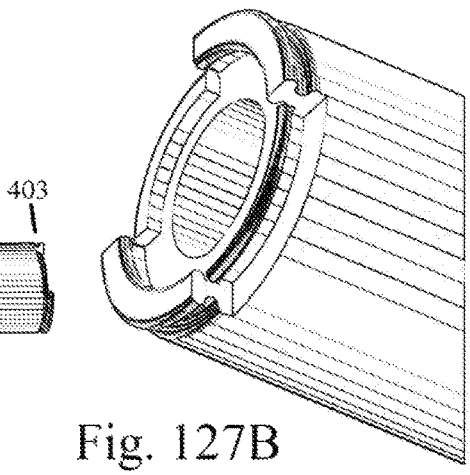
Fig. 127B
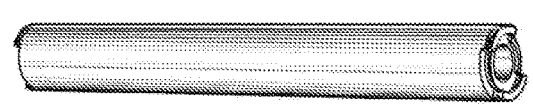
Fig. 127C

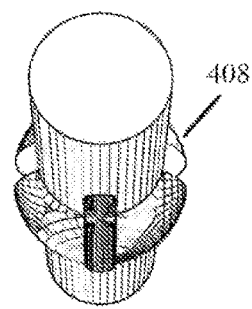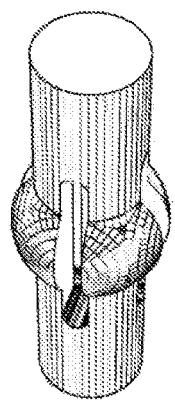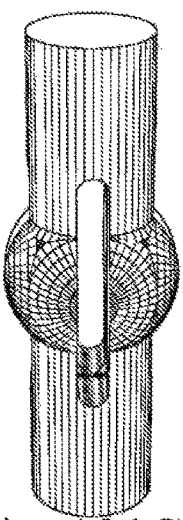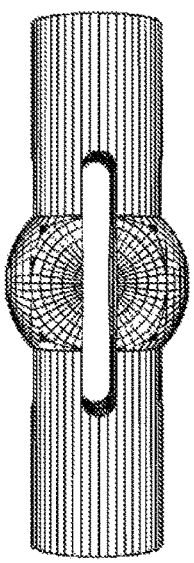
Fig. 131A    Fig. 131B    Fig. 131C    Fig. 131D
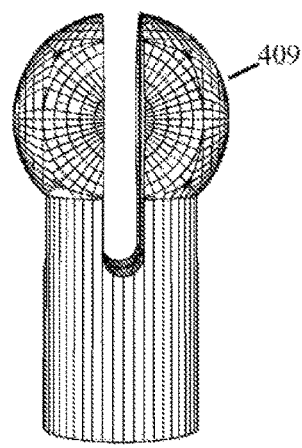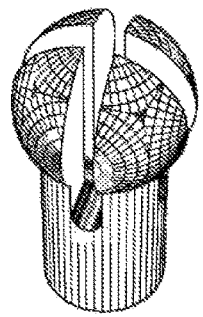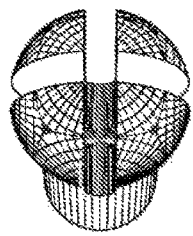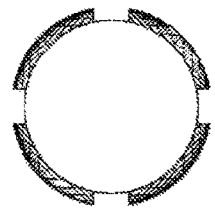
Fig. 132A    Fig. 132B    Fig. 132C    Fig. 132D
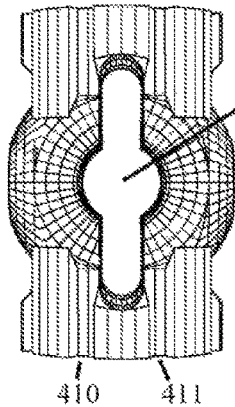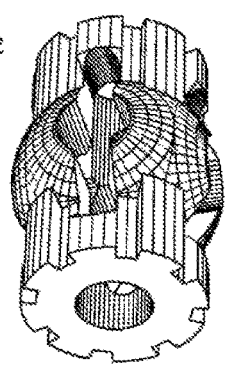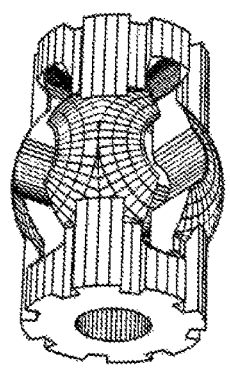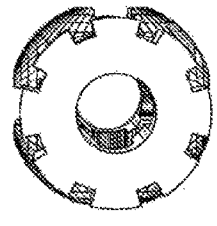
Fig. 133A    Fig. 133B    Fig. 133C    Fig. 133D

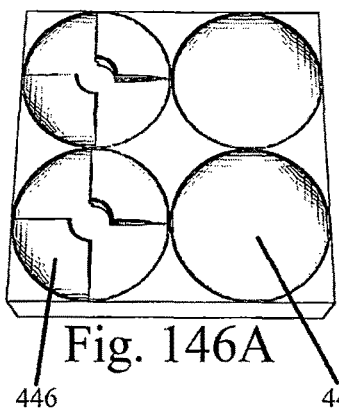
Fig. 146A
446  447
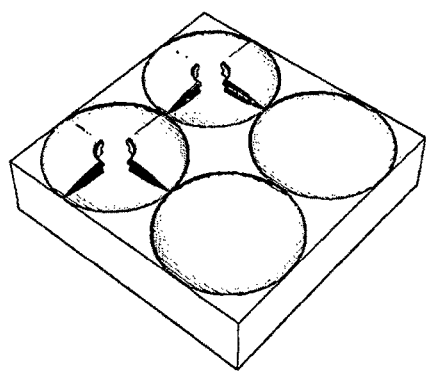
Fig. 146B
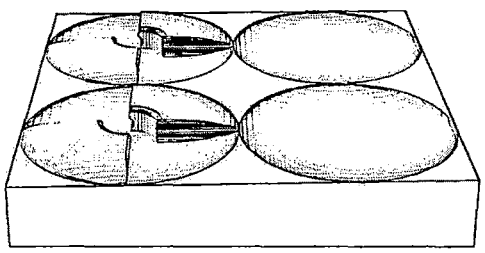
Fig. 146C
Fig. 146D
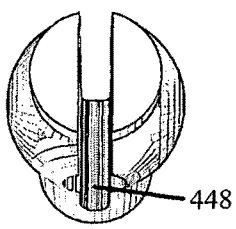
Fig. 147A
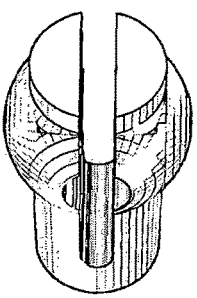
448
Fig. 147B
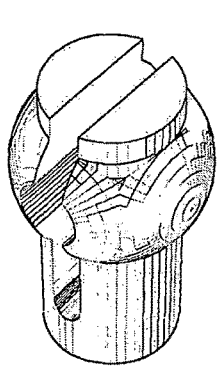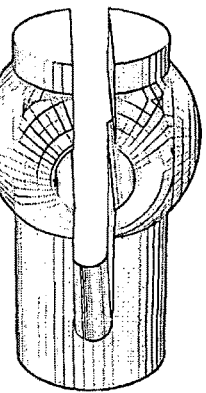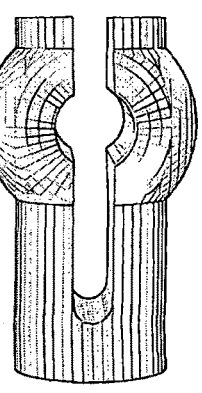
Fig. 147C  Fig. 147D  Fig. 147E
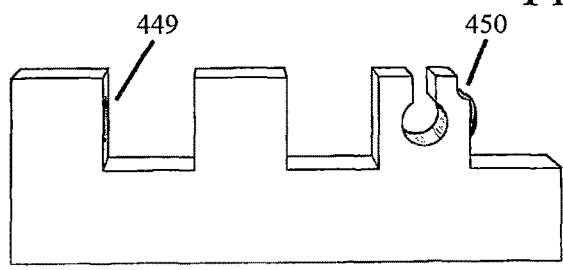
449  450
Fig. 148A
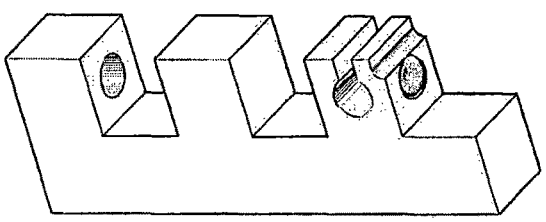
Fig. 148B

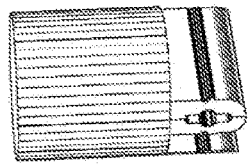 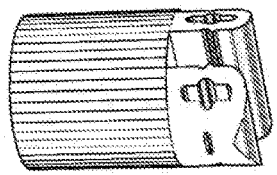 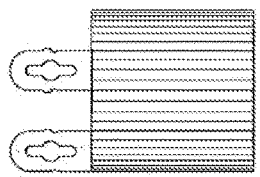 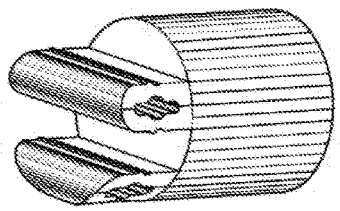
Fig. 155A    Fig. 155B    Fig. 155C    Fig. 155D
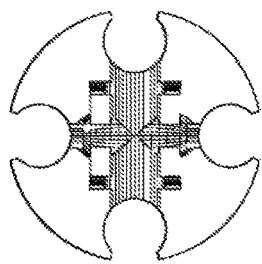
Fig. 156A
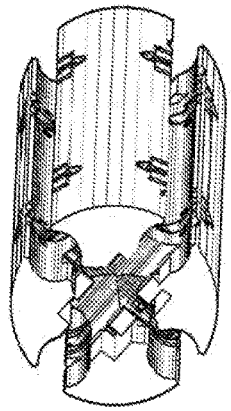
Fig. 156B
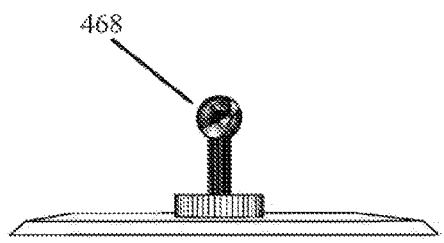
Fig. 157A
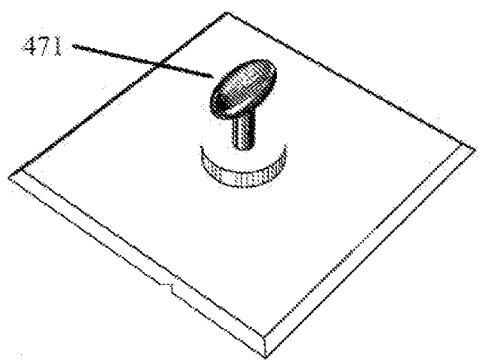
Fig. 157B
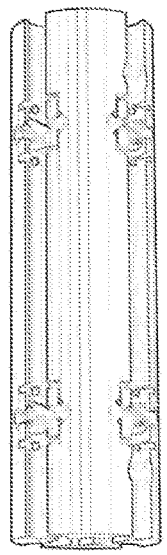
Fig. 156C
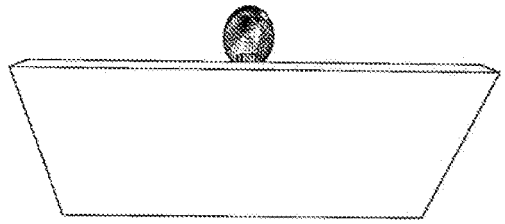
Fig. 157C
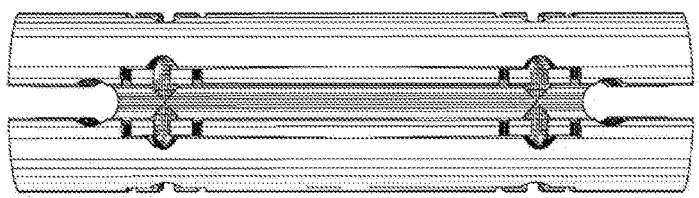
Fig. 156D

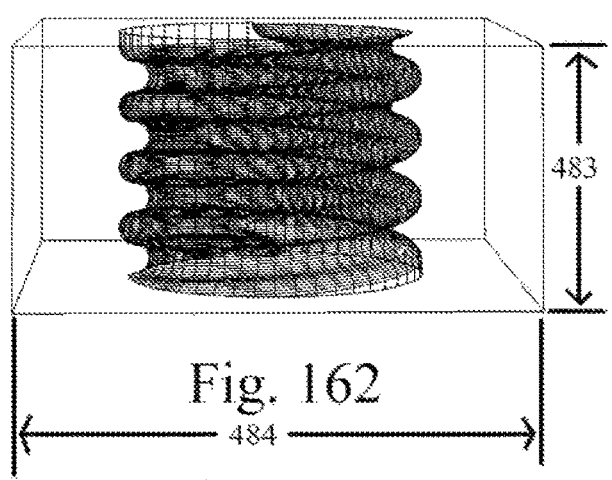
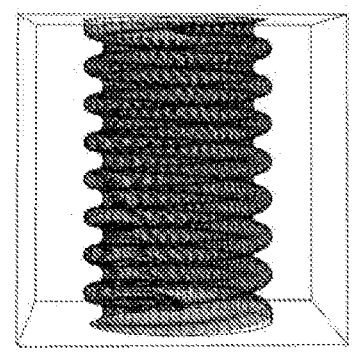
Fig. 162     Fig. 163
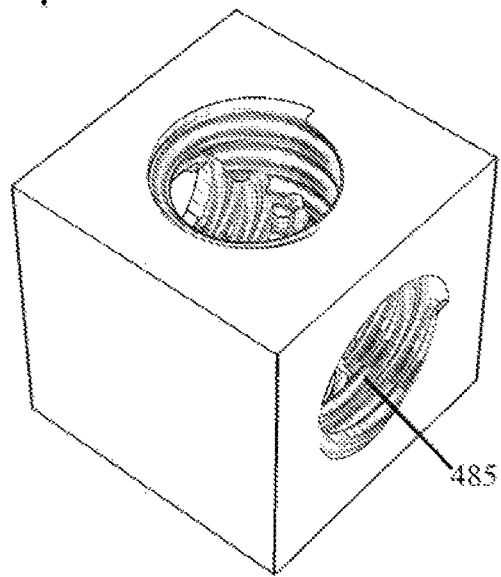
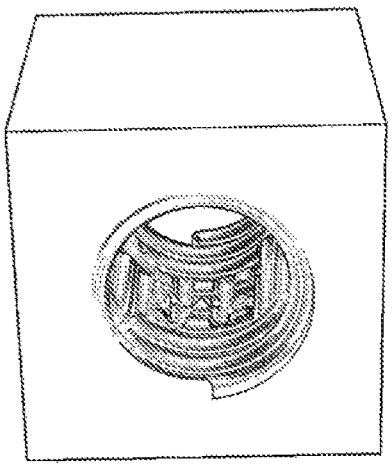
Fig. 164A     Fig. 164B
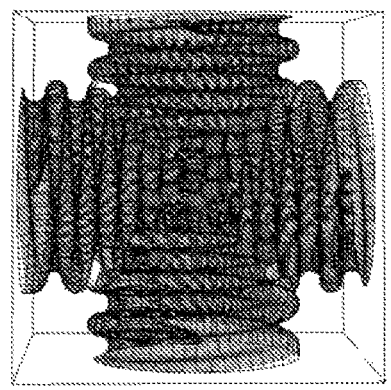
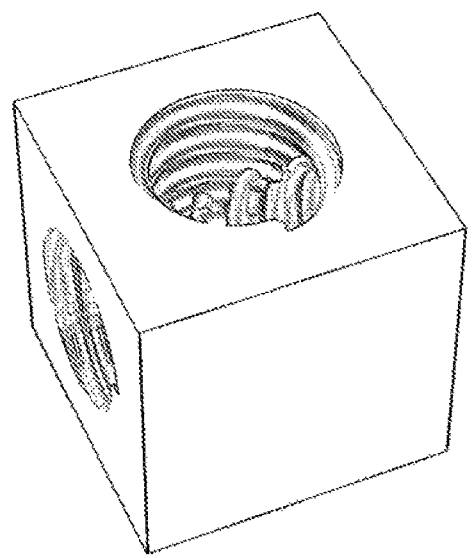
Fig. 164C     Fig. 164D

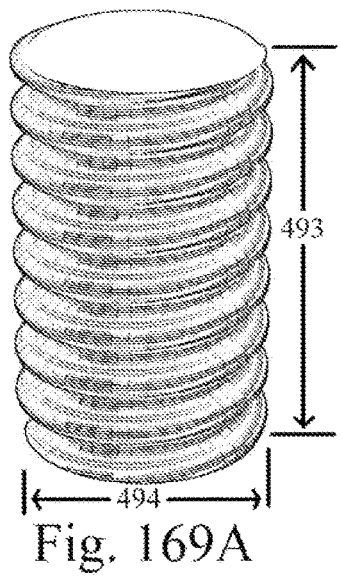
Fig. 169A
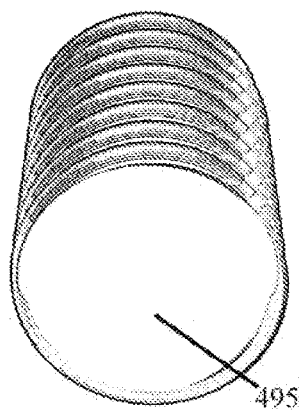
Fig. 169B
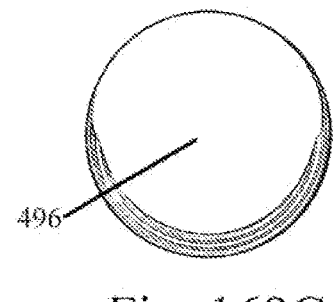
Fig. 169C
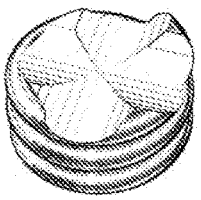
Fig. 170A
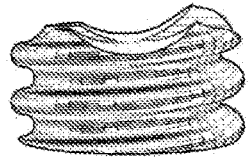
Fig. 170B
Fig. 170C
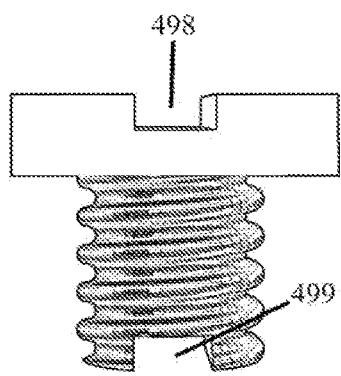
Fig. 171A
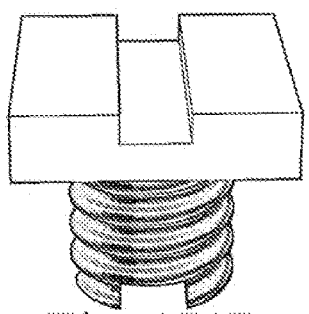
Fig. 171B
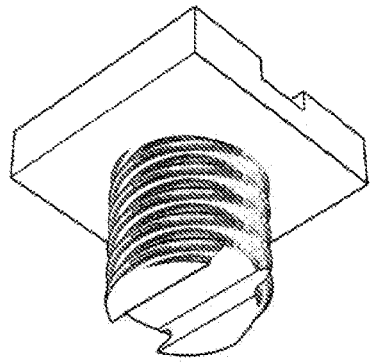
Fig. 171C

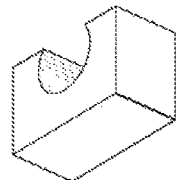 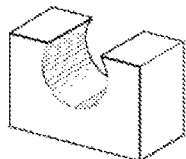 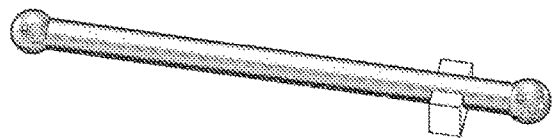
Fig. 172A  Fig. 172B  Fig. 173
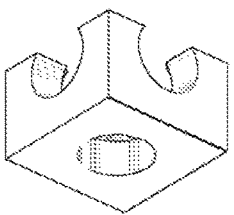 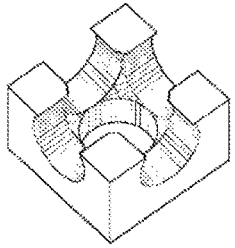 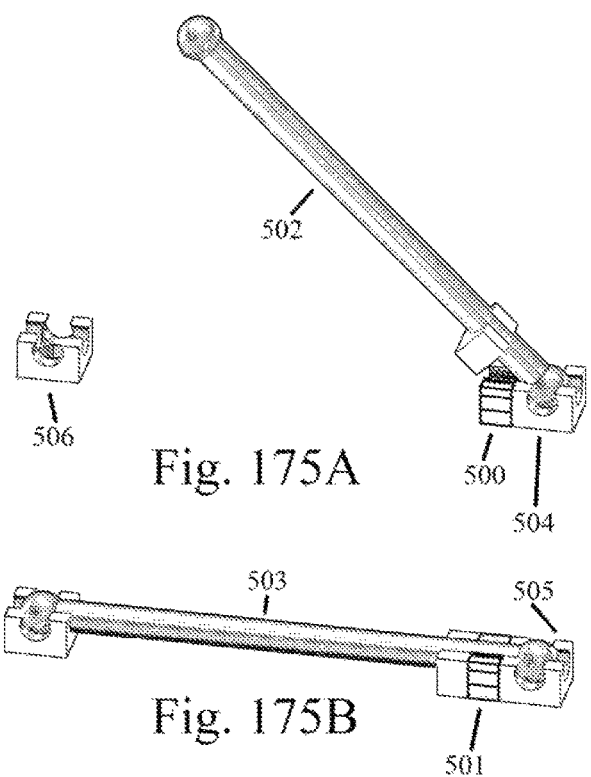
Fig. 174A  Fig. 174B
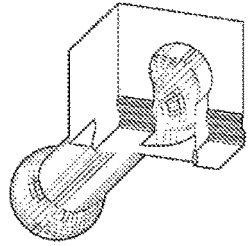 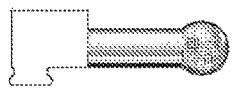
Fig. 175A
Fig. 176A  Fig. 176B  Fig. 175B
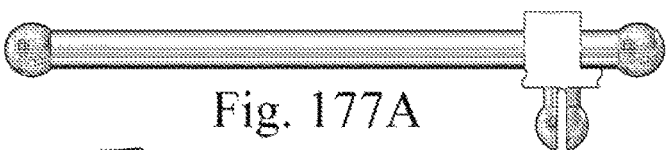
Fig. 177A
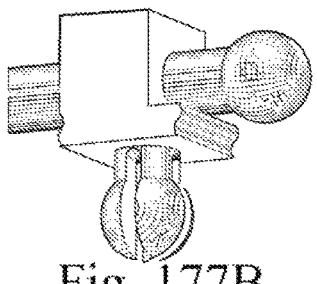 
Fig. 178
Fig. 177B

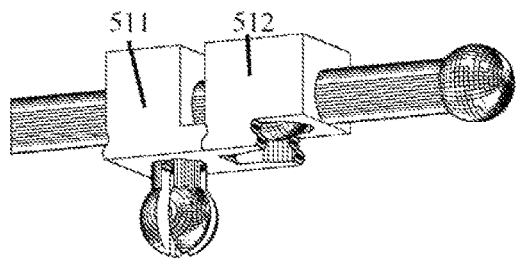
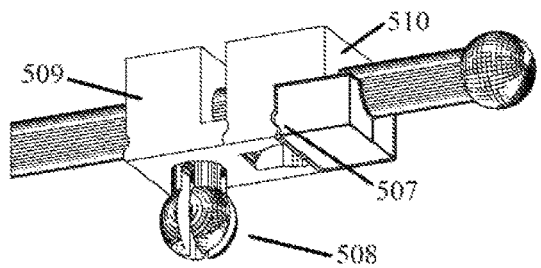
Fig. 179  Fig. 180
 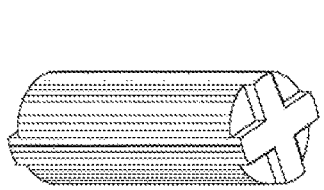
Fig. 181A  Fig. 181B
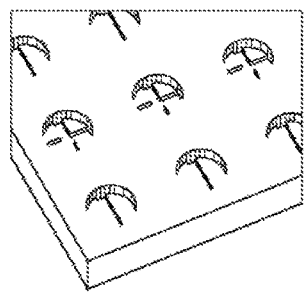 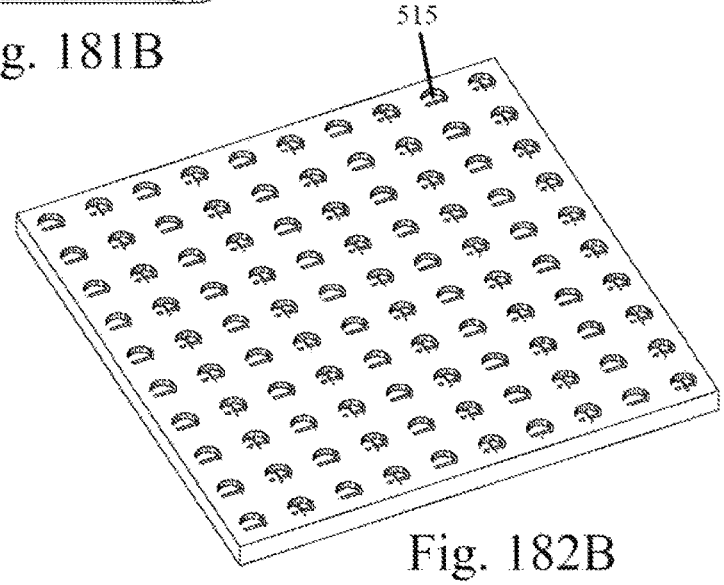
Fig. 182A  Fig. 182B
Fig. 183
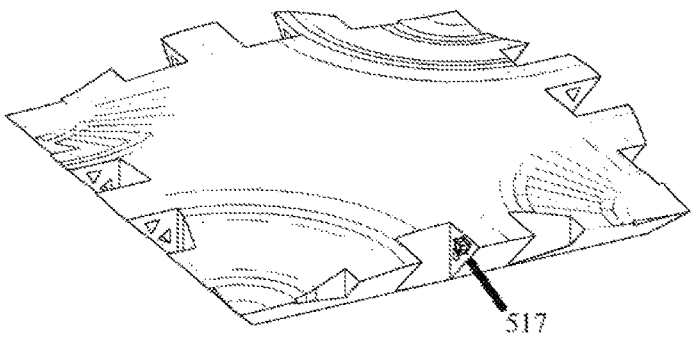
Fig. 184A

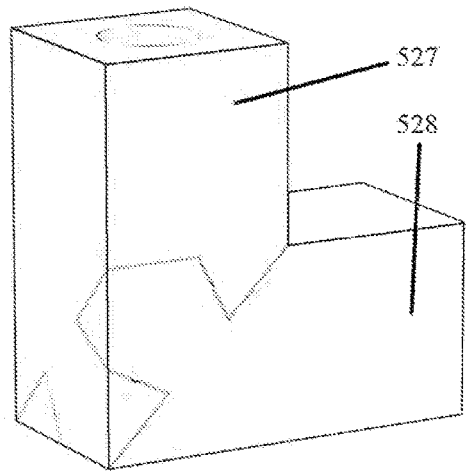
Fig. 187A
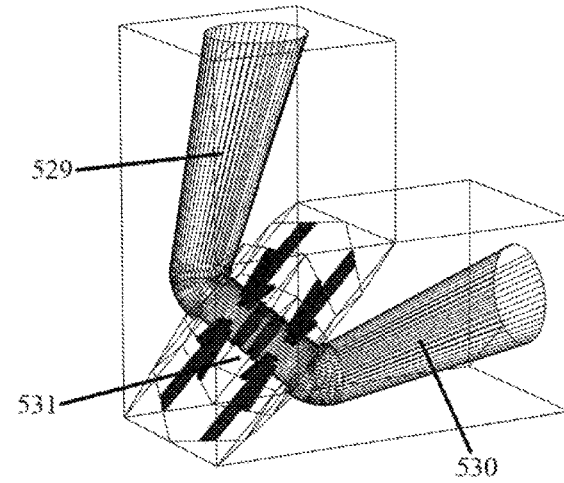
Fig. 187B
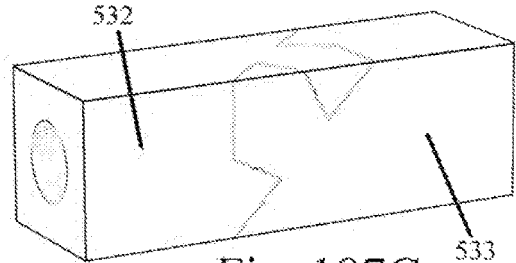
Fig. 187C
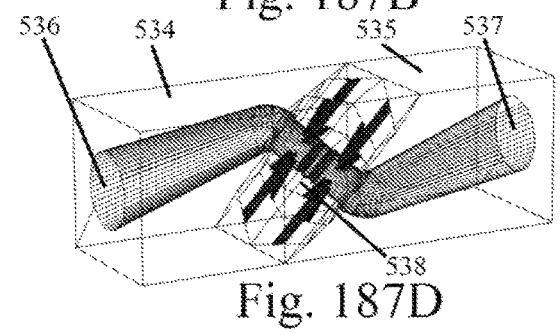
Fig. 187D
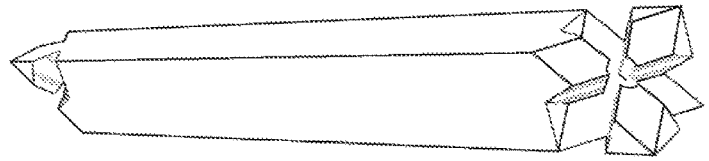
Fig. 188A
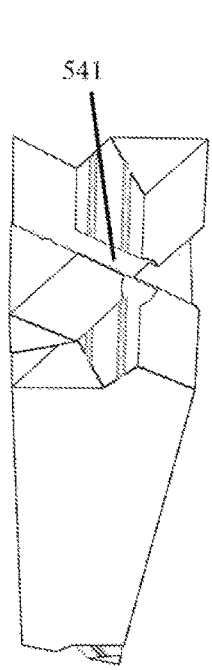
Fig. 188B
Fig. 188C
Fig. 188D

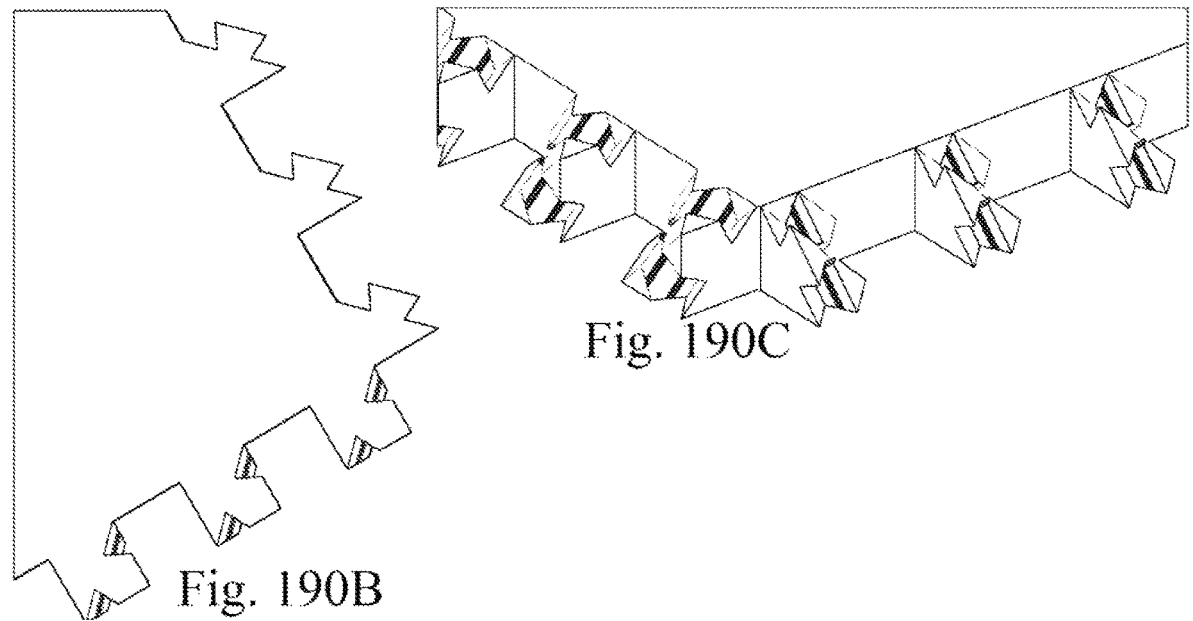
Fig. 190B
Fig. 190C
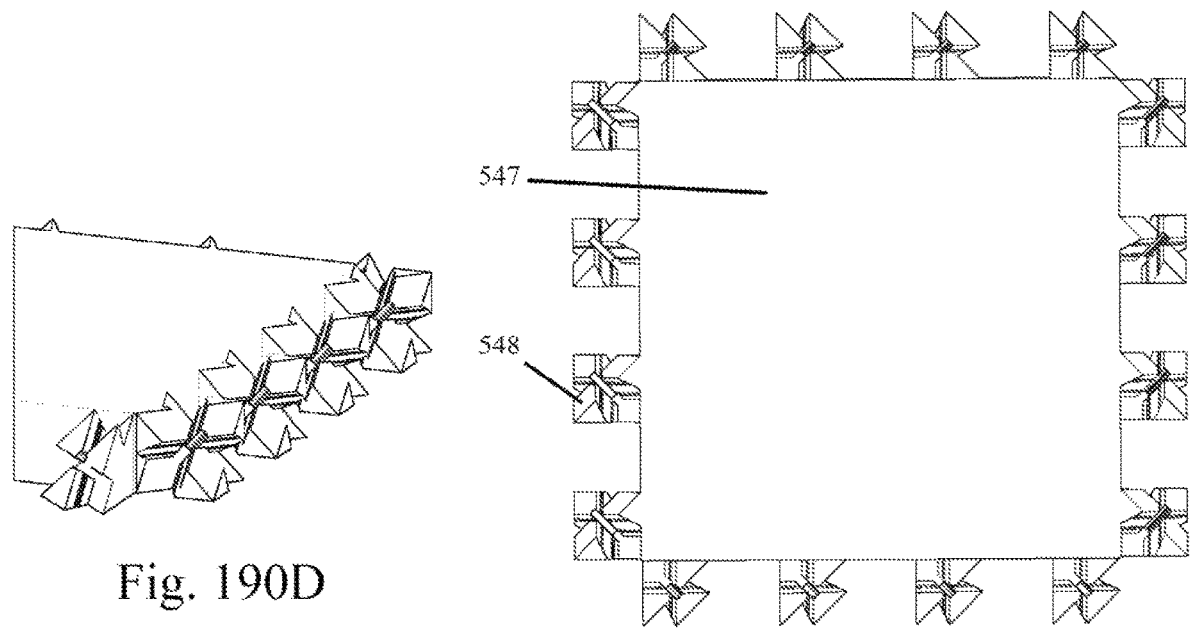
Fig. 190D
Fig. 190E

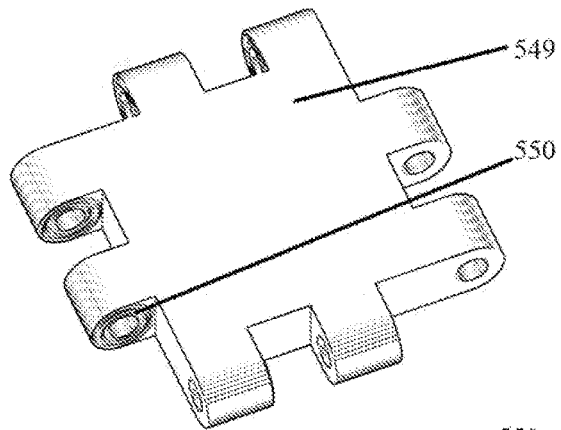
Fig. 191A
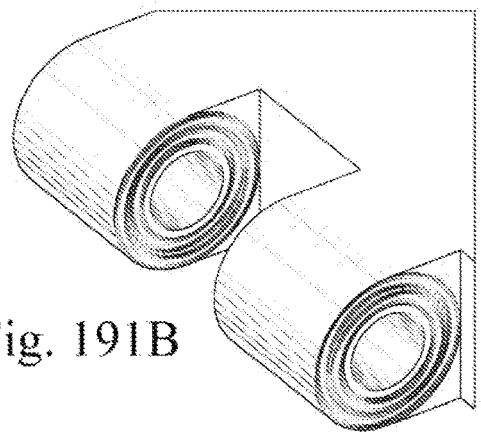
Fig. 191B
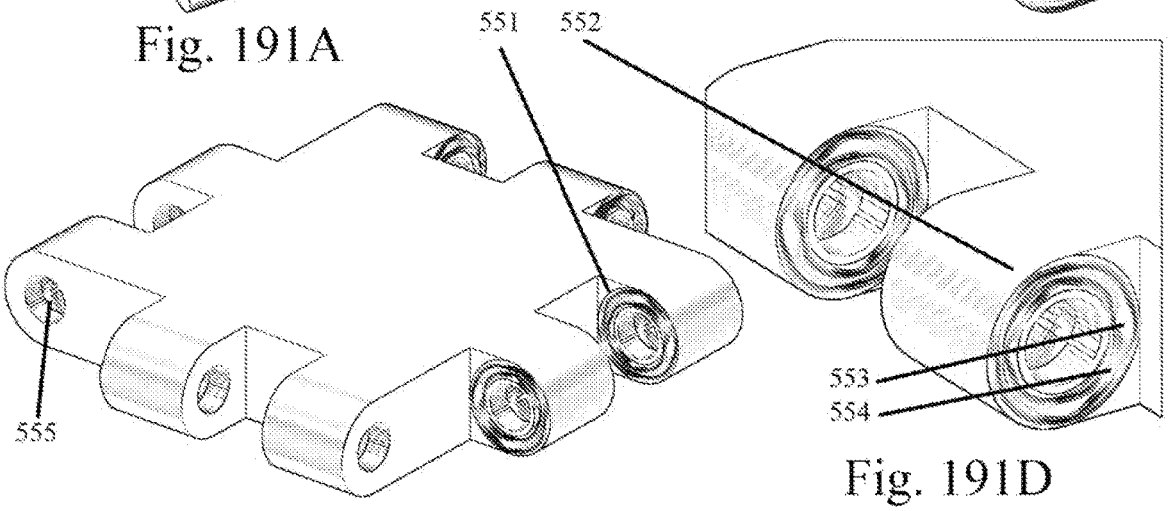
Fig. 191C
Fig. 191D
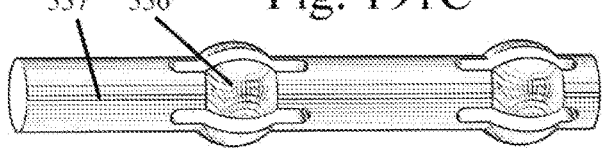
Fig. 192A
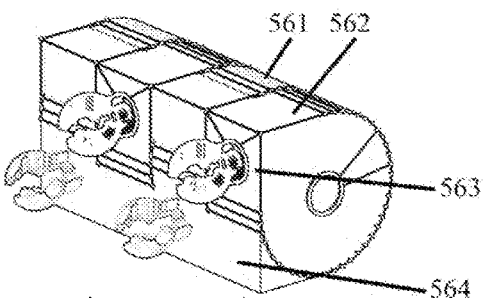
Fig. 193A
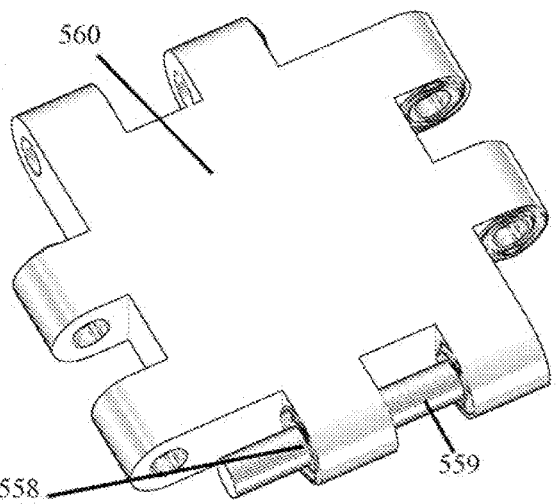
Fig. 192B

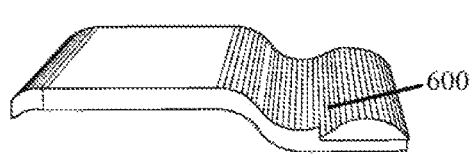
Fig. 203F
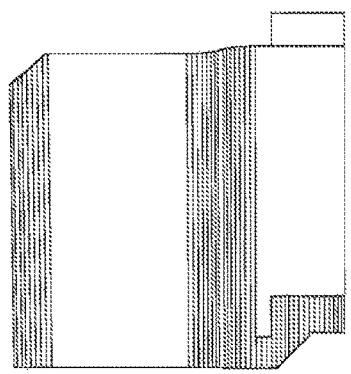
Fig. 203G
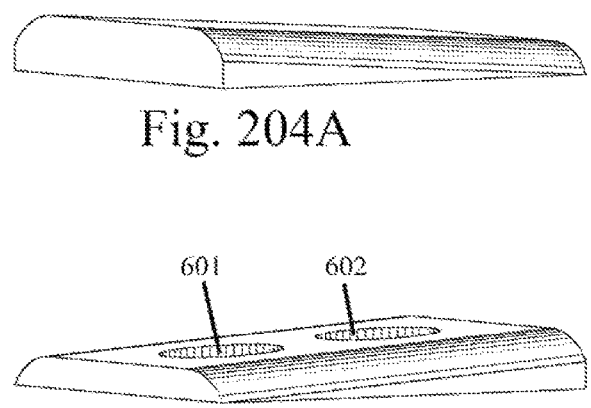
Fig. 204A
Fig. 205A
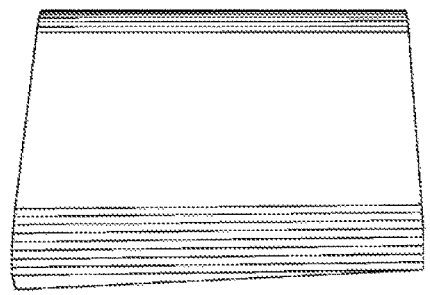
Fig. 204B
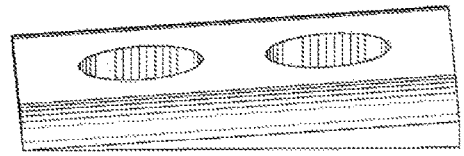
Fig. 205B
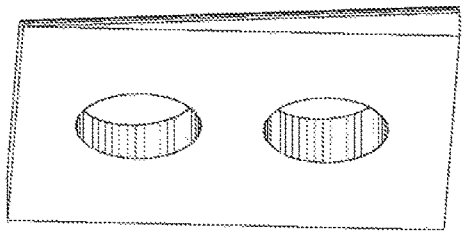
Fig. 205C

GIGACUBES BLOCK SYSTEM

BRIEF SUMMARY OF THE INVENTION

Just like alphabets assemble in a wide range of ways to communicate meaning—and can also be altered with italics, all caps, underline and more to add additional meanings—the Invention's modular pieces assemble into a wide range of ways to build useful and meaningful objects. The Invention's snap, hook, knob, screw and magnet interfaces are also modular and the blocks can be assembled, and then locked with spheres and poles, and they can also be reinforced with poles and with additional blocks. Like an alphabet that can be bolded, the pieces assembled by the Invention can be strengthened from within and without with steel or cast-iron pieces being added, or replacing weaker pieces, or being inserted into the constructions. Weight, strength, shape, cost and composition of materials, are all construction parameters that can be adjusted with the ease that a written alphabet can be altered to have italics, underlined text, etc.

The Invention uses standard intuitive parameters to help the user easily understand how to work with and change (or edit) objects. Those standard intuitive parameters include size ratios of objects and of basic features of objects that are divisible by two and that are the same size, or that are exponentially larger or smaller than, the basic pieces. For example, many cubes have circular shafts running through them. Those shafts are half the size of the cubes.

The Invention's pieces rest on each other, are held together with knobs, hooks, screws, magnets, snaps and combinations of these things, and the pieces can be locked with spheres and they can be locked or reinforced with poles. Poles and spheres can often be used interchangeably in the Invention's pieces and constructions.

The Invention can be made with rigid materials like glass, ceramics and cast iron, or it can be made with flexible materials like rubber and flexible plastic. These pieces work with each other (i.e., flexible pieces work with flexible pieces and rigid materials with rigid pieces) and the pieces work interchangeably (flexible pieces work with rigid pieces).

Pieces of the same size can fit together reversibly with themselves and they generally can also work with pieces that are twice the size and half the size.

The Invention's simple intuitive design generally does not have movable pieces nor does it require the use of tools. Instead, it uses its own pieces as tools and the pieces can also be assembled into poles and other structures that can apply leverage of a person's strength to assemble pieces firmly.

The Invention is designed to require minimal skill or resources to empower a person to construct the infrastructure for an entire human community comprised of water purification, storage, shelter from rain, sun, wind, heat and cold, along with protection from animals and from other attackers.

BRIEF DESCRIPTION OF THE SEVERAL VIEWS OF THE DRAWINGS

FIG. 1C is a profile view of the cube, the circles on the sides of the cube, and the sphere in the middle that is generated with rotated circles.

FIG. 2 is a cylinder that is as tall as its diameter, which causes it to occupy a cube space.

FIG. 3 is a more detailed view of the sphere at the center of FIG. 1C.

FIG. 4 is a simple panel with slanted sides that has recessed areas into which knobs or magnetic discs can be inserted.

FIG. 5 is an example of how a knob on a cylinder like that found in FIG. 2 can also have hooks that fit into each of the six basic cube sides of the piece.

FIG. 6 is a cube with shafts that accommodate cylindrical pieces like the one illustrated in FIG. 5.

FIG. 1B is another example of a male flexible piece.

FIG. 22B is a view from the bottom corner of the object in FIG. 22A.

FIGS. 22B through 22H are different views of the same object that demonstrate how a nail pushed in the top causes the sides to be pushed out to lock with pieces on the sides.

FIG. 22C is a profile view of the bottom of the piece in FIG. 22A.

FIG. 22D is a wireframe view from the top of the piece in FIG. 22A.

FIG. 22E is a side view from a top corner of a cutout of the piece in FIG. 22A.

FIG. 22F is a bottom side view of a cutout of the piece in FIG. 22A.

FIG. 22G is a top corner view of a cutout of the piece in FIG. 22A.

FIG. 22H is a bottom corner view of a cutout of the piece in FIG. 22A.

FIG. 30A is similar to FIG. 29A except it has snaps on the outside of the knob.

FIG. 30B is a near-profile view from the side of the top of the object in FIG. 30A.

FIG. 30C is a view from the top and to one side of the object that is in FIG. 30A.

FIG. 31 is a demonstration of how the object in FIG. 30A can have the pole that is FIG. 32 fit into it.

FIG. 32 is the pole that fits into FIG. 30A in the manner shown in FIG. 31.

FIG. 36A is similar to FIG. 35A except that it is locked when a pole is inserted.

FIG. 36B is a top corner view of the object that is in FIG. 36A.

FIG. 37A is similar to FIG. 36A except it has female interfaces on its bottom.

FIG. 37B is a profile view of the object in FIG. 37A.

FIG. 37C is a wireframe side profile view of the object that is in FIG. 36A.

FIG. 38A is an example of where a pole is inserted into FIG. 37A to lock.

FIG. 38B shows how FIB. 36A, when snapped and hooked into FIG. 37A, is then locked.

FIG. 38C is a different view of this construction for clarity.

FIG. 38D is a profile view of FIG. 36A.

FIG. 37A's knob can be inserted into the female knob opening at the bottom of FIG. 37A.

FIG. 45B is a side profile view of the object in FIG. 45A.

FIG. 45C is a top corner view of the object in FIG. 45A from a different angle.

FIG. 46A is a panel that makes the sides of the knob cubes flat.

FIG. 46B is a side profile view of the object in FIG. 46A.

FIG. 46C is a top corner view of the object in FIG. 46A.

FIG. 47A is a demonstration of how FIG. 45A fits onto FIG. 46A.

FIG. 47B is a demonstration of how the hollow pole in FIG. 48A reinforces the hollow knobs of FIG. 45A.

FIG. 48A is a side view of the hollow pole that can be inserted into FIG. 45A.

FIG. 48B is a top side view of the hollow pole that is in FIG. 48A.

FIG. 55A is a simple cube with male knobs.

FIG. 55B is a side profile view of the object that is FIG. 55A.

FIG. 56A is a curved corner piece that interfaces with four knobs on three of its sides.

FIG. 56B is a corner side view of the object that is FIG. 56A from a different angle.

FIG. 56C is a side profile view of the object that is FIG. 56A.

FIG. 56D is a bottom corner view of the object that is FIG. 56A.

FIG. 57A is similar to FIG. 56A except it is only a curved edge.

FIG. 57B is a side corner view of the object that is FIG. 57A from a different angle.

FIG. 57C is a top profile view of the object that is FIG. 57A.

FIG. 57D is a top corner view of the object that is FIG. 57A.

FIG. 58A is a cube with knobs.

FIG. 58B is a top corner view of the piece that is FIG. 58A.

Figure 58A:
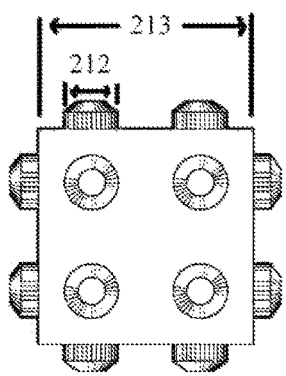
Figure 59A:
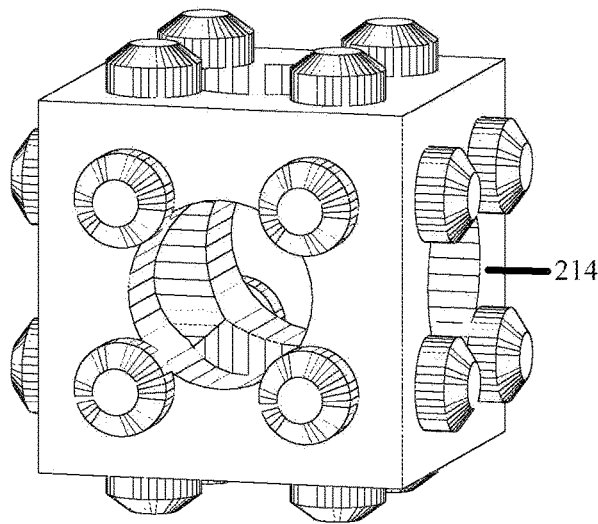

FIG. 59A is similar to FIG. 58A except it has a hole in the middle.

Figure 59B:
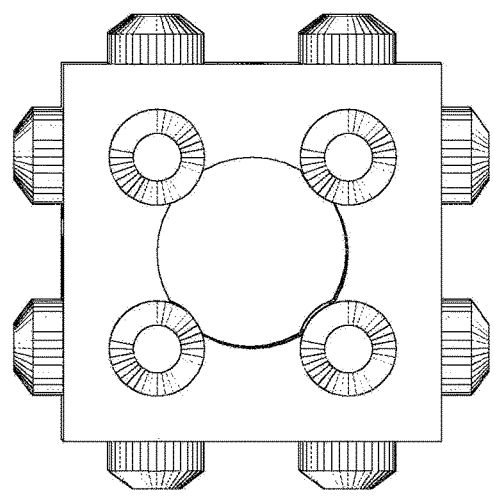

FIG. 59B is a side profile view of the object that is FIG. 59A.

Figure 60A:
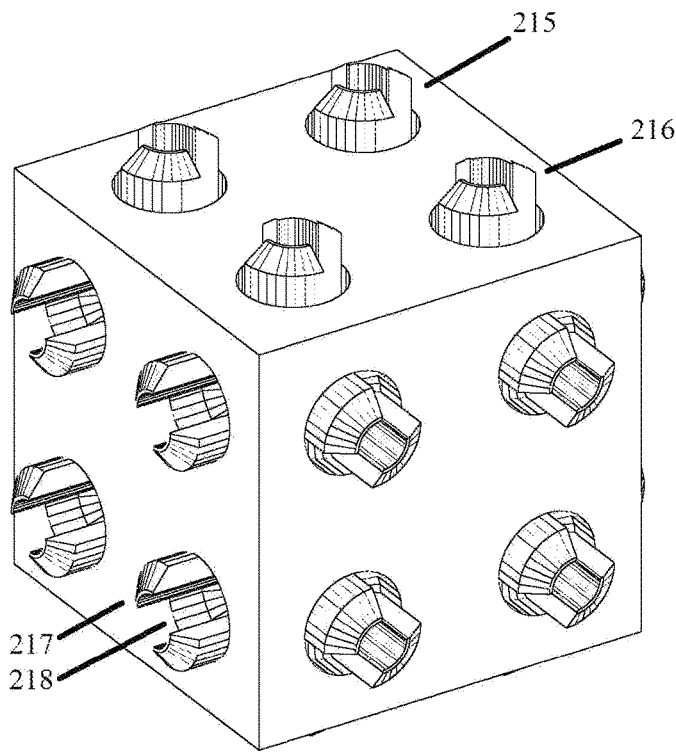

FIG. 60A is like FIG. 59A except it has reversible knobs.

Figure 60B:
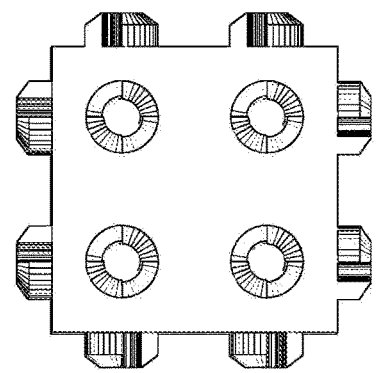

FIG. 60B is a side profile view of the object that is FIG. 60A.

Figure 60C:
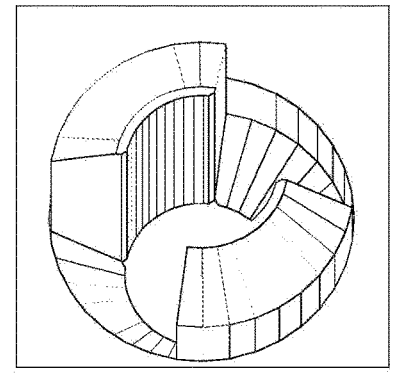

FIG. 60C is a close-up view of a reversible knob on FIG. 60A.

Figure 61A:
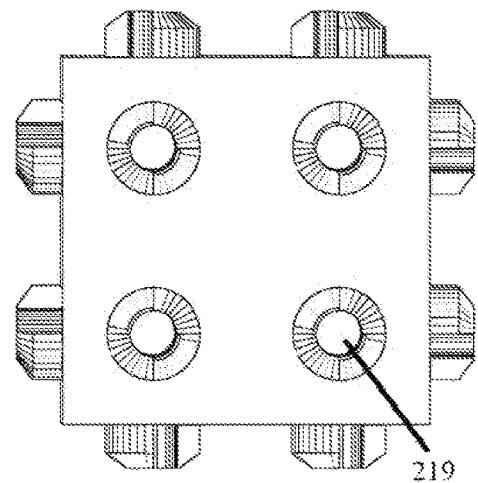

FIG. 61A is similar to FIG. 60A except it has hollow knobs.

Figure 61B:
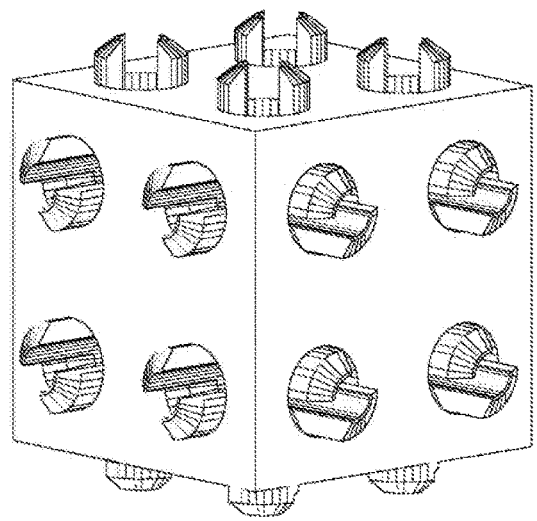

FIG. 61B is a side corner view of the object that is FIG. 61A.

Figure 62A:
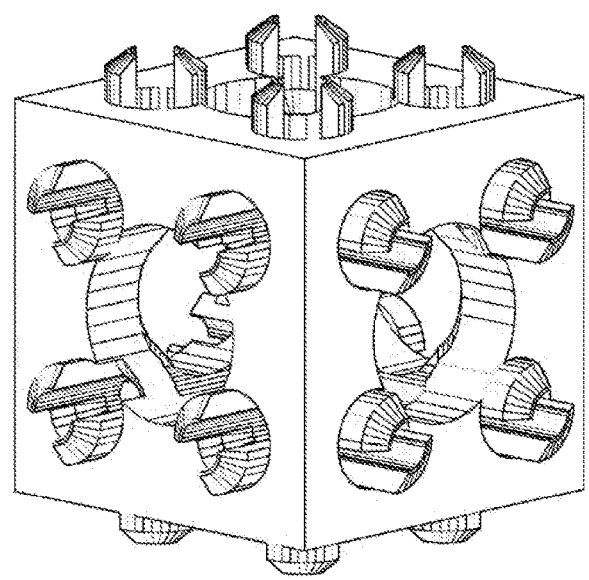

FIG. 62A is similar to FIG. 61A except it has large hollow circular openings.

Figure 62B:
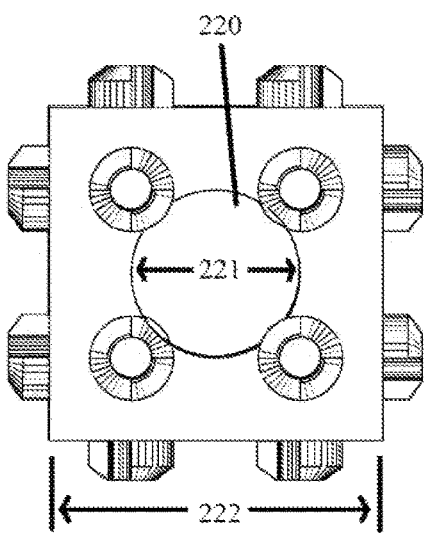

FIG. 62B is a side profile view of FIG. 62A.

Figure 55A:
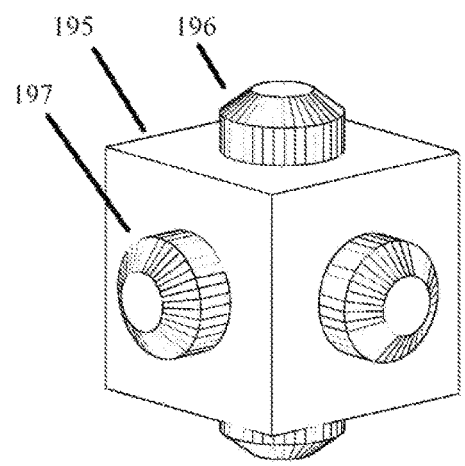

FIG. 63A is similar to FIG. 55A except it is two cubes fused together.

FIG. 63B is a side profile view of the object that is FIG. 63A.

FIG. 63C is a top corner view of the object that is FIG. 64B.

FIG. 64 is similar to FIG. 63A except it is four FIG. 55A cubes fused together.

FIG. 65A is a profile view of the object that is FIG. 65B.

FIG. 65B is similar to 59A except its knobs are in-set to allow for thicker panels and other objects to be affixed to them more easily.

FIG. 65C is a top corner view of the object that is FIG. 65B.

Figure 66A:
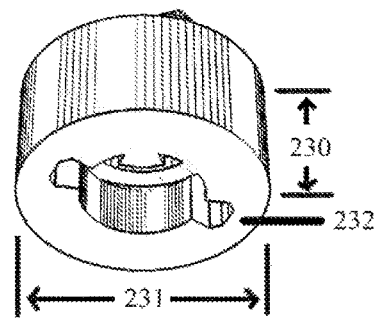

FIG. 66A is a cylinder shape with reversible knob/hooks.

Figure 66B:
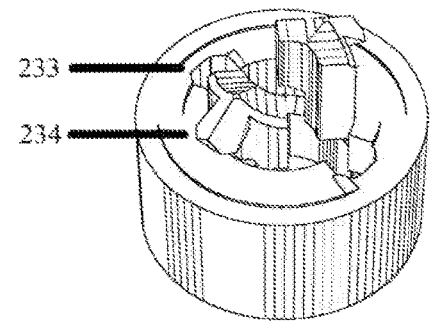

FIG. 66B is a top side view of the object that is FIG. 66A.

Figure 66C:
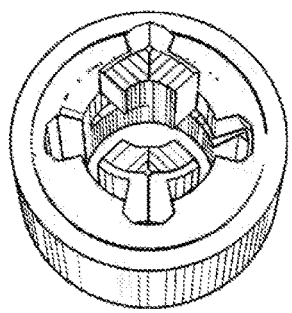

FIG. 66C is another top side view of the object that is FIG. 66A except from a different angle.

Figure 66D:
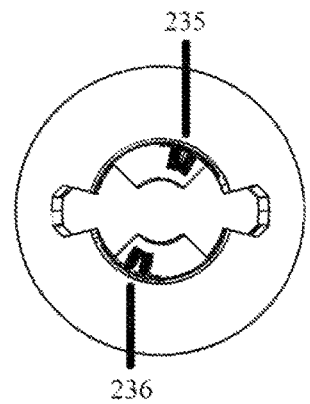

FIG. 66D is a profile view of the piece as seen from the bottom.

Figure 66E:
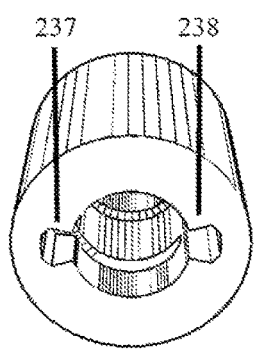

FIG. 66E is a hollow cylindrical piece with two female hook/knob interfaces.

Figure 66F:
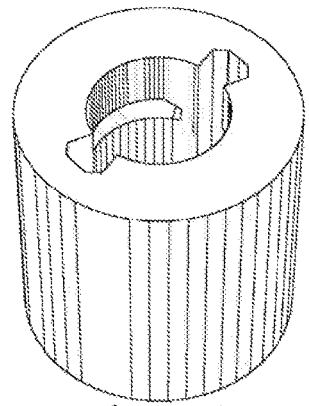

FIG. 66F is a top side view of the object that is FIG. 66E except from a different angle.

Figure 67A:
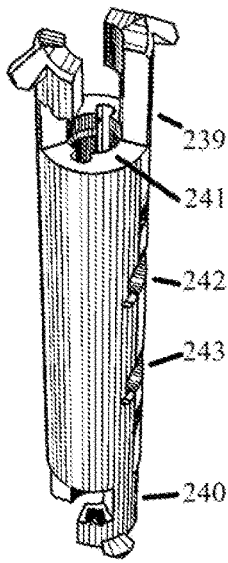

FIG. 67A is similar to FIG. 66B except the hooks on the ends of the cylinder hook onto themselves.

Figure 67B:
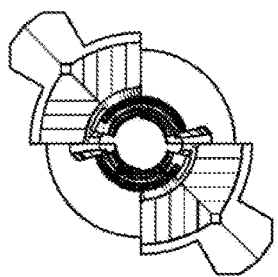

FIG. 67B is a top profile view of the object that is FIG. 67A.

Figure 67C:
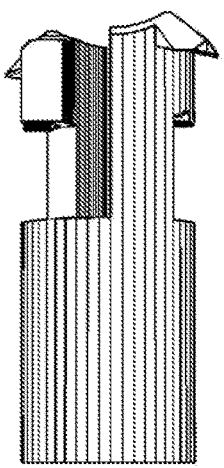

FIG. 67C is a side view of one of the ends of the object that is FIG. 67A.

Figure 67D:
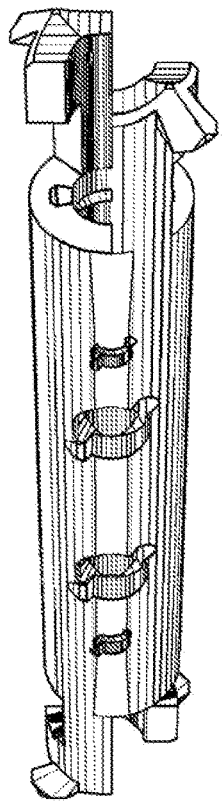

FIG. 67D is a side view of the object that is FIG. 67A except up closer and at a different angle.

Figure 68A:
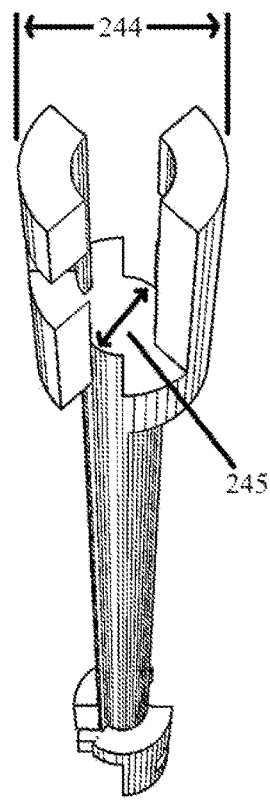

FIG. 68A is a pole with endings that are twice the diameter of the rest of the pole.

Figure 68B:
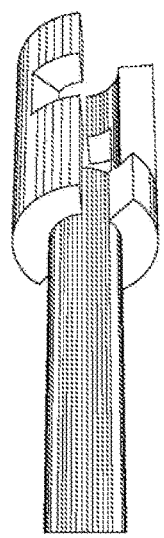

FIG. 68B is a view from the bottom, and at a different angle, of the hook on the object that is FIG. 68A.

Figure 68C:
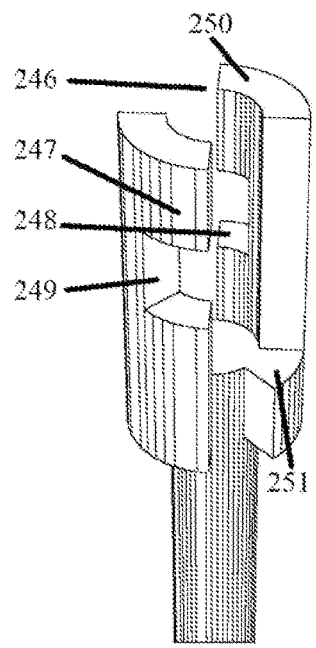

FIG. 68C is a view from the top side, and at a different angle, of the hook on the object that is FIG. 68A.

Figure 69A:
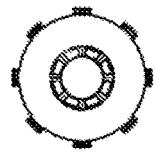
Figure 69B:
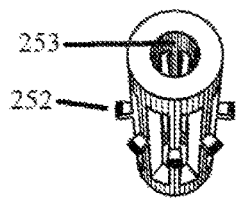

FIG. 69A is a top profile view of the object that is FIG. 69B.

FIG. 69B is a pole with teeth protruding in the middle.

Figure 69C:
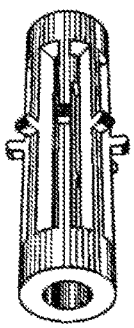

FIG. 69C is a bottom side view of the object that is FIG. 69B.

Figure 70A:
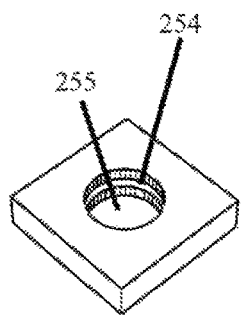

FIG. 70A is a square tile with a hollow center.

Figure 70B:
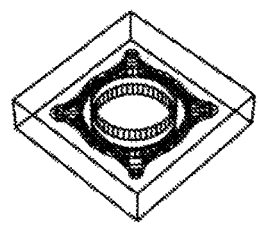

FIG. 70B is a wireframe view of the object that is FIG. 70A.

Figure 70C:
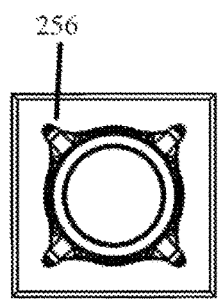

FIG. 70C is a top wireframe profile view of the object that is FIG. 70A.

Figure 71A:
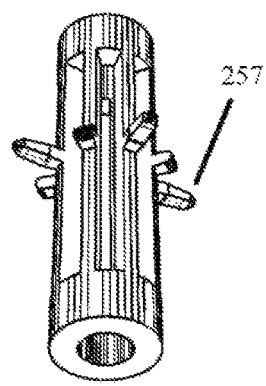

FIG. 71A is similar to FIG. 69B except four of the protruding teeth are longer.

Figure 71B:
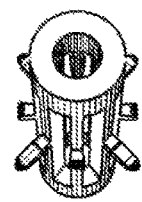

FIG. 71B is a top view of the object that is FIG. 71A.

Figure 71C:
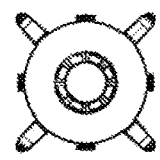

FIG. 71C is a top profile view of the object that is FIG. 71A.

Figure 72A:
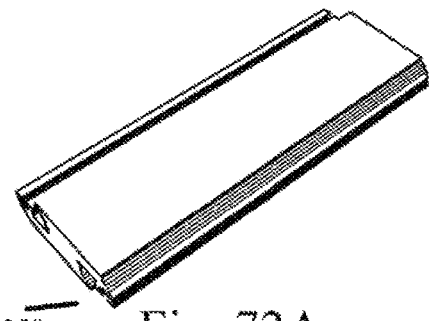

FIG. 72A is an interlocking panel with reversible hooks that can also snap together.

Figure 72B:
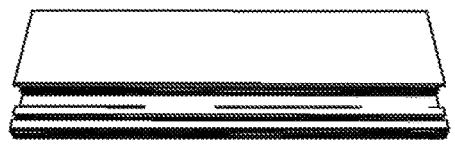

FIG. 72B is a side view of the panel that is FIG. 72A.

Figure 72C:
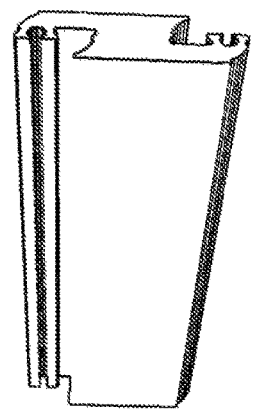

FIG. 72C is a bottom view of the panel that is FIG. 72A.

Figure 72D:
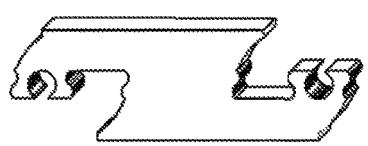

FIG. 72D is a view from an end of the object that is FIG. 72A.

Figure 72E:
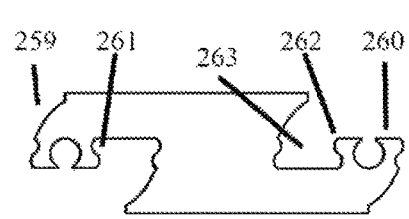

FIG. 72E is a profile view from an end of the object that is FIG. 72A.

Figure 73A:
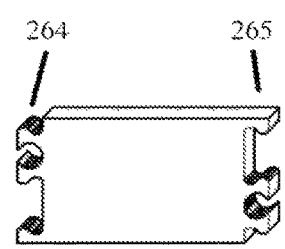

FIG. 73A is similar to FIG. 72A except the hooks and snaps on the sides are more compact.

Figure 73B:
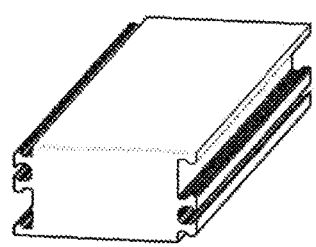

FIG. 73B is a top view at an angle of the panel that is FIG. 73A.

Figure 73C:
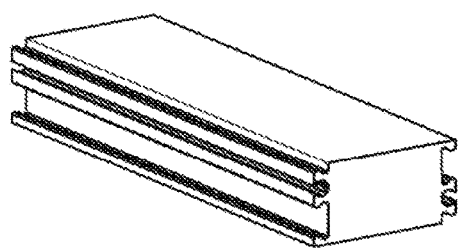

FIG. 73C is a top view from another angle of the panel that is FIG. 73A.

Figure 73D:
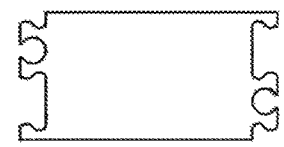

FIG. 73D is a profile view of an end of the panel that is FIG. 73A.

Figure 74A:
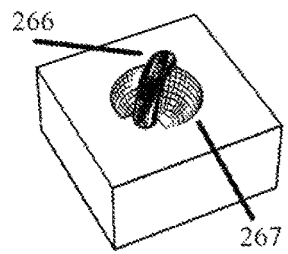

FIG. 74A is a reversible hook that protrudes out in a semicircle.

Figure 74B:
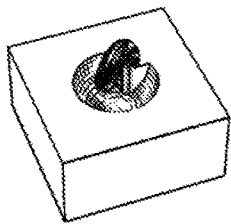

FIG. 74B is a top corner view from a different angle of the object that is FIG. 74A.

Figure 74C:
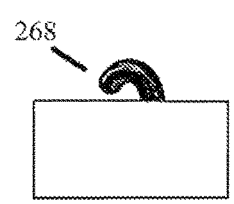

FIG. 74C is a side profile view of the object that is FIG. 74A.

Figure 74D:
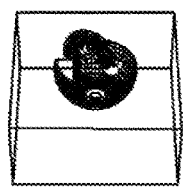

FIG. 74D is a top side wireframe view of the object that is FIG. 74A.

Figure 75A:
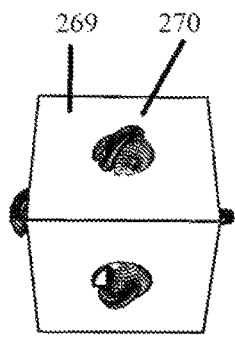

FIG. 75A is a cube with the FIG. 74A hook pattern around it so it can build walls and other structures.

Figure 75B:
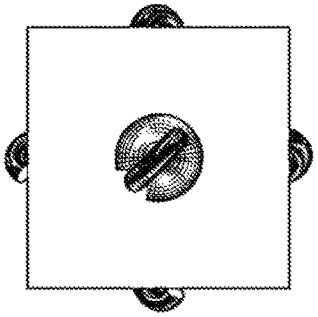

FIG. 75B is a side profile view of the object that is FIG. 75A.

Figure 75C:
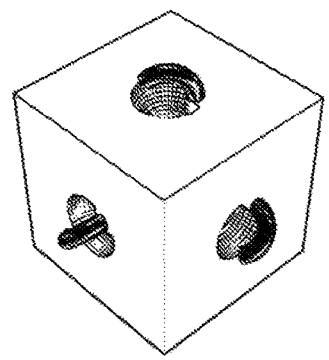

FIG. 75C is a top corner view of the object that is FIG. 75A.

Figure 76A:
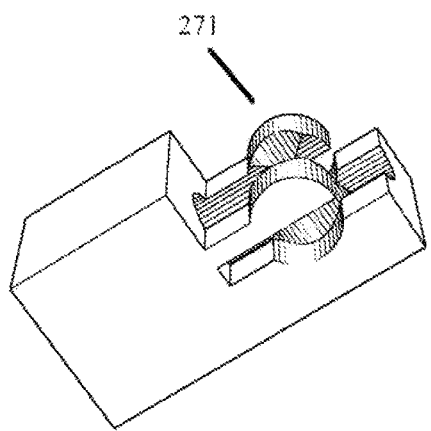

FIG. 76A is a hook pattern on the end of a beam that hooks together.

Figure 77A:
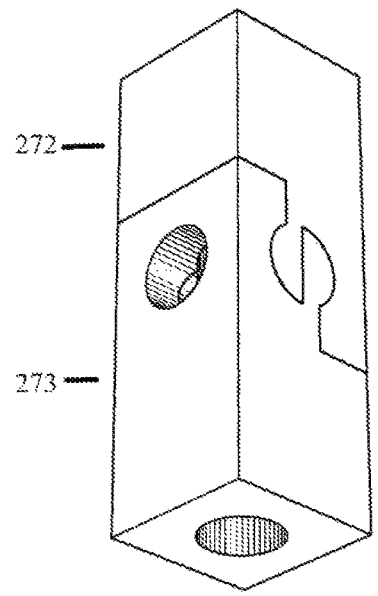

FIG. 77A is an example of how two pieces that are FIG. 76A fit together.

Figure 77B:
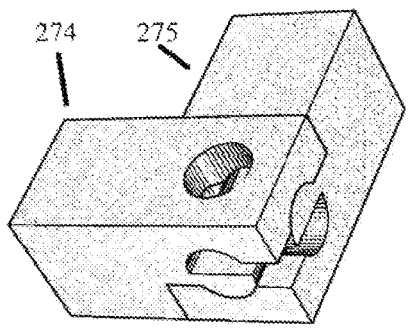

FIG. 77B is an example of how two pieces that are FIG. 76A fit together.

Figure 78A:
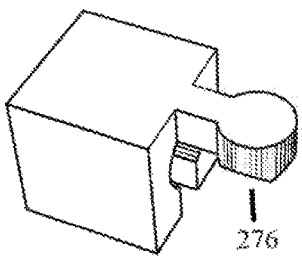

FIG. 78A is an example of a simple hook that follows the Invention's size conventions.

Figure 78B:
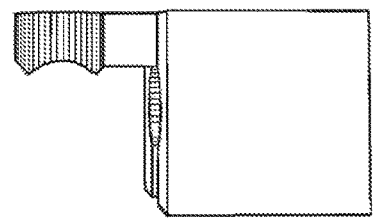

FIG. 78B is a side profile view of the object that is FIG. 78A.

Figure 78C:
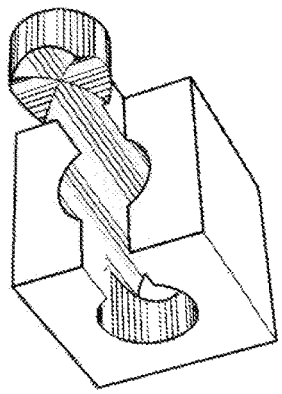

FIG. 78C is a bottom corner view of the object that is FIG. 78A.

Figure 78D:
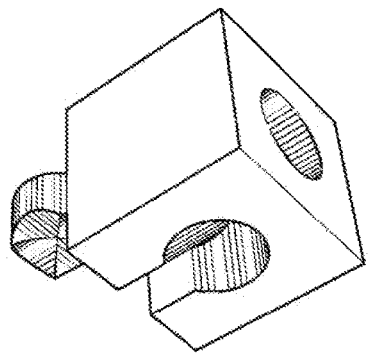

FIG. 78D is a bottom corner view from a different angle of the object that is FIG. 78A.

Figure 79A:
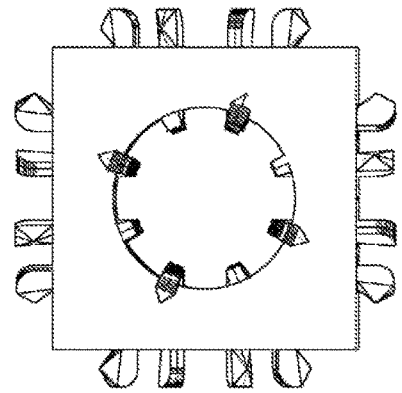
Figure 79B:
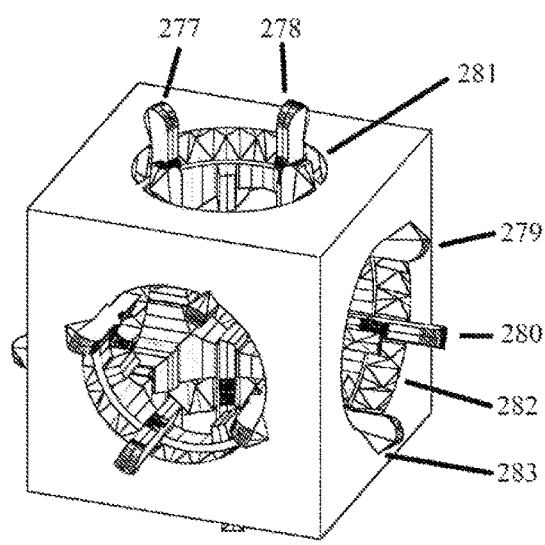

FIG. 79A is side profile view of the object that is FIG. 79B.

FIG. 79B is a cube with flexible teeth that bend inward from each of the holes on its sides.

Figure 79C:
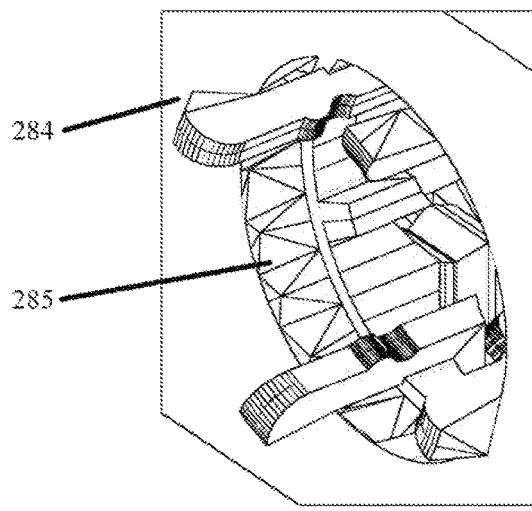

FIG. 79C is an up-close view of a side hole of the object that is FIG. 79A.

Figure 80A:
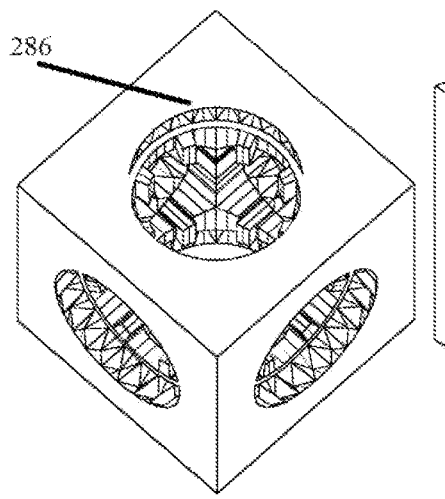

FIG. 80A is a cube with only female indented pyramids.

Figure 80B:
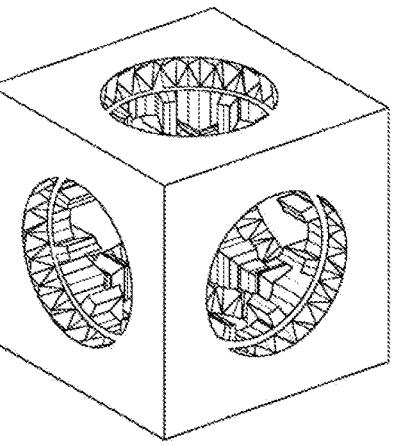

FIG. 80B is a corner view from a different angle of the object that is FIG. 80A.

Figure 80C:
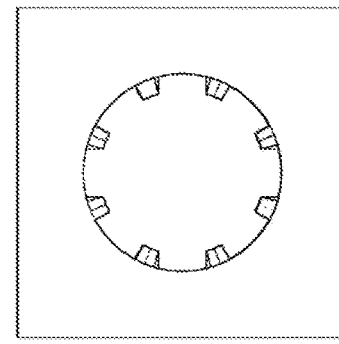

FIG. 80C is a side profile view of the object that is FIG. 80A.

Figure 81A:
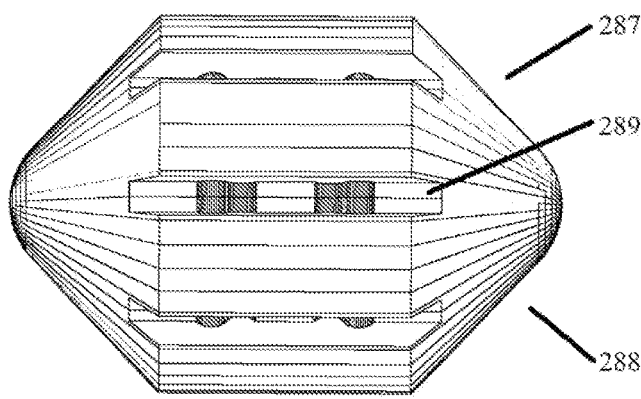
Figure 81B:
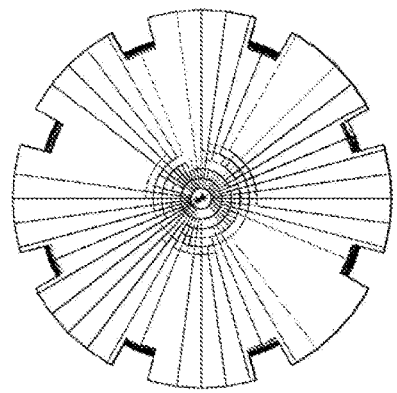
Figure 81C:
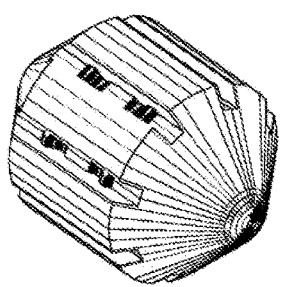

FIG. 81A is a side profile view of the object that is FIG. 81C.

FIG. 81B is a profile view from an end of the object that is FIG. 81C.

FIG. 81C is an example of a pole that can be inserted into FIG. 79A.

Figures 82, 83A, 83B:
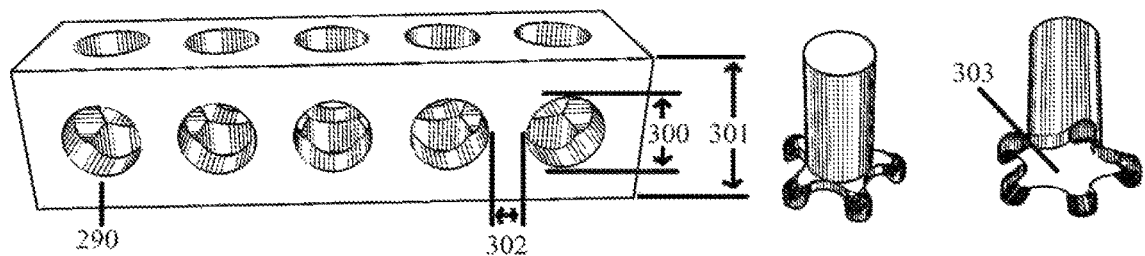

FIG. 82 is a beam with holes.

FIG. 83A is a basic form of gear.

FIG. 83B is a bottom side view of the object that is FIG. 83A.

Figures 83C, 83D, 84A, 84B:
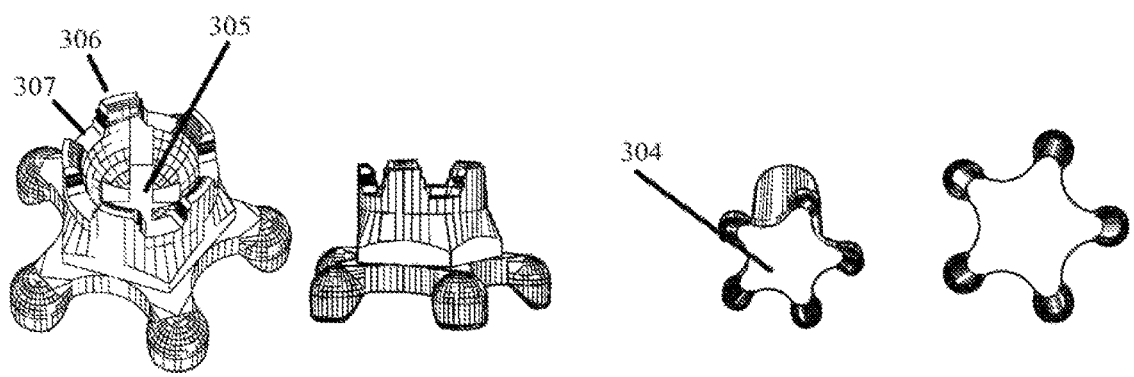

FIG. 83C is another bottom view, but from a different angle, of the object that is FIG. 83A.

FIG. 83D is a bottom profile view of the object that is FIG. 83A.

FIG. 84A is similar to FIG. 83A except it can be turned with a screwdriver.

FIG. 84B is a side view of the object that is FIG. 84A.

Figures 84C, 84D, 84E, 84F:
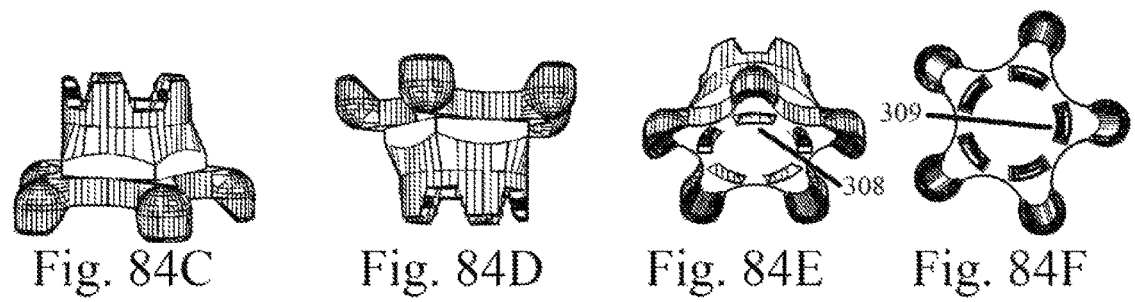

FIG. 84C is another side view, but from a different angle, of the object that is FIG. 84A.

FIG. 84D is an upside-down view of the object that is FIG. 84A.

FIG. 84E is a bottom side view of the object that is FIG. 84A.

FIG. 84F is a bottom profile view of the object that is FIG. 84A.

Figures 84G, 84H, 84I, 84J:
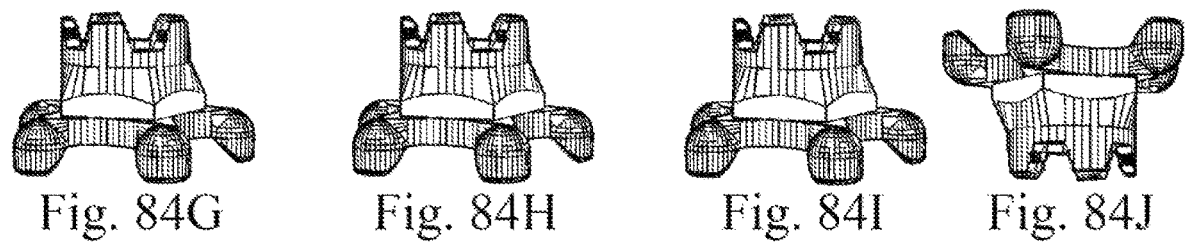

FIG. 84G is a side view, from a different angle, of the object that is FIG. 84A.

FIG. 84H is a side view, from a different angle, of the object that is FIG. 84A.

FIG. 84I is a side view, from a different angle, of the object that is FIG. 84A.

FIG. 84J is an upside-down view, from a different angle, of the object that is FIG. 84A.

FIG. 85A is similar to FIG. 84A except it has a higher leverage ratio between the width of the center shaft and the outer radius of the gear.

FIG. 85B is a top view, from a different angle, of the object that is FIG. 85A.

FIG. 85C is a bottom view from the side of the object that is FIG. 85A.

FIG. 85D is a bottom profile view of the object that is FIG. 85A.

FIG. 86A through 86E is a hollow gear that can turn.

FIG. 86A is a top profile view of the object that is FIG. 86B.

FIG. 86B is a hollow gear that can turn.

FIG. 86C is a top side view, from a different angle, of the object that is FIG. 86B.

FIG. 86D is a top side view, from a different angle, of the object that is FIG. 86B.

FIG. 86E is a bottom side view of the object that is FIG. 86B.

FIGS. 86F and 86G are similar to FIG. 86A through 86E except the gears are more leveraged and they have a solid center.

FIG. 86F is similar to FIG. 86A through 86E except the gears are more leveraged and they have a solid center.

FIG. 86G is similar to FIG. 86A through 86E except the gears are more leveraged and they have a solid center.

FIG. 87A is similar to FIG. 86A through 86E except FIG. 87A is a gear with greater leverage.

FIG. 87B is a bottom side view of the object that is FIG. 87A.

Figure 88A:
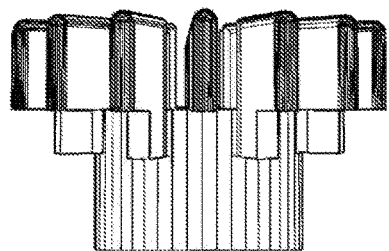
Figure 88B:
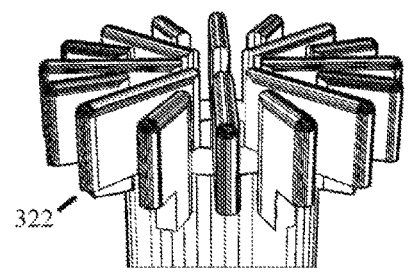

FIG. 88A is a side profile view of the object that is FIG. 88B.

FIG. 88B is similar to FIG. 86A through 86E except it has even more leverage. FIG. 88A can fit into FIGS. 86A and 87A.

Figure 88C:
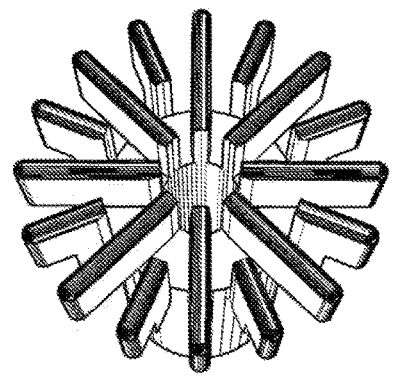

FIG. 88C is a top side view, from a different angle, of the object that is FIG. 88B.

Figure 89:
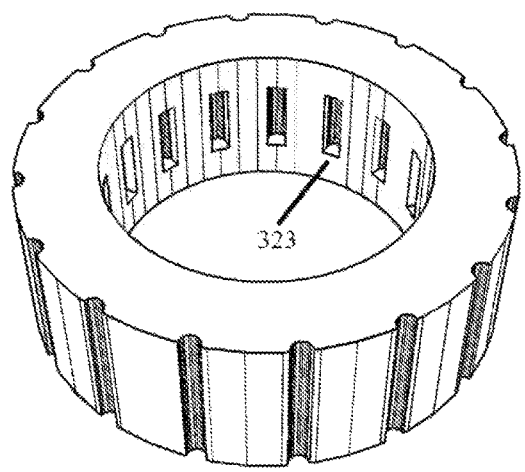

FIG. 89 is a tire that, when made with flexible material, can be placed on FIG. 88B.

Figure 90A:
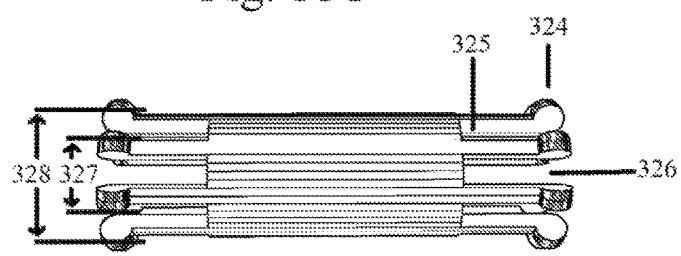
Figure 90B:
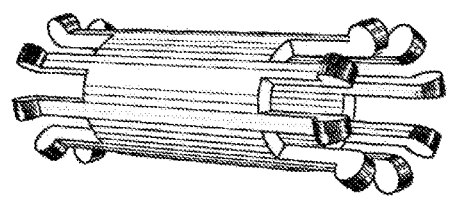

FIG. 90A is a profile view of the object that is FIG. 90B.

FIG. 90B is a pole that can unite, or strengthen, Invention blocks.

Figure 90C:
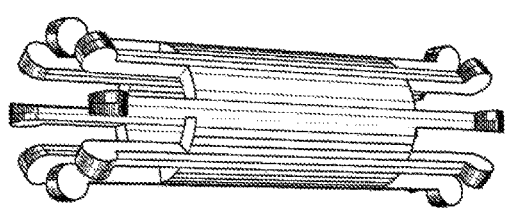

FIG. 90C is a side view, but form a different angle, of the object that is FIG. 90B.

Figure 91A:
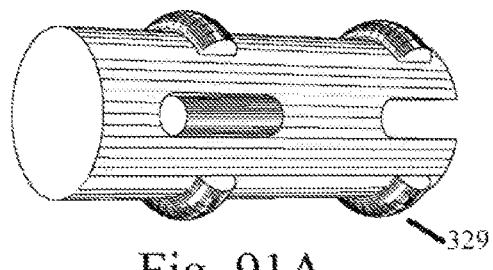

FIG. 91A is a simple pole with protruding bumps.

Figure 91B:
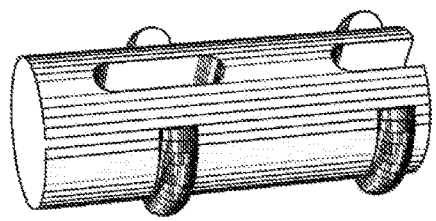

FIG. 91B is a side view, but from a different angle, of the object that is FIG. 91A.

Figure 91C:
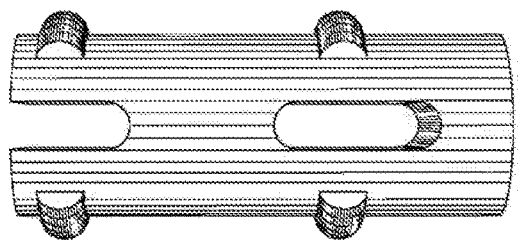

FIG. 91C is a side profile view of the object that is FIG. 91A.

Figure 92A:
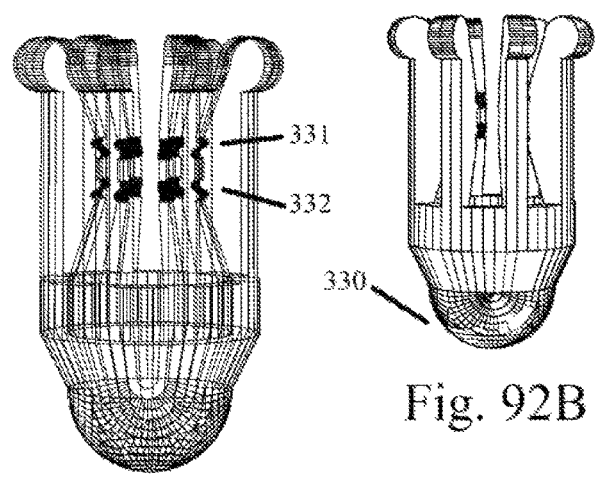
Figure 92B:
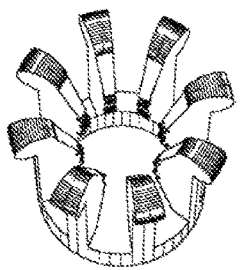

FIG. 92A is a profile wireframe view from the side of the object that is FIG. 92B.

FIG. 92B is similar to FIG. 90B except one end of the pole is round.

Figures 92C, 92D:
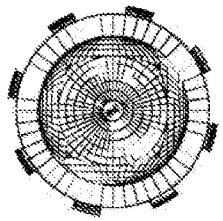

FIG. 92C is a bottom side view of the object that is FIG. 92B.

FIG. 92D is a top profile view of the object that is FIG. 92B.

Figure 92E:
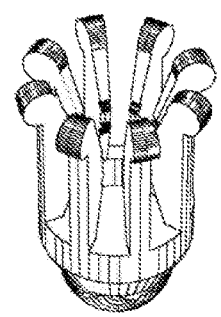

FIG. 92E is a side view from the bottom, but from a different angle, of the object that is FIG. 92B.

FIG. 93A is a simple plug.

FIG. 93B is a side view of the object that is FIG. 93A.

FIG. 93C is a top profile view of the object that is FIG. 93A.

FIG. 93D is a view from a side angle of the object that is FIG. 93A.

FIG. 93E is a view from another side angle of the object that is FIG. 93A.

FIG. 94A works like FIG. 93A except it secures two pieces together.

FIG. 94B is a view from a top and side angle of the object that is FIG. 94A.

FIG. 94C is a view from the top of the object that is FIG. 94A.

FIG. 94D is a side angle of the object that is FIG. 94A.

FIG. 94E is a profile view from the top of the object that is FIG. 94A.

Figure 95A:
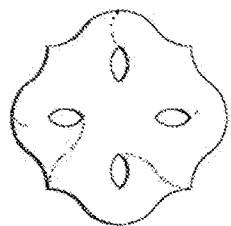
Figure 95B:
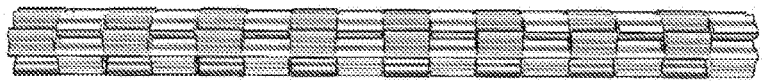
Figure 95C:
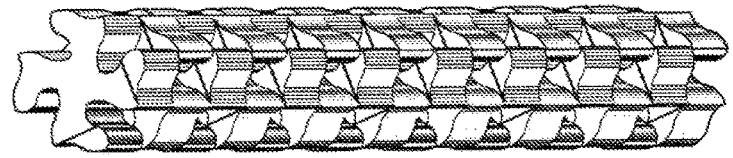
Figure 95D:
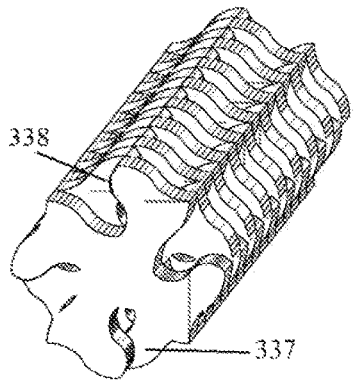

FIG. 95A is a profile view of the end of the object that is FIG. 95D.

FIG. 95B is a profile side view of the object that is FIG. 95D.

FIG. 95C is a side view of the object that is FIG. 95D.

FIG. 95D is a beam made up of a compact assembly of reversible "s" snap interfaces.

Figure 95E:

FIG. 95E is a side view from another angle of the object that is FIG. 95D.

Figure 96A:
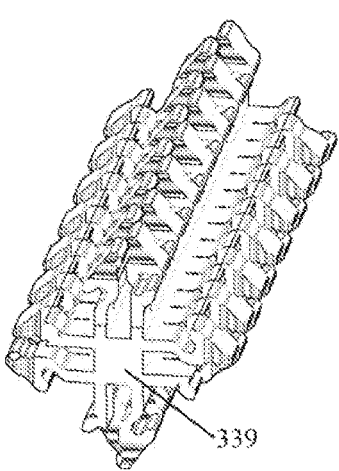

FIG. 96A is an assembly of reversible "s" snaps similar to FIG. 95D.

Figures 96B, 96C:
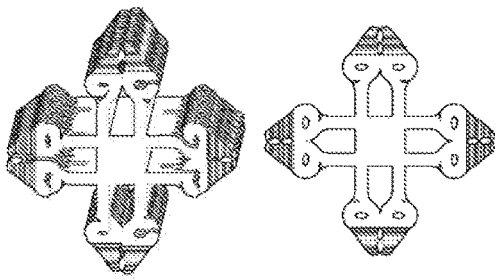

FIG. 96B is a view from one end of the object that is FIG. 96A.

FIG. 96C is a profile view of the end of the object that is FIG. 96A.

Figure 96D:
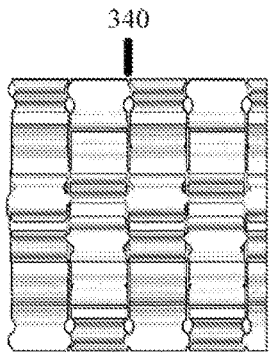

FIG. 96D is a view from the side of the end of the object that is FIG. % A.

Figure 96E:
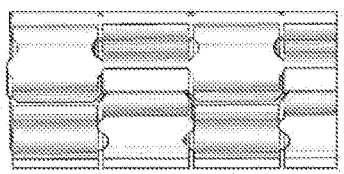

FIG. 96E is an up-close view of the protruding side of the object that is FIG. 96A.

Figure 97A:
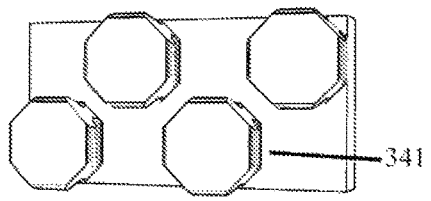

FIG. 97A is a checkered pattern with reversible "s" snaps on the edges.

Figures 97B, 97C:
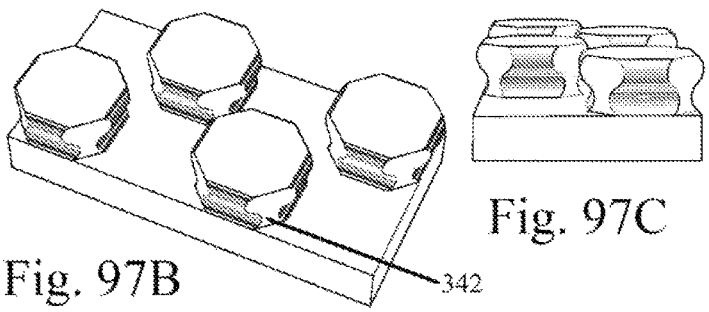

FIG. 97B is a view from the top corner of the object that is FIG. 97A.

FIG. 97C is a view from the side end of the object that is FIG. 97A.

Figure 98A:
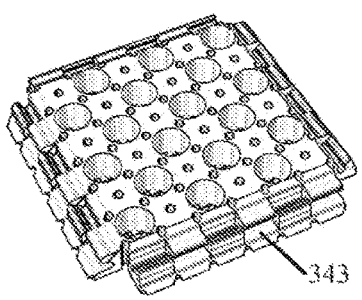

FIG. 98A is an example of how the reversible "s" snap interface can be placed on the slanted sides of a panel.

Figure 98B:
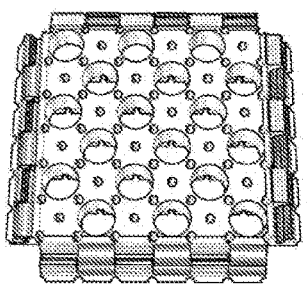

FIG. 98B is a top side view of the object that is FIG. 98A.

Figure 98C:
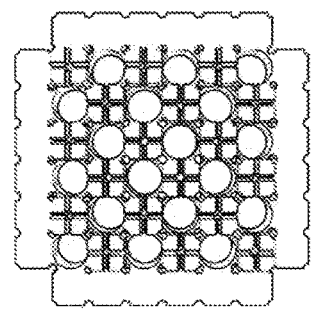

FIG. 98C is a profile view from the bottom of the object that is FIG. 98A.

Figure 98D:
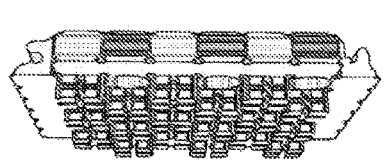

FIG. 98D is a view from the bottom side of the object that is FIG. 98A.

Figure 98E:
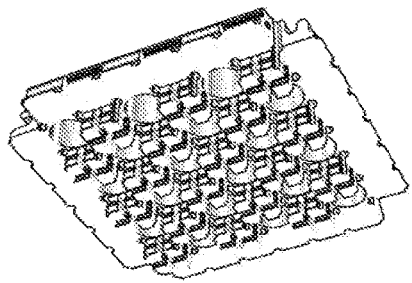

FIG. 98E is a view from a bottom corner of the object that is FIG. 98A.

Figure 99:
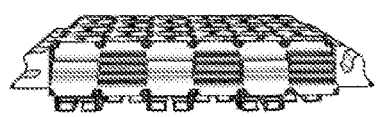

FIG. 99 is a view from the top side of the object that is FIG. 98A but at a lower angle than that of FIG. 98B.

Figure 100A:
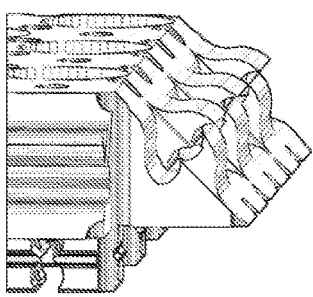

FIG. 100A is a demonstration of how the "s" snap configuration on FIG. 98A can be altered to be built with rigid materials.

Figure 100B:
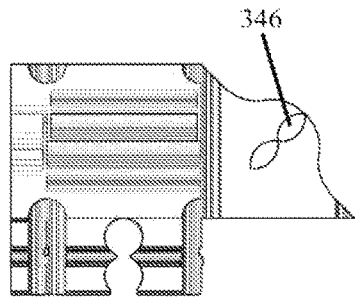

FIG. 100B is a profile view of the part of the object shown in FIG. 100A.

Figure 100C:
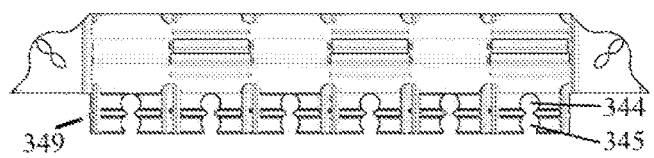

FIG. 100C is a profile view from the side of the entire object, a portion of which is shown in FIG. 100A.

Figure 101A:
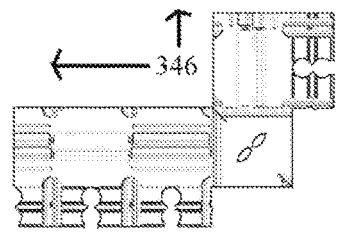

FIG. 101A is a demonstration of how two pieces that are FIG. 100A fit together securely when assembled at perpendicular degrees.

Figure 101B:
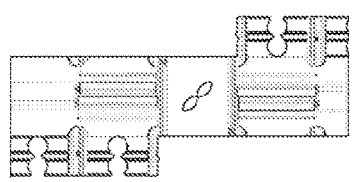

FIG. 101B is a demonstration of how two pieces that are FIG. 100A fit together securely when assembled horizontally.

Figure 102A:
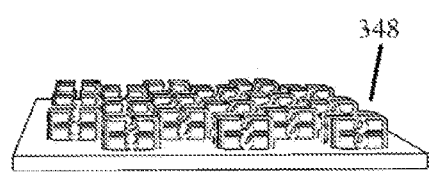

FIG. 102A is a simple panel, without slanted sides, that has the interlocking cubes that can be seen on the bottom of FIG. 100C.

Figure 102B:
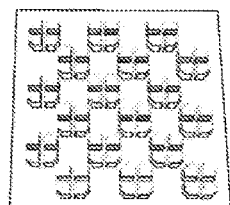

FIG. 102B is a view from the top of the object that is FIG. 102A.

Figure 103A:
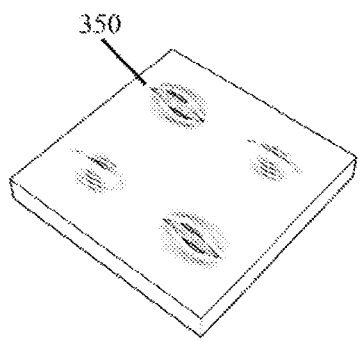

FIG. 103A is a reversible "s" snap that looks like a dimple. This allows it to be placed on surfaces to also give traction and to be an artistic pattern.

Figure 103B:
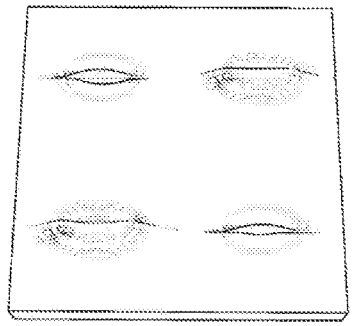

FIG. 103B is a side view from the top of the object that is FIG. 103A.

Figure 103C:
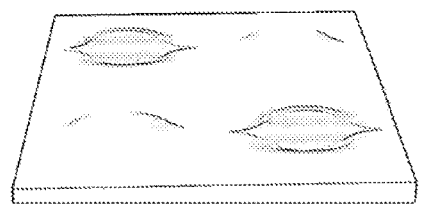

FIG. 103C is a side view from the top, but at a lower angle, of the object that is FIG. 103A.

Figure 103D:
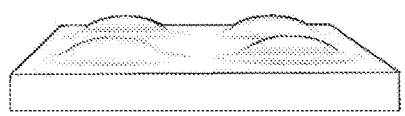

FIG. 103D is a view from the side, but at an even lower angle, of the object that is FIG. 103A.

FIG. 104A is similar to FIG. 103A except the protruding "dimple" is more pronounced and is narrower.

FIG. 104B is a view from the top of the object that is FIG. 104A.

FIG. 104C is a view from the top corner of the object that is FIG. 104A.

FIG. 105A is a view of the top part of the object that is FIG. 105B.

FIG. 105B is a view from the top and one side of the object that is FIG. 104B.

FIG. 105C is similar to FIG. 104A except FIG. 105A has different arrangements of the protrusions.

FIG. 105D is a view from the bottom of the object that is FIG. 105C.

FIG. 106A is similar to FIG. 104A except FIG. 106A has different arrangements of the protrusions.

FIG. 106B is a view from the top corner of the object that is FIG. 106A.

FIG. 106C is a view from the bottom of the object that is FIG. 106A.

Figure 107A:
Figure 107B:
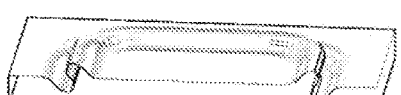
Figure 107C:
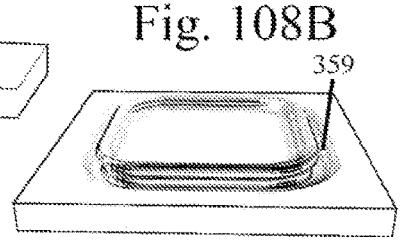

FIG. 107A is a wireframe profile view from the side of the object that is FIG. 107C.

FIG. 107B is a cutout side view from the top of the object that is FIG. 107C.

Figure 108A:
Figure 108B:
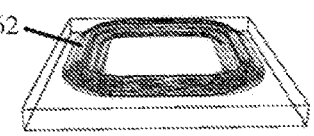
Figure 108C:
Figure 108D:
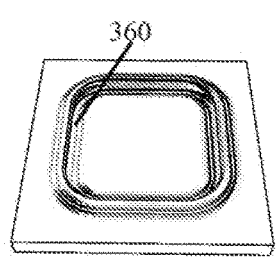

FIG. 107C is a square male "s" snap interface on a flat surface that fits into the female "s" snap interface at FIG. 108D.

Figure 107D:
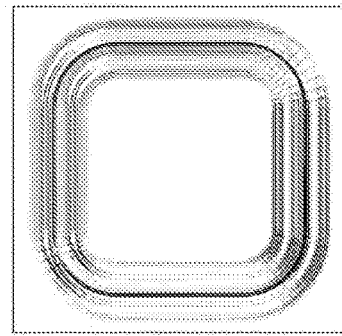

FIG. 107D is a close-up view from the top of FIG. 107C.

FIG. 108A is a cutout view from the side profile of the object that is shown in FIG. 108B FIG. 108B is a female "s" snap interface on a flat surface that fits into the male "s" snap interface at FIG. 107C.

FIG. 108C is a cutout view from the top side of the object that is FIG. 108B.

FIG. 108D is a solid view of FIG. 108B.

Figure 109A:
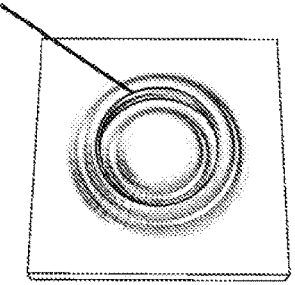
Figure 110A:
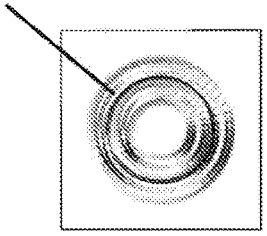

FIG. 109A is a round female "s" snap interface similar to FIG. 108A that fits into FIG. 110A.

Figure 109B:
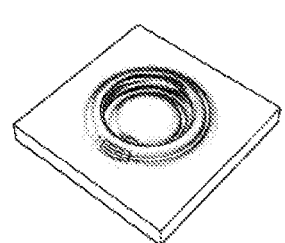

FIG. 109B is a top corner view of the object that is in FIG. 109A.

Figure 109C:
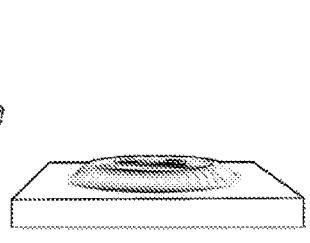

FIG. 109C is a view from the side of the object that is FIG. 109A.

FIG. 110A is a profile view from the top of an object with a round "s" snap male interface that fits into the object in FIG. 109A.

Figure 110B:

FIG. 110B is a side view from the top of the object that is FIG. 110A.

FIG. 10C is a side view of FIG. 110A.

Figure 111A:
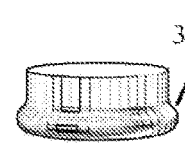

FIG. 111A is a simple knob with a male "s" snap ending that can fit into FIG. 109A.

Figure 111B:
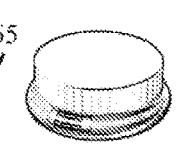

FIG. 111B is a view from the side and at a different angle of the object in FIG. 111A.

Figure 111C:
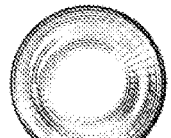

FIG. 111C is a view from the "s" snap male top of the piece that is FIG. 111A.

Figure 111D:
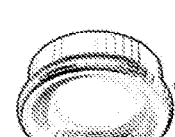

FIG. 111D is a view from the side of the "s" snap top of the piece that is FIG. 111A.

FIG. 112A is a profile view from the side of the object that is FIG. 112C.

FIG. 112B is a profile view from the top of the object that is FIG. 112C.

FIG. 112C is a combination of the male and female "s" snap interfaces in FIGS. 107A through 111A.

FIG. 112D is a view from the top side of the object that is FIG. 112C.

FIG. 112E is a view from the top corner of the object that is FIG. 112C.

FIG. 113A is a side profile view of the object that is FIG. 113C.

FIG. 113B is a top profile view of the object that is FIG. 113C.

FIG. 113C is similar to FIG. 112C except the female side protrudes out.

FIG. 113D is a view from the top side of the object that is FIG. 113C.

FIG. 113E is another view of FIG. 112D.

Figure 114A:
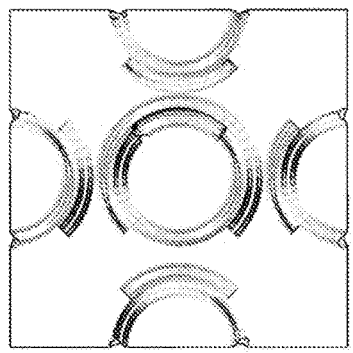
Figure 114B:
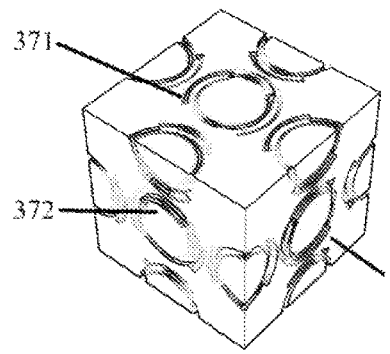

FIG. 114A is a profile view from the side of the object that is FIG. 114B.

FIG. 114B is similar to FIG. 112C except the interfaces are on the sides of cubes.

Figure 114C:
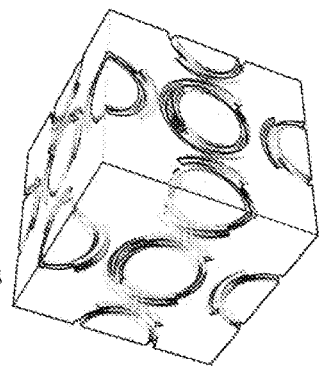

FIG. 114C is a view from the top corner of the object that is FIG. 114B.

Figure 114D:
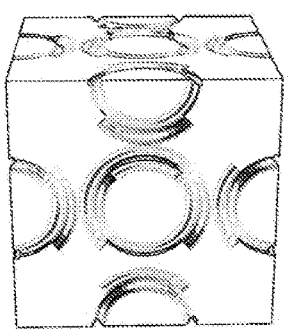

FIG. 114D is a view from the top side of the object that is FIG. 114B.

Figure 115A:
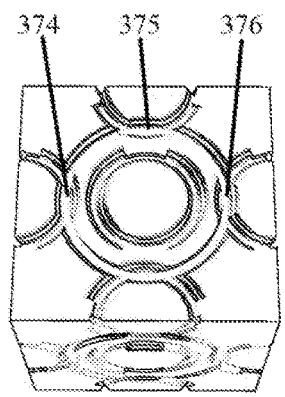

FIG. 115A is similar to FIG. 114B except it has more recessed places.

Figure 115B:
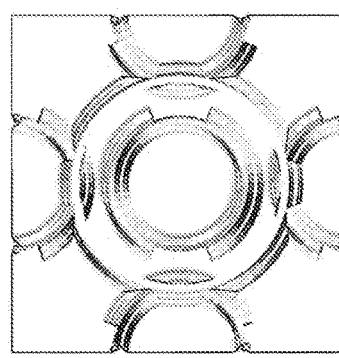

FIG. 115B is a side profile view of the object that is FIG. 115A.

Figure 115C:
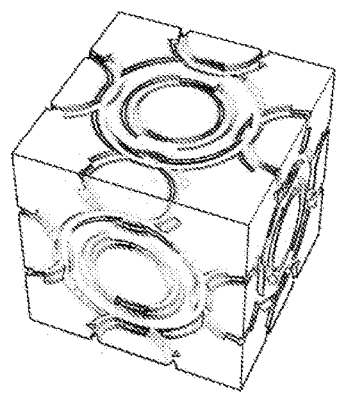

FIG. 115C is a top corner view of the object that is FIG. 115A.

Figure 115D:
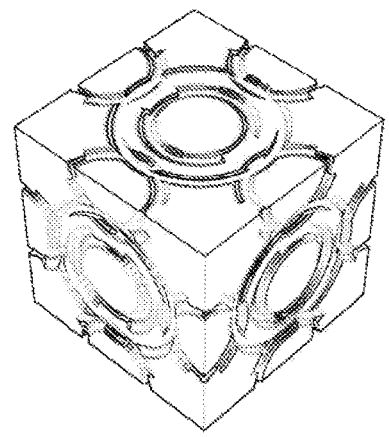

FIG. 115D is a top corner view, from a different angle, of the object that is FIG. 115A.

Figure 116A:
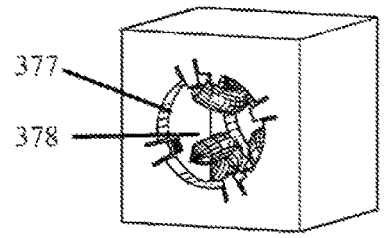

FIG. 116A is a geometry that allows for semi-rigid materials to bend slightly.

Figure 116B:
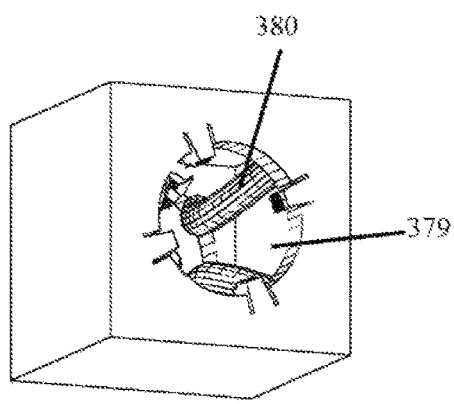

FIG. 116B is a view from a bottom corner of the object that is FIG. 116A.

Figure 116C:
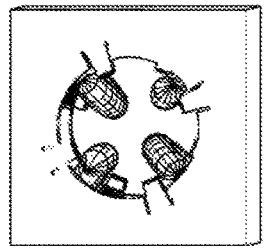

FIG. 116C is a view from an end of the object that is FIG. 116A.

Figure 116D:
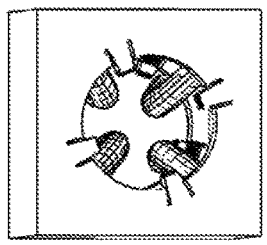

FIG. 116D is a view from a side angle of the object that is FIG. 116A.

Figure 116E:
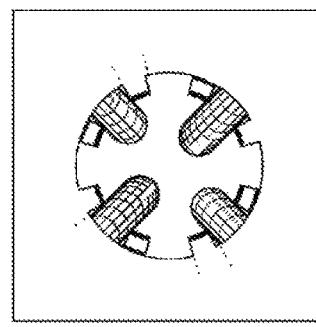

FIG. 116E is a profile view of the end of the object that is FIG. 116A.

Figure 117A:
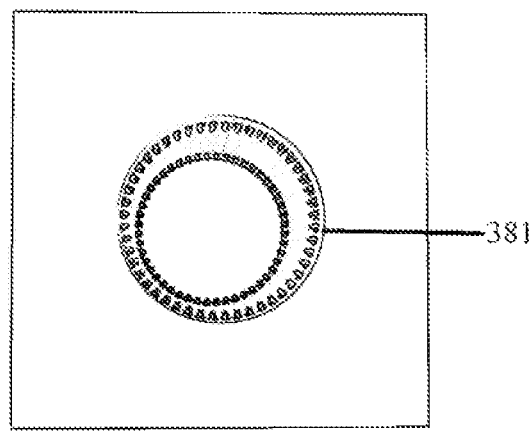

FIG. 117A has the bent tubes of FIG. 116A arranged in a manner that allows FIG. 117A to hold poles.

Figure 117B:
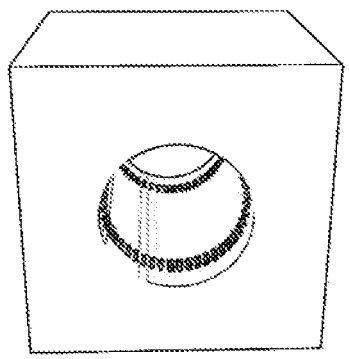

FIG. 117B is a view from the top side of the object that is FIG. 117A.

Figure 117C:
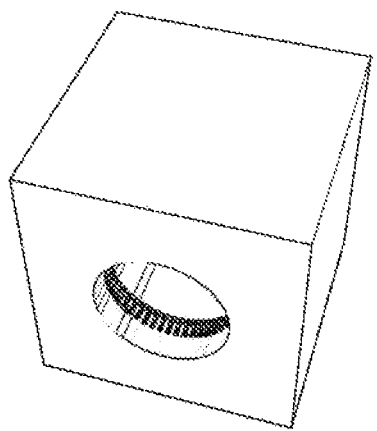

FIG. 117C is a view from atop corner of the object that is FIG. 117A.

Figure 118A:
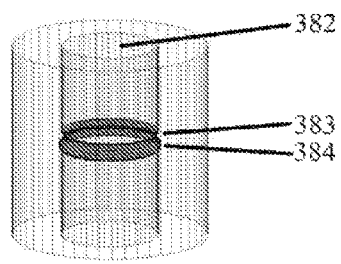

FIG. 118A is a simple hollow cylinder with a simple "s" snap interface that protrudes and that recedes.

Figure 118B:
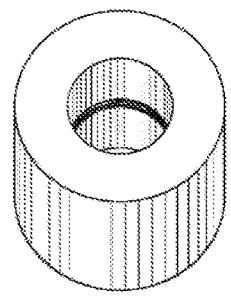

FIG. 118B is a solid view from the top side of the object that is FIG. 118A.

Figure 119A:
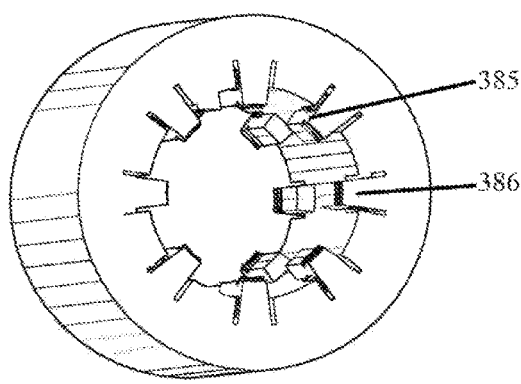

FIG. 119A has "s" snaps on its inside and has "teeth" that allow shafts of two different sizes to be inserted.

Figure 119B:
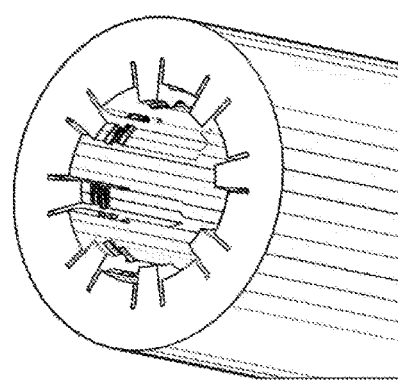

FIG. 119B is a view from a side corner of the object that is FIG. 119A.

Figure 120A:
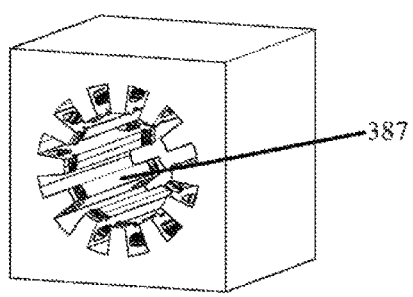

FIG. 120A is similar to FIG. 119A except it is a cube and not a cylinder and its inner teeth go across the entire piece.

Figure 120B:
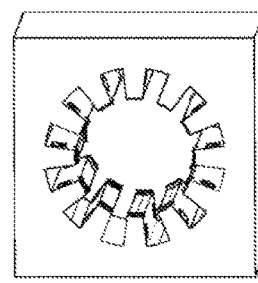

FIG. 120B is a view from the front of the object that is FIG. 120A.

FIG. 121A is a hollow knob that fits into itself with "s" snaps on its ends.

FIG. 121B is a view from the top and one side of the object that is FIG. 121A but from a different angle.

FIG. 121C is a view from the top and one side, but at a slightly different angle, of the object that is FIG. 121A.

FIG. 121D is aside view of FIG. 121A.

FIG. 122A fits into FIG. 118A. FIG. 122A is locked with a pole or sphere inserted into its hollow shaft.

FIG. 122B is a view from the top side of the object that is FIG. 122A.

FIG. 122C is a view from the top side, but at a lower angle, of the object that is FIG. 122A.

FIG. 123A has a checkered "s" snap male pattern that can fit between a corresponding female checkered pattern that is on FIG. 124A.

FIG. 123B is a view from a top side of the object that is FIG. 123A.

FIG. 123C is a profile view from the side of the object that is FIG. 123A.

FIG. 124A is a female piece into which the male FIG. 123A inserts and snaps into.

FIG. 124B is a view from the top corner of the object that is FIG. 124A.

FIG. 124C is a wireframe view from the side of the object that is FIG. 124A.

FIG. 125A is a skeletal pole that uses "s" snaps in every direction of its protruding parts to increase its versatility.

FIG. 125B is a top side view of the object that is FIG. 125A but from a different angle.

FIG. 125C is a view from the side of the object that is FIG. 125A.

FIG. 125D is a view from the bottom side of the object that is FIG. 125A.

FIG. 125E is a view from the bottom of the object that is FIG. 125A.

FIG. 125F is a profile view from the bottom of the object that is FIG. 125A.

FIG. 126A is a combination of hooks and snaps that use "s" configurations on the perimeter of circles.

FIG. 126B is a top corner view, from a different angle, of the object that is FIG. 126A.

FIG. 126C is a view from the bottom corner angle of the object that is FIG. 126A.

FIG. 126D is an up-close view of the circular "s" snaps at the center of the sides of the object that is FIG. 126A.

FIG. 126E is a view from the side of the object that is FIG. 126A.

FIG. 126F is a near-profile view from the side of the object that is FIG. 126A.

FIG. 127A is a pole that has the interface of FIG. 126D on its ends.

FIG. 127B is a close-up view of the end of the object that is FIG. 127B.

FIG. 127C is a side view from a corner of the object that is FIG. 127A.

Figure 127D:
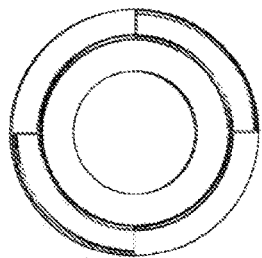

FIG. 127D is a profile view of the end of the object that is FIG. 127A.

Figure 128A:
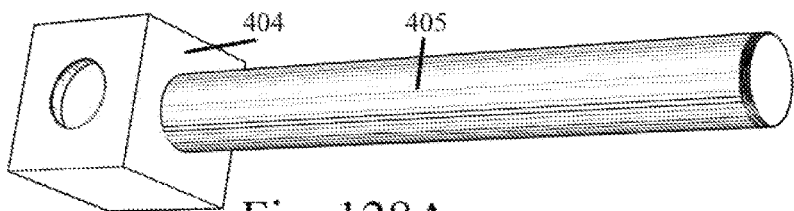

FIG. 128A is a combination of cube and pole similar to how FIG. 126A would assemble with FIG. 127A, except it does not have hooks.

Figure 128B:
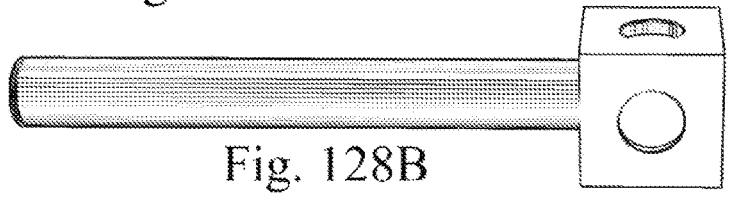

FIG. 128B is a different view from the side of the object that is FIG. 128A.

Figure 128C:
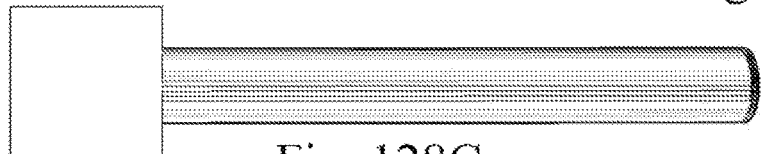

FIG. 128C is a side profile view of the object that is FIG. 128A.

Figure 129B:
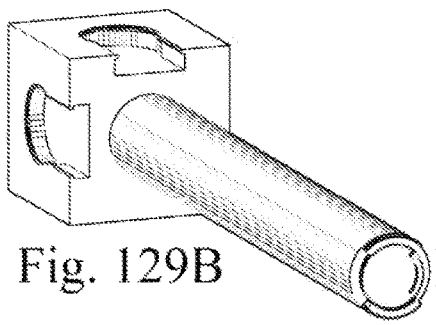
Figure 129C:
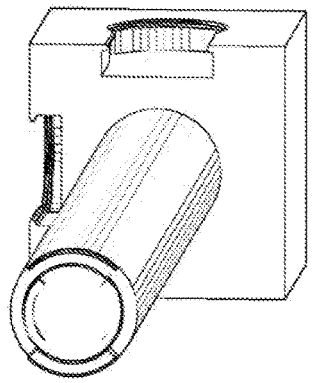
Figure 129A:
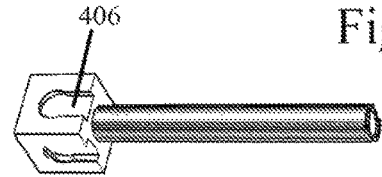

FIG. 129A is similar to FIG. 128A except FIG. 129A can hook together.

FIG. 129B is a view of the object that is FIG. 129A from a corner angle.

FIB. 129C is a view from the front of the object that is FIG. 129A.

Figure 130A:
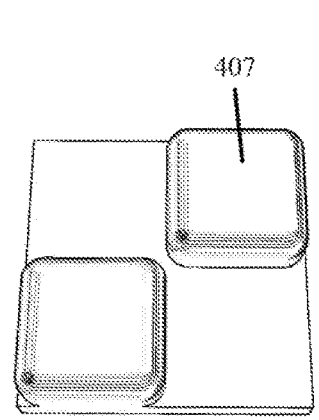
Figure 129D:
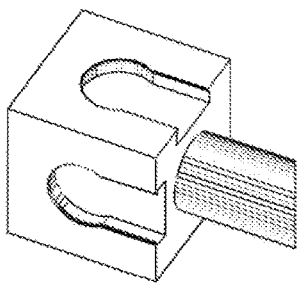

FIG. 130A is a reversible checkered pattern that is a simpler version of FIG. 97A.

Figure 130B:
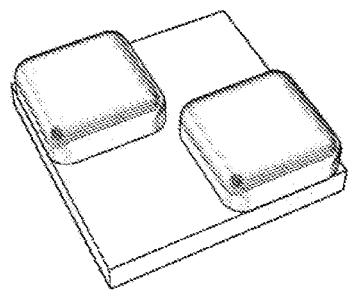

FIG. 130B is a view from a top corner of the object that is FIG. 130A.

FIG. 131A is a pole with a spherical protruding area that bend and fits into cubes.

FIG. 131B is a view from the side, at less of an angle, of the object that is FIG. 131A.

FIG. 131C is a view from the side of the object that is FIG. 131A.

FIG. 131D is a profile view from the side of the object that is FIG. 131A.

FIG. 132A is similar to FIG. 131A except it is on the end of a pole.

FIG. 132B is a view from the top side of the object that is FIG. 132A.

FIG. 132C is a view from the top of the object that is FIG. 132A.

FIG. 132D is a profile view from the top of the object that is FIG. 132A.

FIG. 133A is similar to FIG. 131A except it has grooves.

FIG. 133B is a view from the bottom side of the object that is FIG. 133A.

FIG. 133C is a view from the corner side of the object that is FIG. 133A.

FIG. 133D is a near-profile view from the end of the object that is FIG. 133A.

Figure 134A:
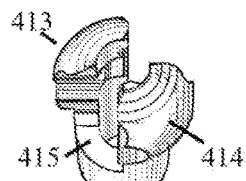
Figure 135:
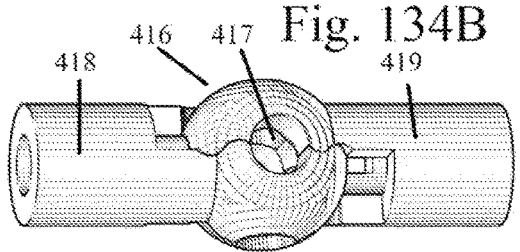

FIG. 134A is similar to FIG. 132A except the half sphere at the end of the pole can fit into itself to form a sphere in the manner shown in FIG. 135.

Figure 134B:
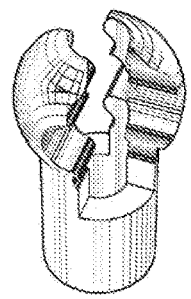

FIG. 134B is a view from a top corner of the object that is FIG. 134A.

Figure 134C:
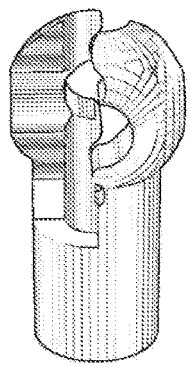

FIG. 134C is a view from the side of the object that is FIG. 134A.

Figure 134D:
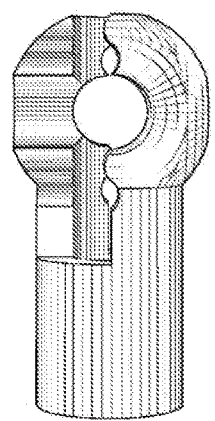

FIG. 134D is a profile view from the side of the object that is FIG. 134A.

FIG. 135 is a demonstration of how objects that are FIG. 134A fit into each other horizontally.

Figure 136:
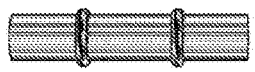

FIG. 136 is a pole.

Figure 137A:
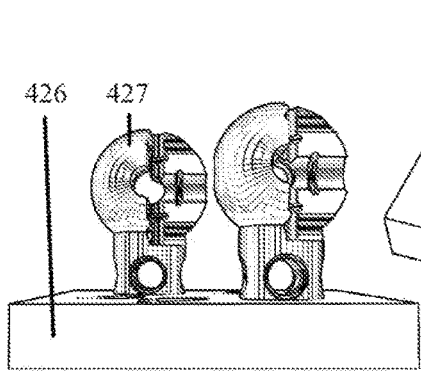

FIG. 137A is a flat surface with objects that are FIG. 134A affixed to it.

Figure 137B:
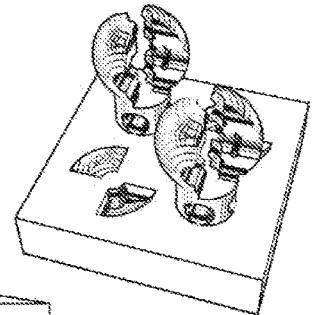

FIG. 137B is a top corner view of the object that is FIG. 137A.

Figure 138A:
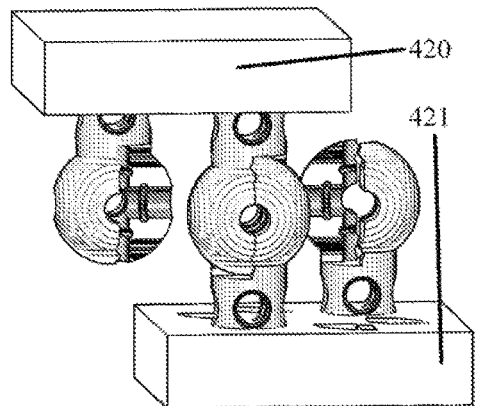

FIG. 138A is a demonstration of how objects 137A fit into each other.

Figure 138B:
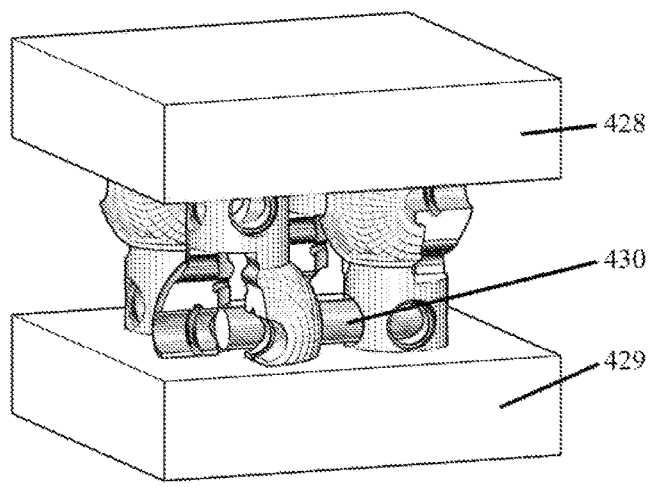

FIG. 138B is a demonstration of how objects 137A and FIG. 136 fit into each other.

Figure 138C:
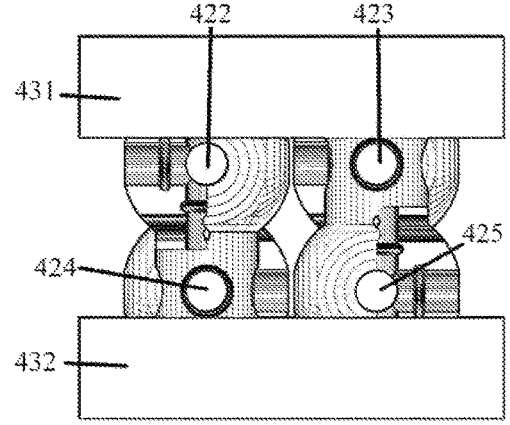

FIG. 138C is a profile view from the side of how objects 137A fit into each other.

Figure 139A:
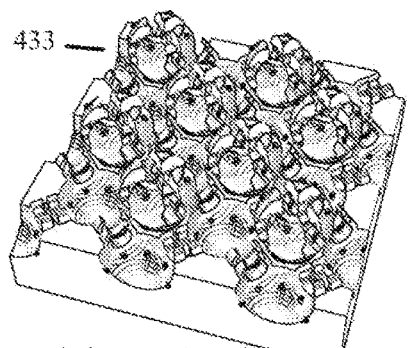

FIG. 139A is a panel with a reversible sphere pattern.

Figure 139B:
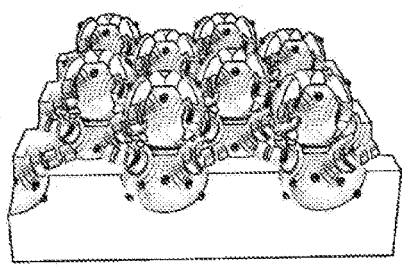

FIG. 139B is a top side view of the object that is FIG. 139A.

Figure 139C:
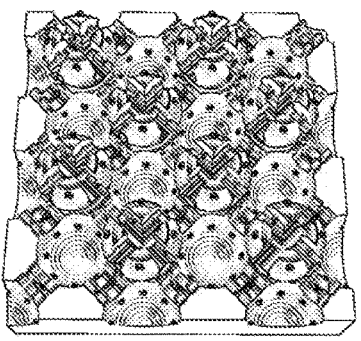

FIG. 139C is a top view of the object that is FIG. 139A.

Figure 139D:
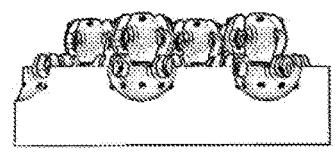

FIG. 139D is a side profile view of FIG. 139A.

Figure 140A:
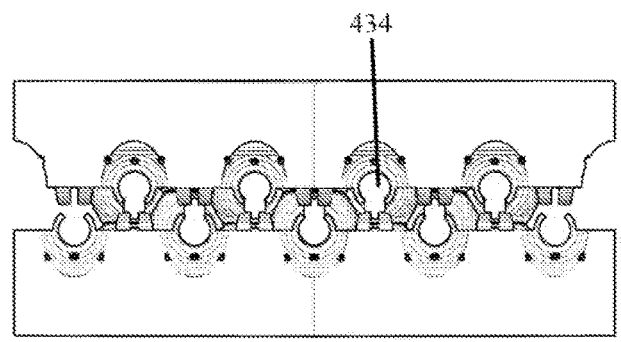

FIG. 140A is a demonstration of how FIG. 139A panels create openings that lock with poles.

Figure 140C:
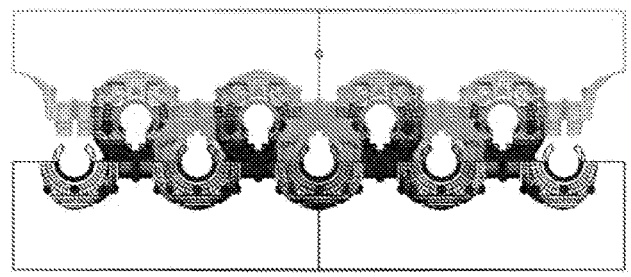
Figure 140B:
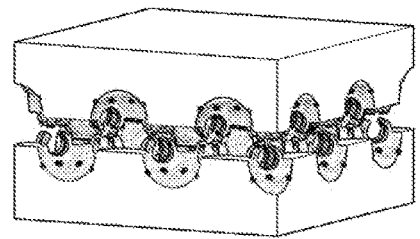

FIG. 140B is a top corner side view of the object that is FIG. 140A.

FIG. 140C is a side profile wireframe view of the object that is FIG. 140A.

Figure 141B:
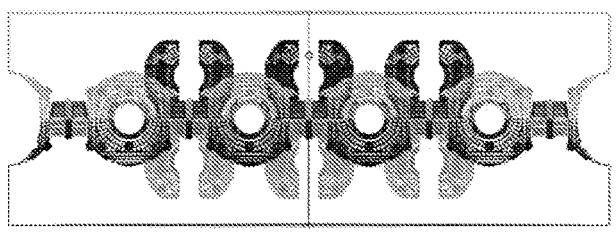
Figure 141A:
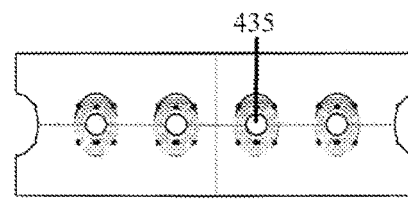

FIG. 141A demonstrates how FIG. 139A parts can fit together.

FIG. 141B is a profile side wireframe view of the object that is FIG. 141A.

Figure 141C:
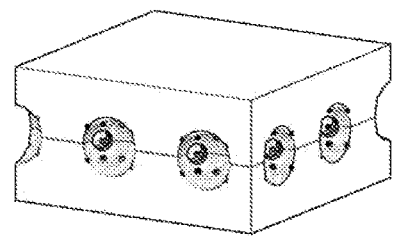

FIG. 141C is a top side corner view of the object that is FIG. 141A.

Figure 142A:
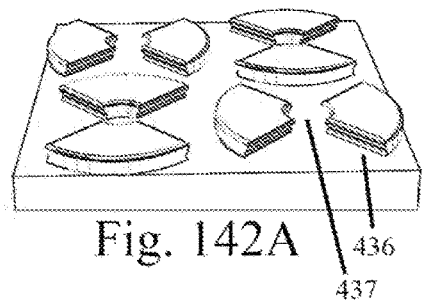

FIG. 142A is a panel with a reversible circular "s" snap pattern.

Figure 142B:
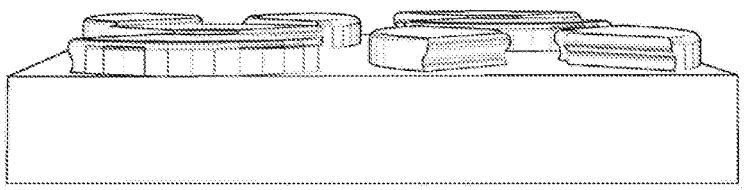

FIG. 142B is a side view of the object that is FIG. 142A.

Figure 142C:
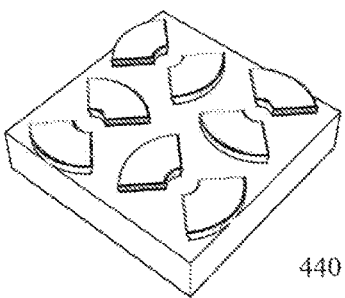

FIG. 142C is a top corner view of the object that is FIG. 142A.

Figure 143A:
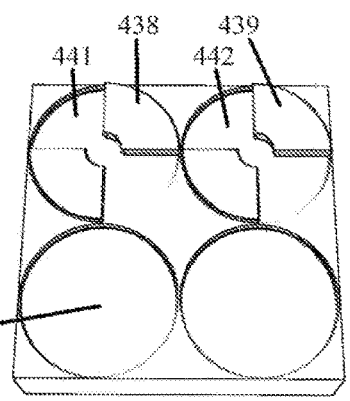

FIG. 143A is a reversible pattern similar to FIG. 142A except FIG. 143A has less protruding pieces.

Figure 143B:
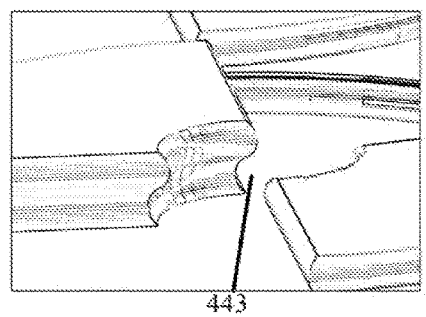

FIG. 143B is a close-up view of the "s" snaps in FIG. 143A.

Figure 143C:
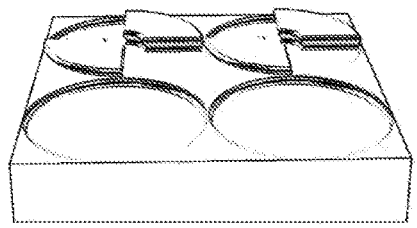

FIG. 143C is a view from a top side of the object that is FIG. 143A.

Figure 144A:

FIG. 144A is a disc.

Figure 144B:
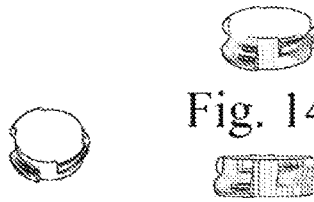

FIG. 144B is a top side view of the object that is FIG. 144A.

Figure 144C:

FIG. 144C is a side profile view of the object that is FIG. 144A.

Figure 144D:

FIG. 144D is another view of FIG. 144A.

Figure 145A:
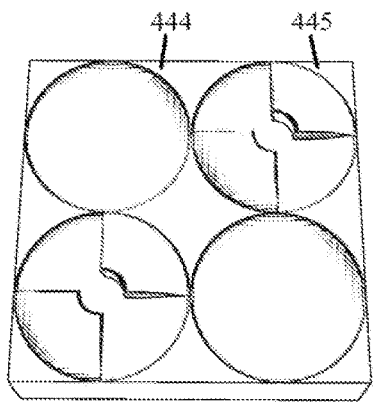

FIG. 145A is similar to FIGS. 142A and 143A except the edges of the circles are flatter and rise more gradually.

Figure 145B:
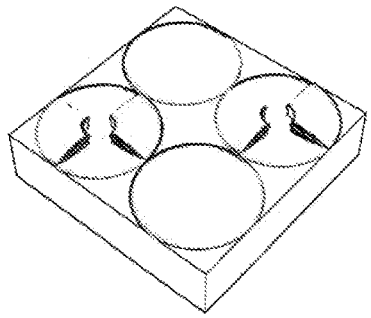

FIG. 145B is a top corner view of the object that is FIG. 145A.

Figure 145C:
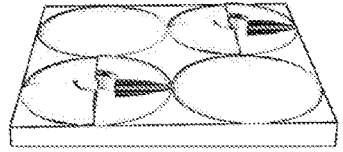

FIG. 145C is a top side view of the object that is FIG. 145A.

Figure 145D:

FIG. 145D is a near-profile side view of the object that is FIG. 145A.

FIG. 146A is similar to FIG. 145A except it allows for the pieces to simply rest on top of each other.

FIG. 146B is a top corner view of the object that is FIG. 146A.

FIG. 146C is a top side view of the object that is FIG. 146A.

FIG. 146D is a near-profile side view of the object that is FIG. 146A.

FIG. 147A is like FIG. 132A except FIG. 147A can be locked.

FIG. 147B is a view from a top side of the object that is FIG. 147A.

FIG. 147C is a view from a top corner of the object that is FIG. 147A.

FIG. 147D is a view from the side of the object that is FIG. 147A.

FIG. 147E is a near-profile view from the side of the object that is FIG. 147A.

FIG. 148A is a beam with a reversible snap pattern on its side.

FIG. 148B is a view from the front corner of the object that is FIG. 148A.

Figure 149:
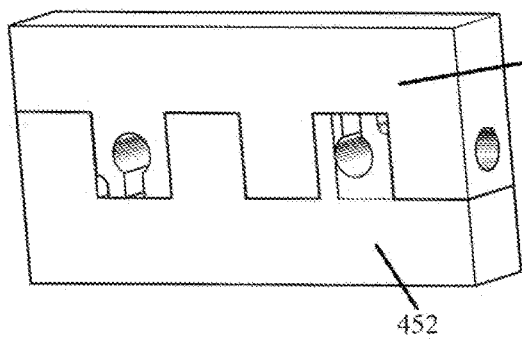

FIG. 149 is an example of how objects in the shape of FIG. 148A fit together.

Figure 150A:
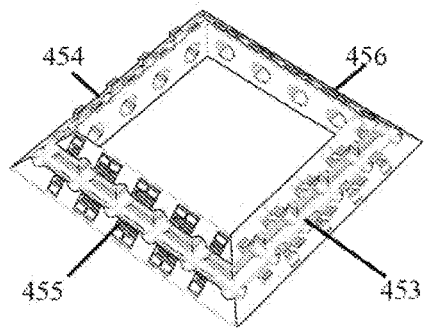

FIG. 150A is a square with slanted sides.

Figure 150B:
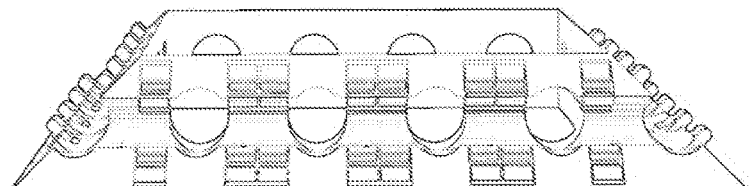

FIG. 150B is a side view from at top angle of the object that is FIG. 150A.

Figure 150C:
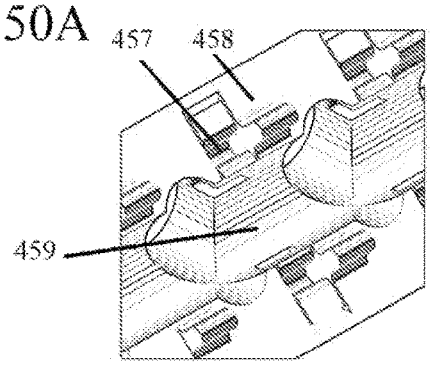

FIG. 150C is a close up view of the side of the object that is FIG. 150A.

Figures 151A, 151B, 151C, 151D:
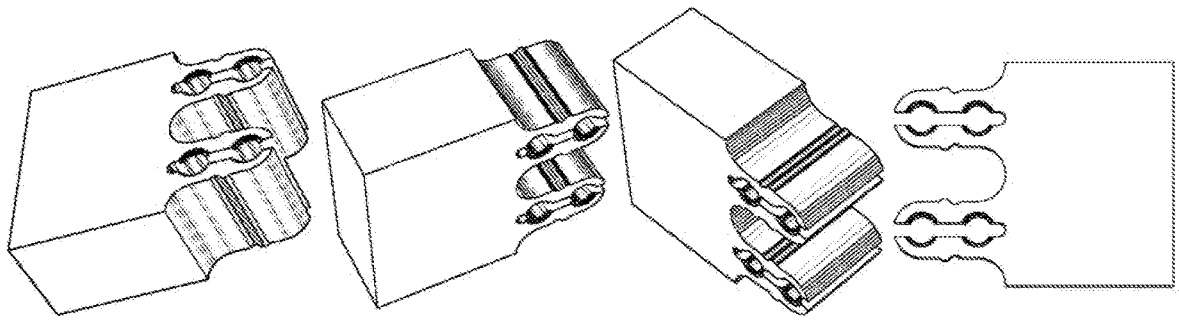
Figure 152A:
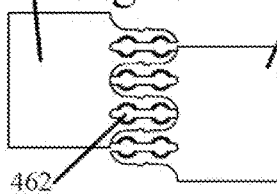

FIG. 151A is a snap interface that fits into itself in the manner shown in FIG. 152A.

FIG. 151B is a view from the top back of the object that is FIG. 151A.

FIG. 151C is a view from the top front of the object that is FIG. 151A.

FIG. 151D is a profile view from the side of the object that is FIG. 151A.

FIG. 152A is an example of how objects that are the shape of FIG. 151A snap into themselves.

Figure 152B:
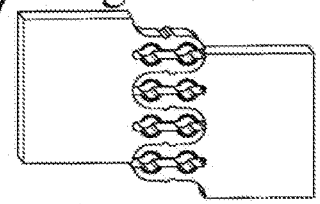

FIG. 152B is a slightly different view of the object that is FIG. 152A.

Figure 153A:
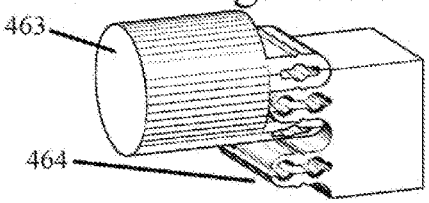

FIG. 153A is an example of how objects that are FIG. 155A fit into objects that are FIG. 151A.

Figure 153B:
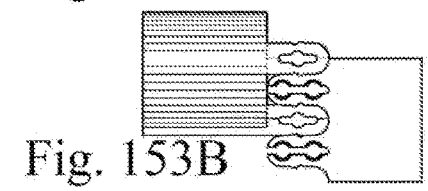

FIG. 153B is a profile view from the side of the assembled objects in FIG. 153A.

Figure 154A:
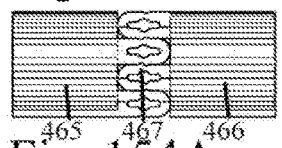

FIG. 154A is an example of how objects that are FIG. 155A fit into themselves.

Figure 154B:

FIG. 154B is the assembled objects of FIG. 154A but viewed from a different angle.

FIG. 155A is like FIG. 151A except FIG. 155A is cylindrical in shape.

Figure 166A:
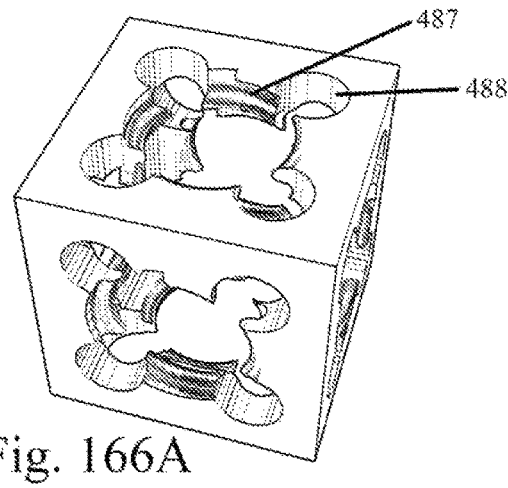

FIG. 155B is a different view of the object that is FIG. 166A.

FIG. 155C is a side profile view of the object that is FIG. 155A.

FIG. 155D is a front corner angle view of the object that is FIG. 155A.

FIG. 156A is a profile view of the end of the object that is FIG. 156B.

Figure 158A:
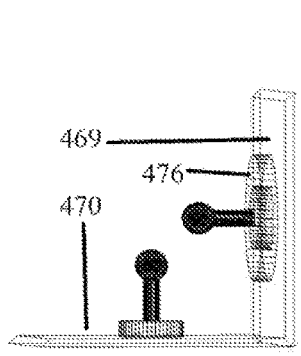

FIG. 156B is a cylinder that into which panels with football-shaped snap/hooks like the one shown in FIG. 157A can be affixed to in the manner shown in FIG. 158A.

FIG. 156C is a side view of the object that is FIG. 156A.

FIG. 156D is a side profile view of the object that is FIG. 156A.

FIG. 157A is a panel with a football-shaped snap/hook.

FIG. 157B is a top corner view of the object that is FIG. 157A.

FIG. 157C is a bottom side view of the object that is FIG. 157A.

FIG. 158A is a wireframe example of how objects that are FIG. 157A assemble.

Figure 158B:
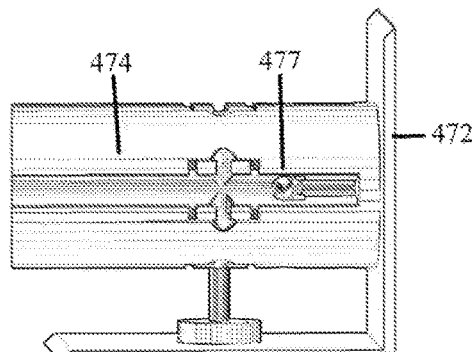

FIG. 158B is an example of how objects that are FIG. 157A assemble into FIG. 156A.

Figure 158C:
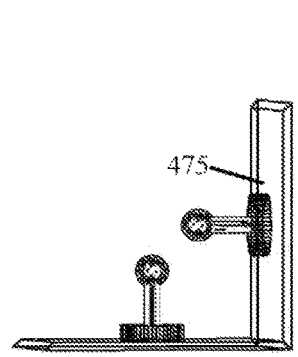

FIG. 158C is an example of how objects that are FIG. 157A assemble without a circular magnet.

Figure 158D:
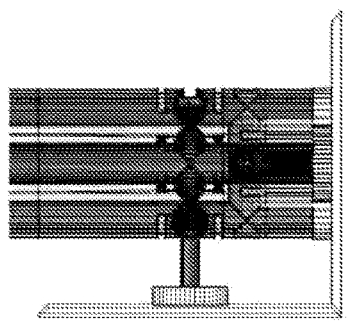

FIG. 158D is a wireframe side profile view of the assembled objects shown in FIG. 158B.

Figure 159:
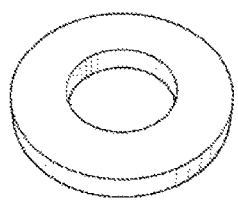

FIG. 159 is a magnetic cylinder.

Figure 160A:
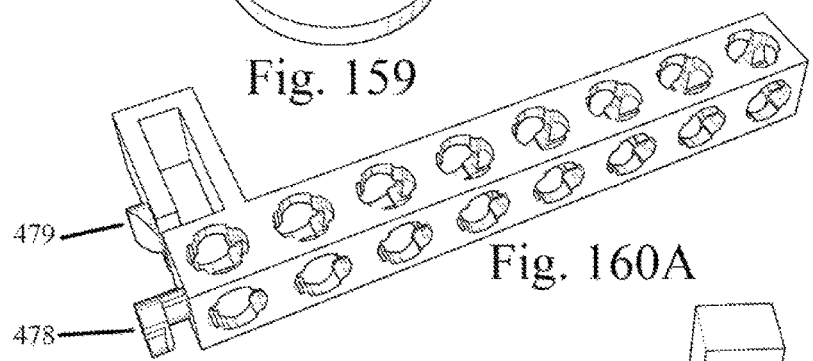

FIG. 160A is a beam that has a hook on the end.

Figure 160B:
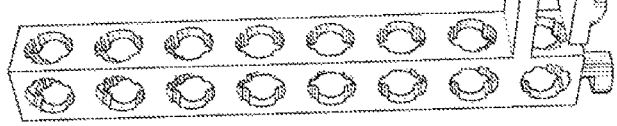

FIG. 160B is a view from a different angle of the object that is FIG. 160A.

Figure 161A:
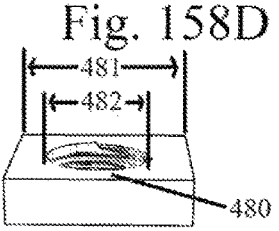

FIG. 161A is a female screw.

Figure 161B:
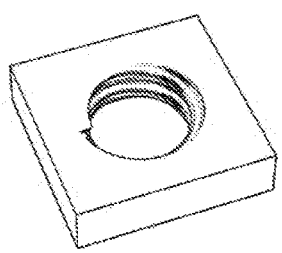

FIG. 161B is atop corner view of the object that is FIG. 161A.

Figure 161D:
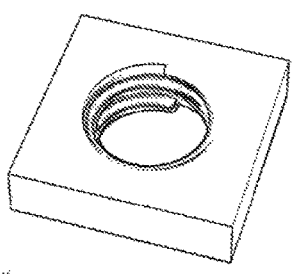
Figure 161C:
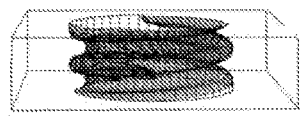

FIG. 161C is a side wireframe view of the object that is FIG. 161A.

FIG. 161D is a top corner view, from a different angle shown in FIG. 161B, of the object in FIG. 161A.

Figure 161E:
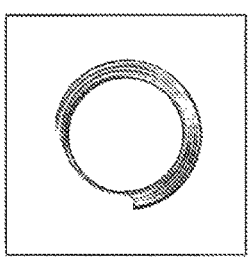

FIG. 161E is a view from the top of the object that is FIG. 161A.

Figure 161F:
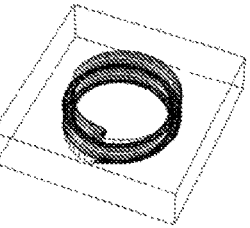

FIG. 161F is a wireframe view from a top corner of the object shown in FIG. 161A.

FIG. 162 is a screw that is half as tall as it is wide.

FIG. 163 is as tall as it is wide.

Figure 165A:
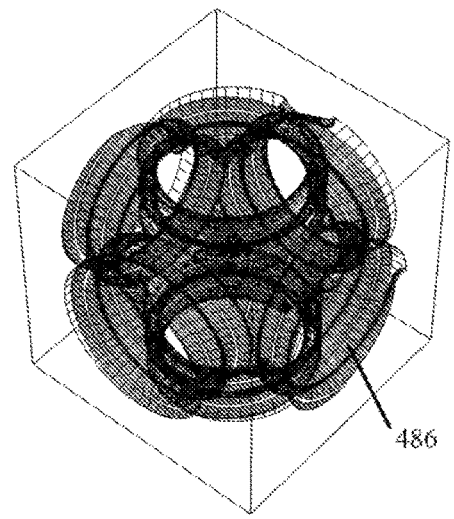

FIG. 164A is cube with screw interfaces on four sides and FIG. 165A has screw interfaces on six sides.

FIG. 164B is a view from the top side of the object that is FIG. 164A.

FIG. 164C is a wireframe side view of the object that is FIG. 164A.

FIG. 164D is a top corner view from a different angle of the object shown in FIG. 164A.

FIG. 165A is a similar to FIG. 164A except it has holes coming out of all six of its sides.

Figure 165B:
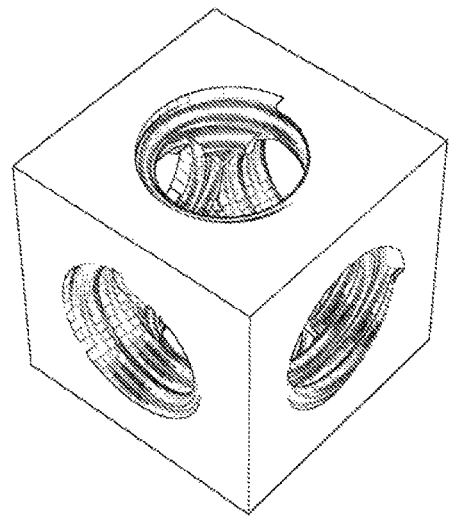

FIG. 165B is a solid view of the object that is FIG. 165A.

Figure 165C:
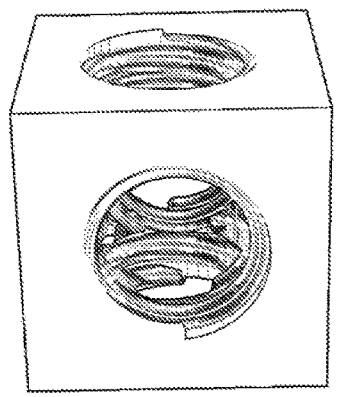

FIG. 165C is a view from the top side of the object that is FIG. 165A.

Figure 165D:
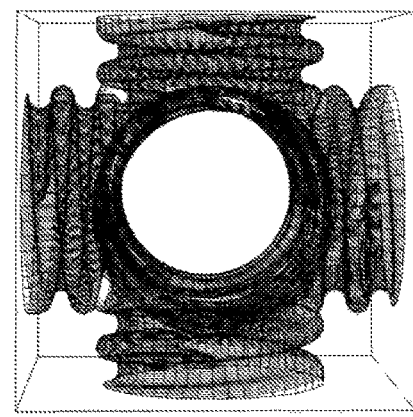

FIG. 165D is a side view of the object that is FIG. 165A.

FIG. 166A is a cube with a screw interface on each side.

Figure 166B:
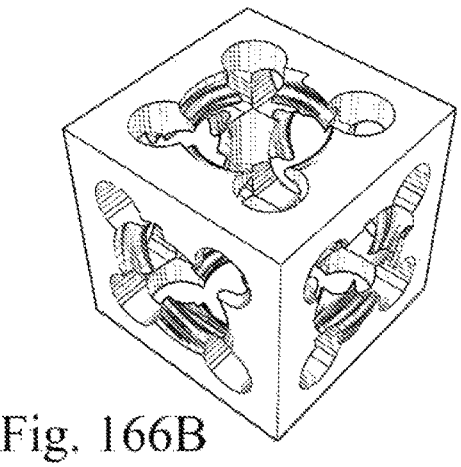

FIG. 166B is a view of the object that is FIG. 166A from a slightly different angle.

Figure 166C:
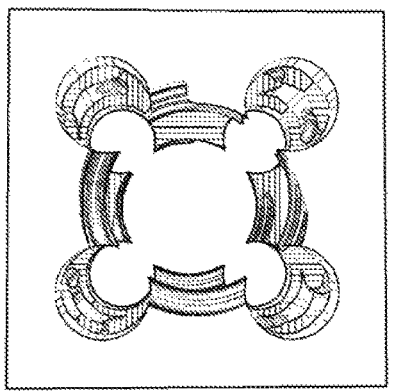

FIG. 166C is a view from the side of the object that is FIG. 166A.

Figure 166D:
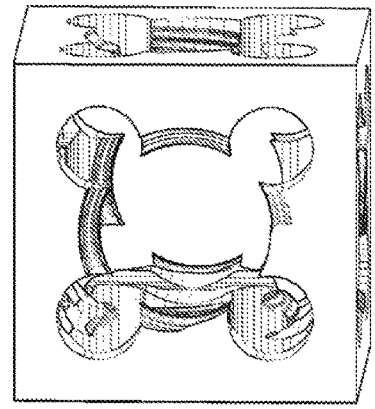

FIG. 166D is a view from the side and a slight angle to the right of the object that is FIG. 166A.

Figure 167A:
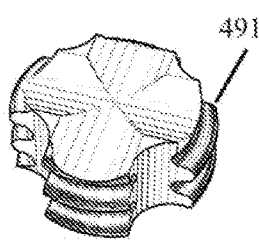

FIG. 167A is a screw that goes into FIG. 166A.

Figure 167B:
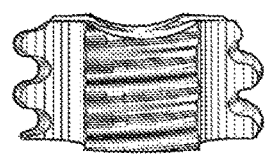

FIG. 167B is a side view of the object that is FIG. 167A.

Figure 167C:
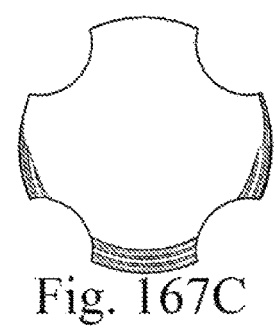

FIG. 167C is a view from the top of FIG. 167A.

Figure 168A:
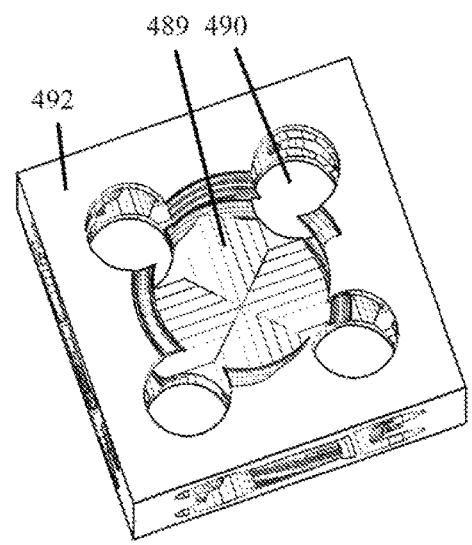

FIG. 168A is an example of how FIG. 167A can be inserted into FIG. 166A.

Figure 168B:
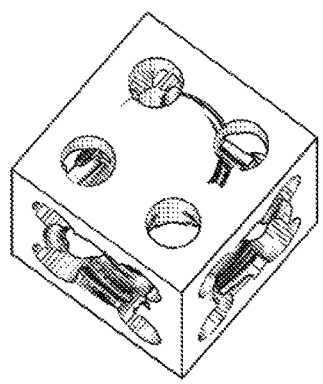

FIG. 168B is a different view of the object that is FIG. 168A.

FIG. 169A is a male screw piece.

FIG. 169B is a view from an end of the object that is FIG. 169A.

FIG. 169C is a view from the top of the object that is FIG. 169A.

FIG. 170A is a male screw piece.

FIG. 170B is another view of FIG. 170A.

FIG. 170C is a side view of FIG. 170A.

FIG. 171A is a male screw.

FIG. 171B is a view from the top side of FIG. 171A.

FIG. 171C is a view from the bottom corner of FIG. 171A.

FIGS. 172A, 173 and 174A are pieces that work together to form a latch.

FIG. 172A is a piece into which the latch is affixed.

FIG. 172B is a different view of the object that is FIG. 172A.

FIG. 173 is an object performs a latch function as shown in FIG. 175A and FIG. 175B.

FIG. 174A is a part of the latch functionality demonstrated in FIG. 175A and FIG. 175B.

FIG. 174B is a different view of the object that is FIG. 174A.

FIG. 175A is a demonstration of how the pieces at FIG. 172A, FIG. 173 and FIG. 174A work together to perform latch functionality.

FIG. 175B is a demonstration of the latch functionality described in FIG. 175A except with the latch closed.

FIGS. 176A, 177A and 178 are a latch.

FIG. 176A is a piece of the latch functionality shown in FIG. 180.

FIG. 176B is a side profile view of the object that is FIG. 176A.

FIG. 177A is a profile view of the complete object that performs the latching function described in FIG. 180.

FIG. 177B is a close-up view of a portion of the object that is FIG. 177A.

FIG. 178 is a latch that assembles in the manner shown in FIG. 180.

FIG. 179 is a close-up view of how FIG. 177B assembles into FIG. 176A before it creates the latch functionality shown in FIG. 180.

FIG. 180 is a demonstration of latch functionality.

FIG. 181A is a pole with magnetized ends.

FIG. 181B is a different view of the same pole that is FIG. 181A.

FIG. 182A is a close-up view of FIG. 182B.

FIG. 182B is a panel of recessed magnetic holes into which FIG. 181A can be inserted.

FIG. 183 is a small triangle magnet on the right side.

FIG. 184A is a panel.

Figure 184B:
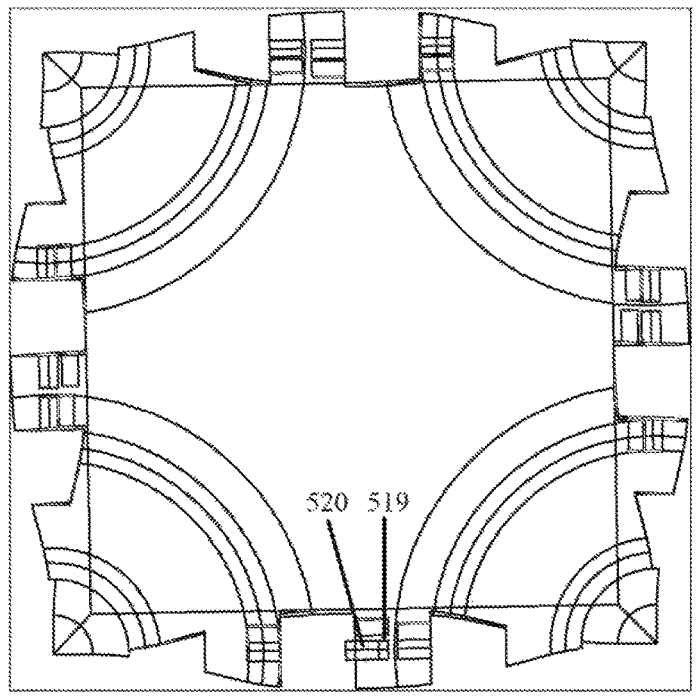

FIG. 184B is a wireframe profile view from the top of the object that is FIG. 184A.

Figure 185A:
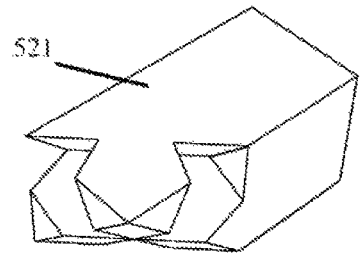

FIG. 185A is a basic Kawai Tsugite interface that follows the Invention's parameters.

Figure 185B:
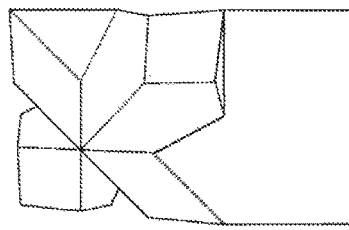

FIG. 185B is a side view of the object that is FIG. 185A.

Figure 185F:
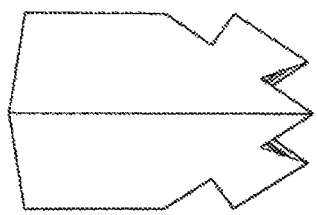
Figure 185C:
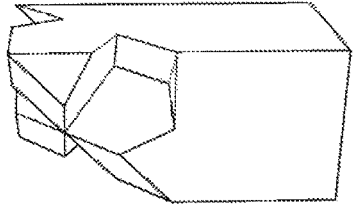

FIG. 185C is a side view from the top of the object that is FIG. 185A.

Figure 185D:
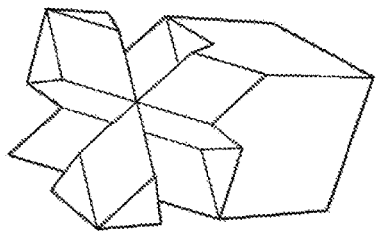

FIG. 185D is a side view from a front corner of the object that is FIG. 185A.

Figure 185E:
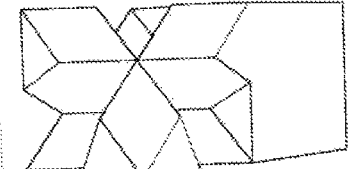

FIG. 185E is another view from the front corner, at a little different angle, of the object that is FIG. 185A.

Figure 186A:
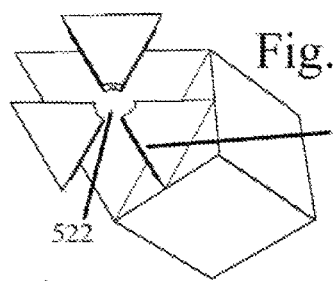

FIG. 186A is similar to FIG. 185A except FIG. 186A is locked when a pole or sphere.

Figure 186B:
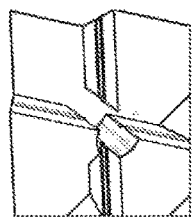

FIG. 186B is a view from the end of the object at FIG. 186A.

Figure 186C:
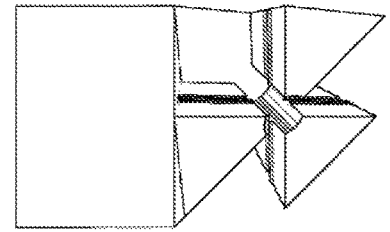

FIG. 186C is a view from the side of the object at FIG. 186A.

Figure 186D:
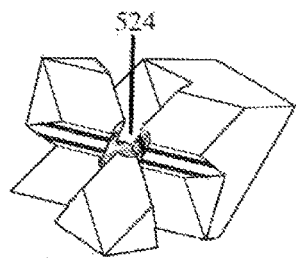

FIG. 186D is a view from the front corner of the object that is FIG. 186A.

Figure 186E:
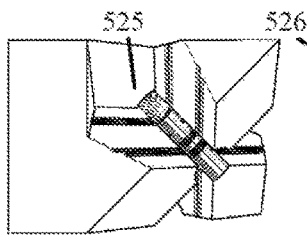

FIG. 186E is a closer view from the front corner of the object that is FIG. 186A.

Figure 186F:
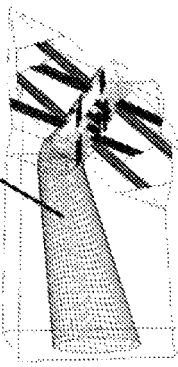

FIG. 186F is a wireframe view of the object that is FIG. 186A.

FIG. 187A is an example of how FIG. 186A assembles into itself at a perpendicular angle.

FIG. 187B is a wireframe view of the assembled piece that is FIG. 187A.

FIG. 187C is an example of how FIG. 186A assembles into a horizontal piece.

FIG. 187D is a wireframe view of the assembled object that is FIG. 187C.

FIG. 188A is similar to FIG. 186A except the interfaces are on a beam.

FIG. 188B is a different view from the side of the object that is FIG. 188A.

FIG. 188C is a view from the end and to one side of the object that is FIG. 188A.

FIG. 188D is another view from the side of the object that is FIG. 188A.

Figure 189A:
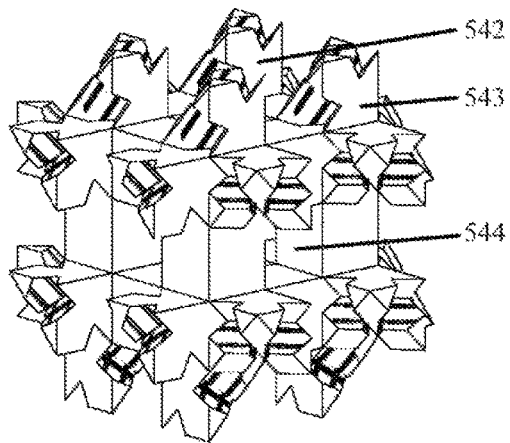

FIG. 189A is similar to FIG. 188A except the beams are arranged to form a cube.

Figure 189B:
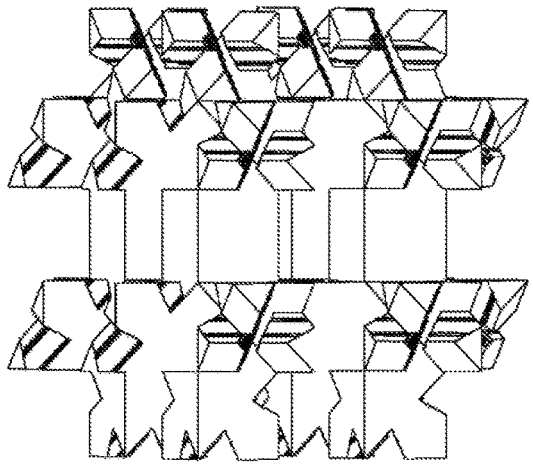

FIG. 189B is a view from the side of the object that is FIG. 189A.

Figure 189C:
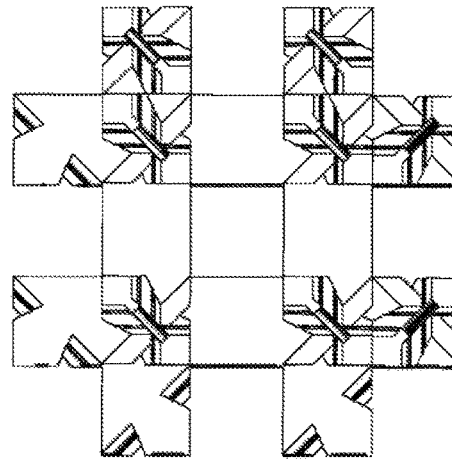

FIG. 189C is a profile view from the side of the object that is FIG. 189A.

Figure 189D:
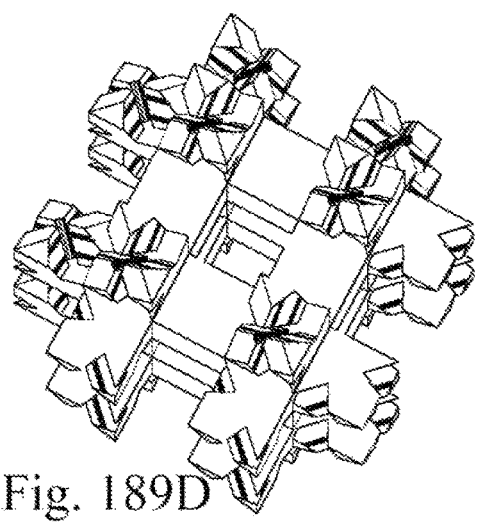

FIG. 189D is a view from a top corner of the object that is FIG. 189A.

Figure 189E:
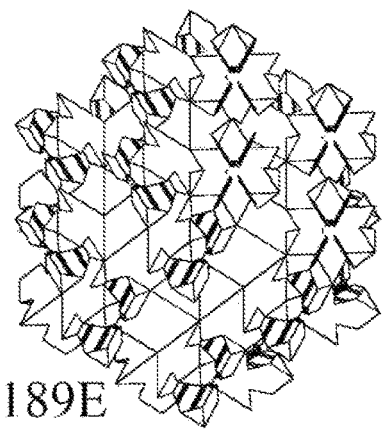

FIG. 189E is a view from a top corner, but at a different angle, of the object that is FIG. 189A.

Figure 190A:
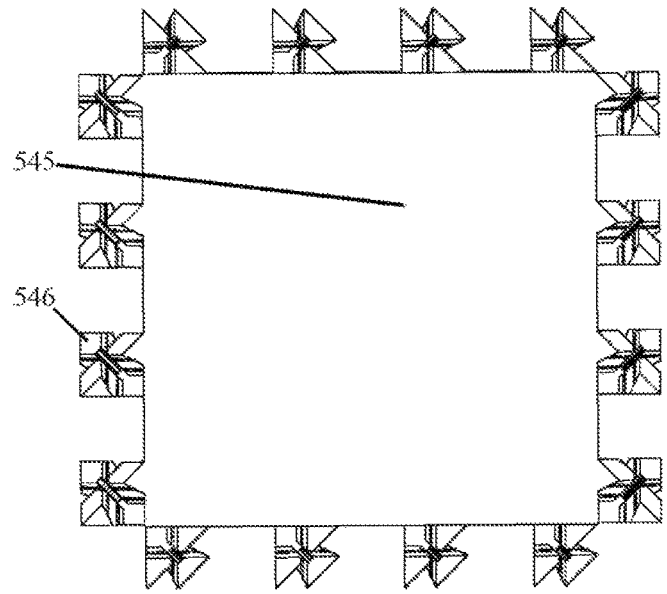

FIG. 190A is a panel with Kawai Tsugite interfaces that follow Invention parameters.

FIG. 190B is a close-up view from the top of the object that is FIG. 190A.

FIG. 190C is a close-up view from a corner of the object that is FIG. 190A.

FIG. 190D is a close up view from the side and top of the object that is FIG. 190A.

FIG. 190E is a profile view from the bottom of a panel with Kawai Tsugite interfaces on the sides.

FIG. 191A is a panel with reversible hinges on its edges that follows the Invention's parameters.

FIG. 191B is a close-up view of the panel that is FIG. 191A.

FIG. 191C is a top corner view of a panel that is similar to FIG. 191A except it has wavy circular "s" snaps and recessed areas for spheres to affix themselves in the hollow cylindrical areas on its sides.

FIG. 191D is a close-up view of the wavy "s" snaps on FIG. 191C.

FIG. 192A is a sphere snap pole.

FIG. 192B is a demonstration of how FIG. 192A fits into FIG. 191C.

Figure 193B:
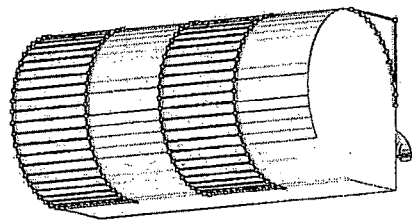
Figure 194A:
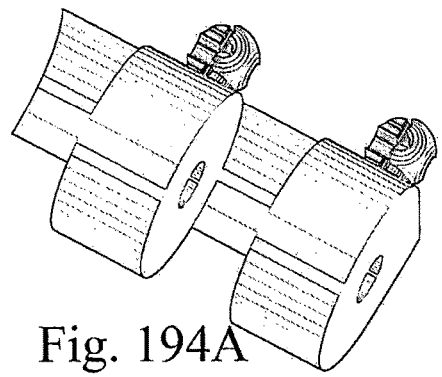

FIG. 193A is a demonstration of how the hinges affixed to FIG. 194A fit together.

FIG. 193B is a view of the back side of FIG. 193A.

Figure 193C:
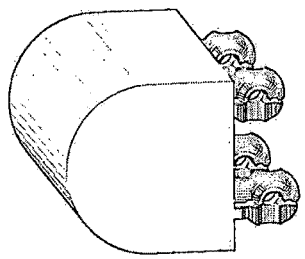

FIG. 193C is a side view of FIG. 193A.

FIG. 194A is an individual piece that fits into itself in the manner shown in FIG. 193A.

Figure 194B:
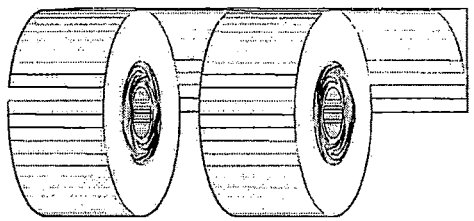

FIG. 194B is a different view of FIG. 194A.

Figure 194C:
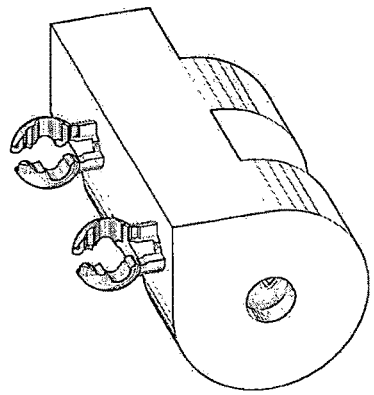

FIG. 194C is another view of FIG. 194A.

Figure 194D:
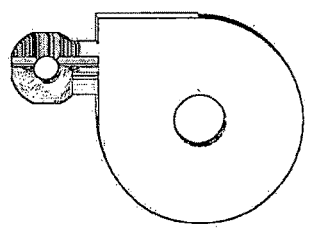

FIG. 194D is a profile view from the side of FIG. 194A.

Figure 195:
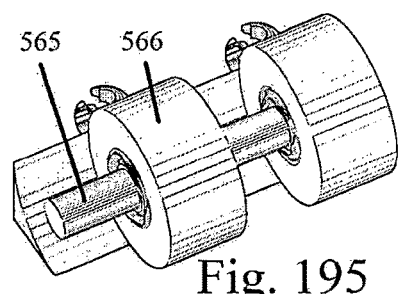

FIG. 195 is a demonstration of how the pole that is FIG. 192A fits into FIG. 194C.

Figure 196:
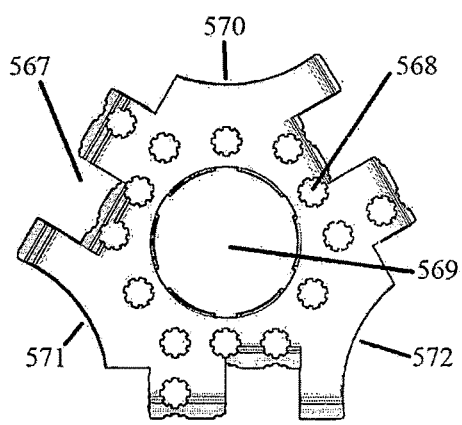

FIG. 196 is a triangular configuration with hinges on the blocks on its edges.

Figure 197:
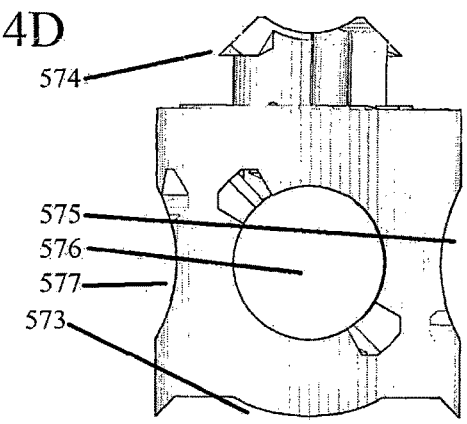

FIG. 197 is a basic block that uses several features of the Invention.

Figure 198A:
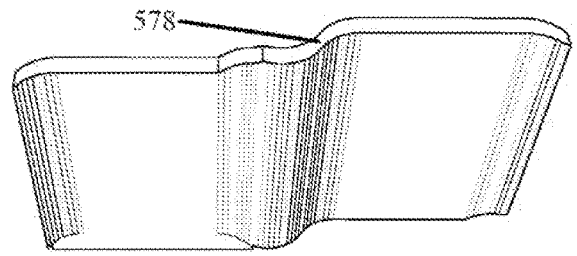

FIG. 198A is a panel that uses "s" snap shapes.

Figure 198B:
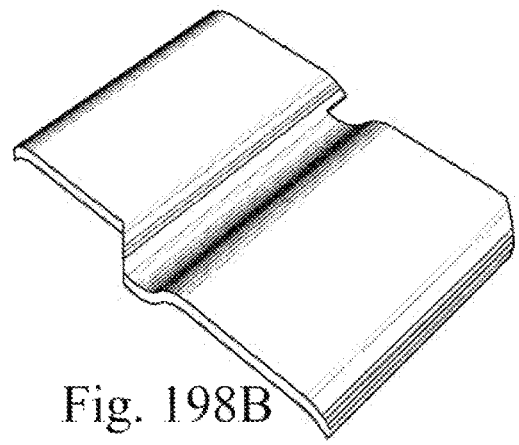

FIG. 198B is a view from the top corner of FIG. 198A.

Figure 198C:
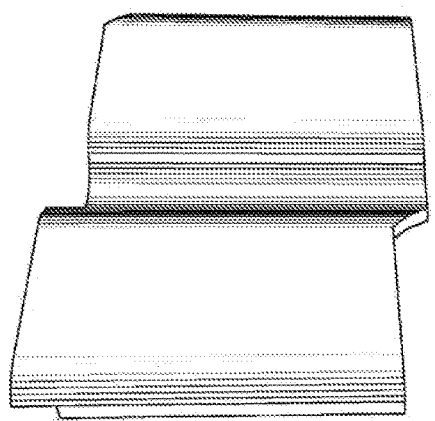

FIG. 198C is a view from the top side of FIG. 198A.

Figure 198D:
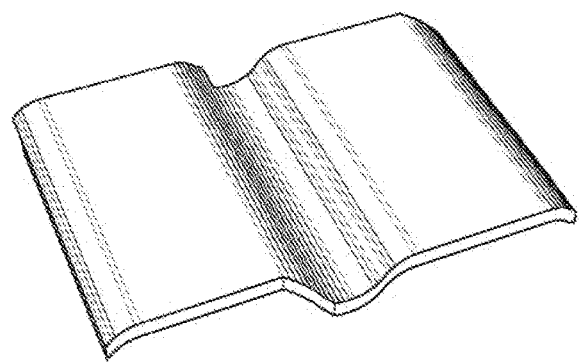

FIG. 198D is another view from the top side of FIG. 198A.

Figure 199A:
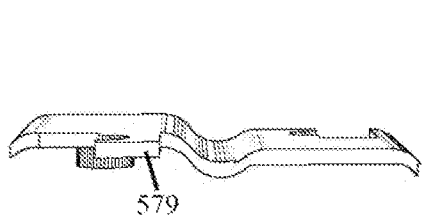

FIG. 199A is like FIG. 198A except it has a hook that can fit into itself.

Figure 199B:
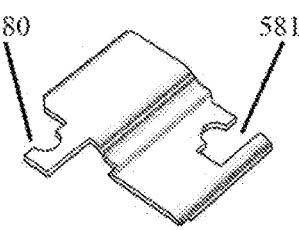

FIG. 199B is a view from a top corner of FIG. 199A.

Figure 199C:
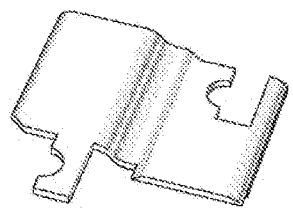

FIG. 199C is another view from a top corner of FIG. 199A.

Figure 199D:
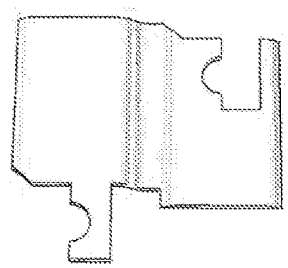

FIG. 199D is a near-profile view from the top of FIG. 199A.

Figure 199E:
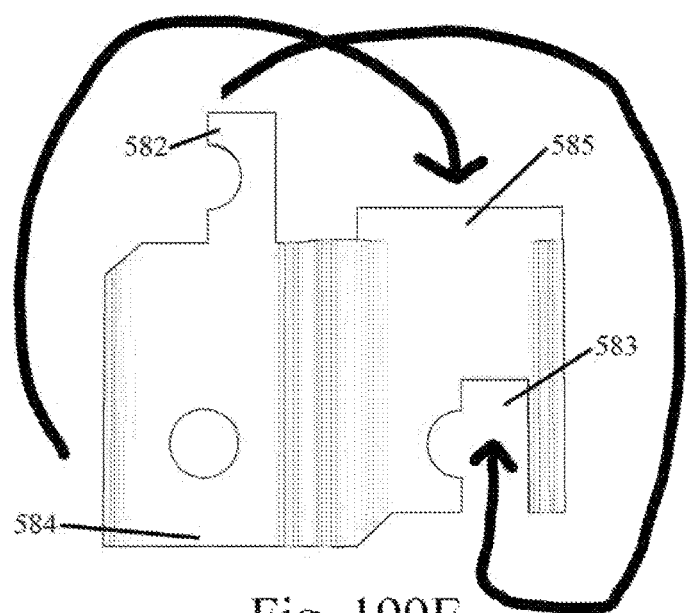

FIG. 199E is a demonstration of how the parts of FIG. 199A are reversible in that they fit into themselves.

Figure 200:
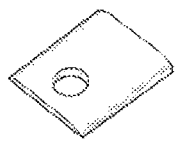

FIG. 200 is an incline adjuster that can hold up Invention shingles.

Figure 201:
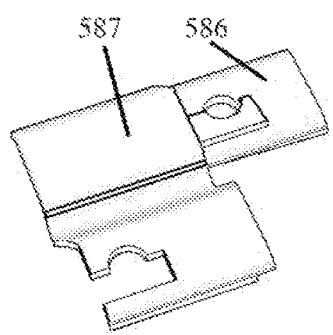

FIG. 201 is a demonstration of how FIG. 200 can hold up Invention shingles.

Figure 202A:
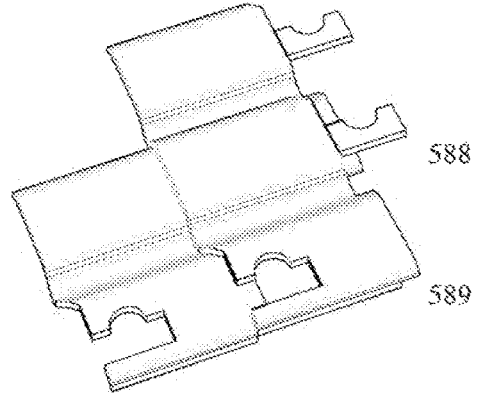
Figure 202B:
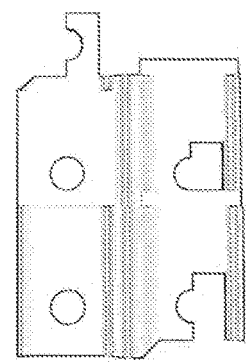
Figure 202C:
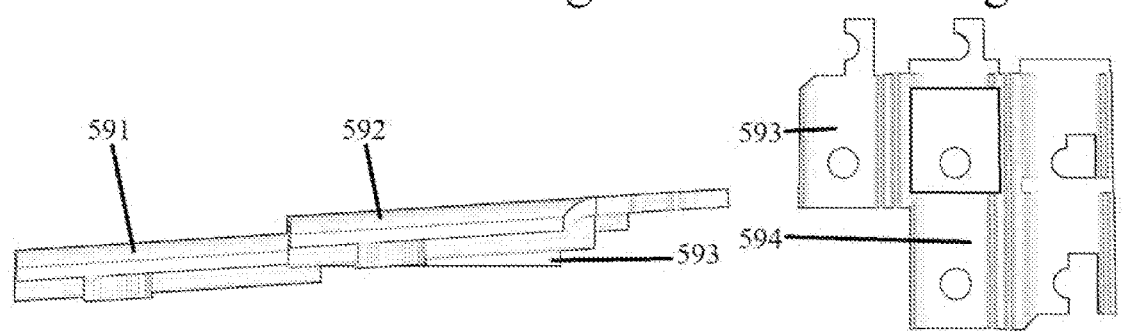

FIG. 202A is a demonstration of how the inclined pieces fit together, like FIG. 202C, which is a profile view from the side of how the inclined shapes fit together.

FIG. 202B is a profile view from the top of some of the shingles that are assembled in FIG. 202A.

FIG. 202C is a profile view from the side of the shingles assembled in the manner shown in FIG. 202A.

Figure 202D:
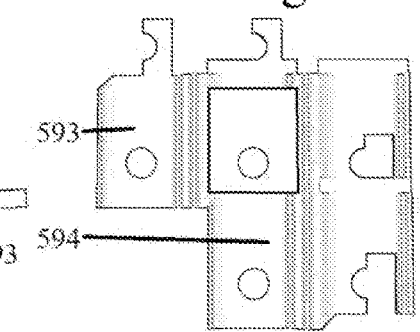

FIG. 202D is a profile view from the bottom of the shingles assembled in FIG. 202A.

Figure 202E:
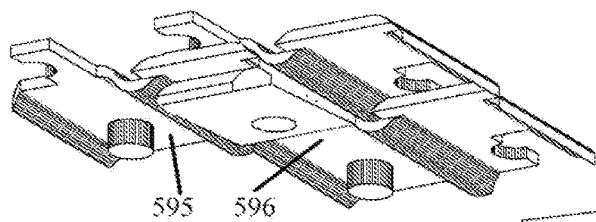

FIG. 202E is a side view from the bottom of the shingles assembled in FIG. 202A.

Figure 202F:
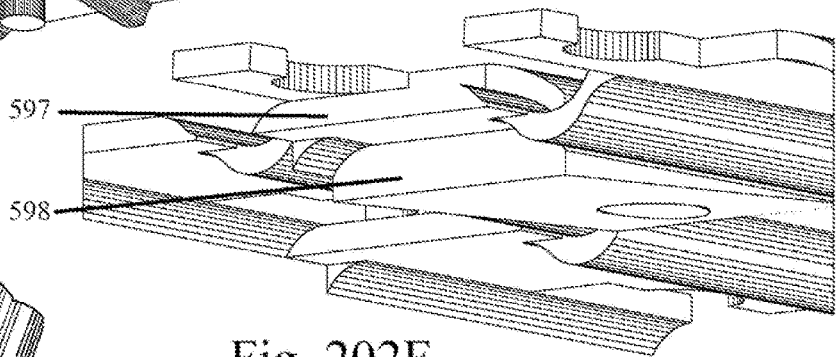

FIG. 202F is a close-up view of the assembled pieces in FIG. 202A with the support of the piece in FIG. 200.

Figure 203A:
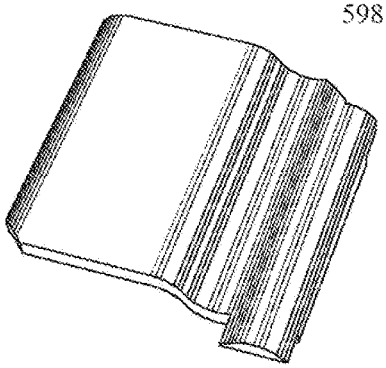

FIG. 203A is a more compact version of FIG. 198A that also holds itself up at an incline.

Figure 203B:
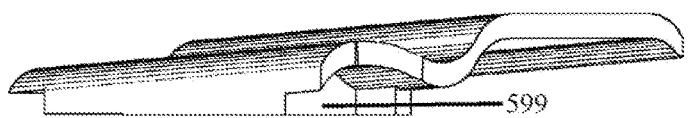

FIG. 203B is a side view of FIG. 203A.

Figure 203C:
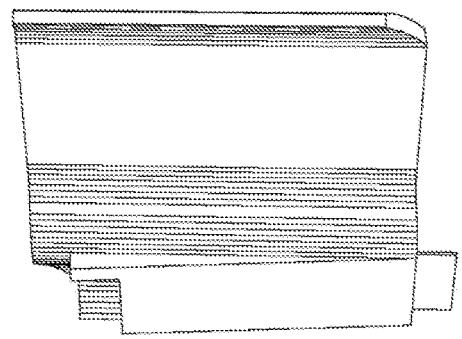

FIG. 203C is a view from the bottom side of FIG. 203A.

Figure 203D:
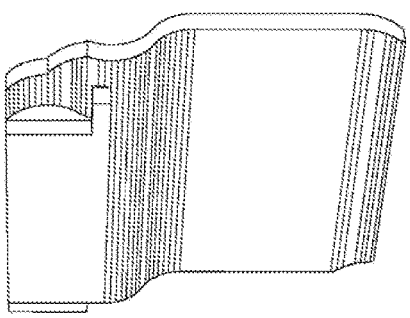

FIG. 203D is a view from the bottom side, but from a different angle, of FIG. 203A.

Figure 203E:
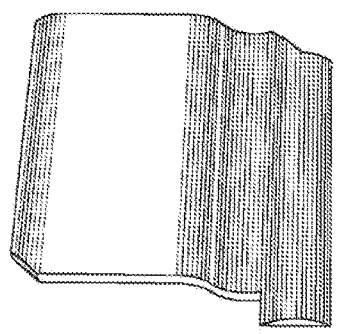

FIG. 203E is a view from the top and side of FIG. 203A.

FIG. 203F is a view from the end sloping down of the shingle that is FIG. 203A.

FIG. 203G is a profile view from the bottom of FIG. 203A.

FIG. 204A is a solid incline adjuster that is like FIG. 200.

FIG. 204B is a view of the top of FIG. 204A

FIG. 205A is an incline adjuster that can hold multiple knob interfaces.

FIG. 205B is a view from the top side of FIG. 205A.

FIG. 205C is a view from the bottom side of FIG. 205A.

Figure 206A:
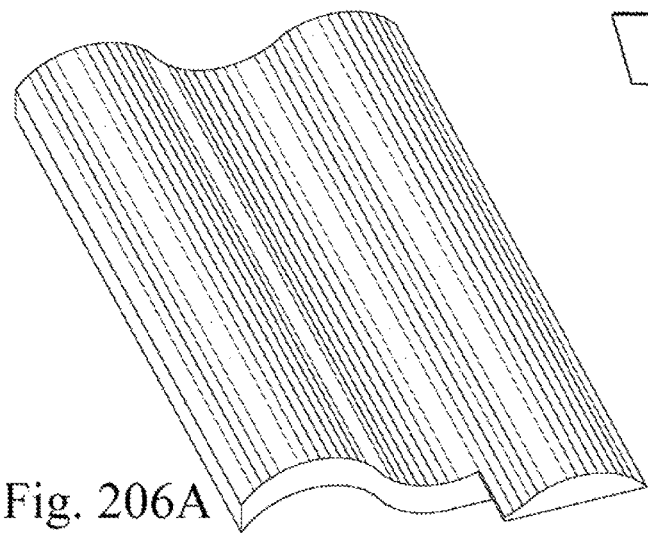

FIG. 206A is an even more compact version of FIG. 198A.

Figure 206B:
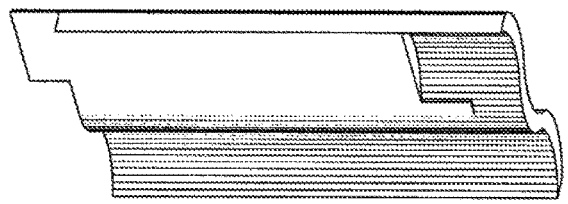

FIG. 206B is a view from the bottom side of FIG. 206A.

Figure 206C:

FIG. 206C is a profile view from the side of FIG. 206A.

Figure 206D:
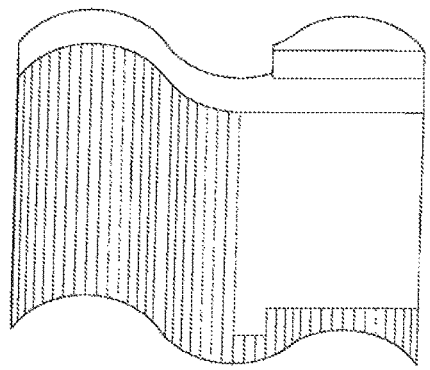

FIG. 206D is a view from the bottom side, but from a different angle, of FIG. 206A.

Figure 207A:
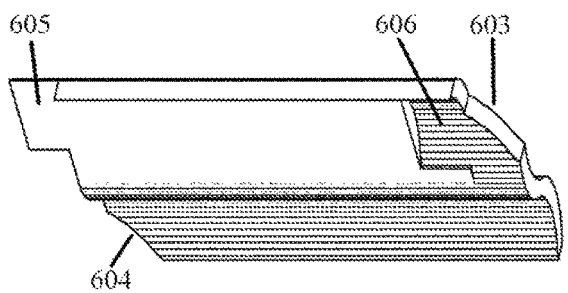

FIG. 207A is similar to FIG. 206A except it has slanted areas and protruding and receding areas on its ends.

Figure 207B:
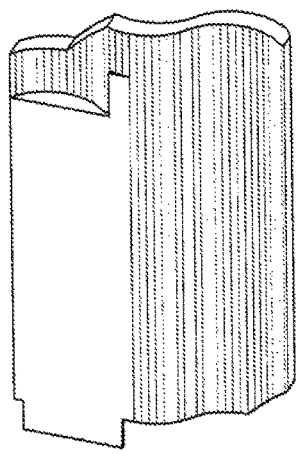

FIG. 207B is a view of the bottom of FIG. 207A.

Figure 207C:
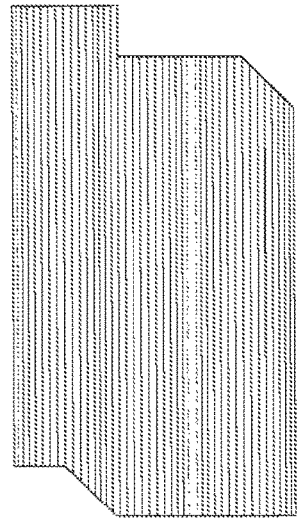

FIG. 207C is a view of the top of FIG. 207A.

Figure 207D:
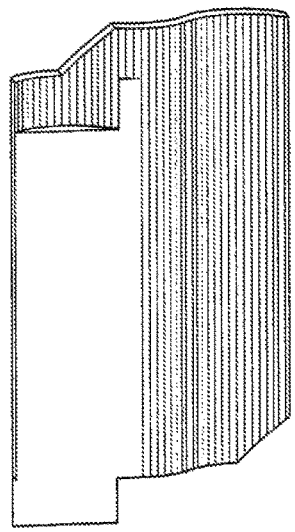

FIG. 207D is another view of the bottom, but from a slightly different angle, of FIG. 207A.

DETAILED DESCRIPTION OF THE INVENTION

The Invention is an alphabet of shapes that follow standard conventions to assemble into larger constructions. It is a systematic approach to having shapes, and features on shapes and interfaces on shapes, that are of the same size, half the size or twice the size of other parts of the system.

With the Invention a person with little strength and no tools or even no instruction set, can nonetheless assemble the pieces into a wide range of useful objects that include houses, tables, chairs, shelves, floors, roofs, etc.

The Invention's pieces are especially well suited for transport and assembly by robots because of their standard and simple interfaces, features and dimensions. In fact, with magnetized surfaces and basic hollow spheres that move around, the Invention can be programmed to assemble and disassemble itself into a wide range of constructions.

Figure 1A:
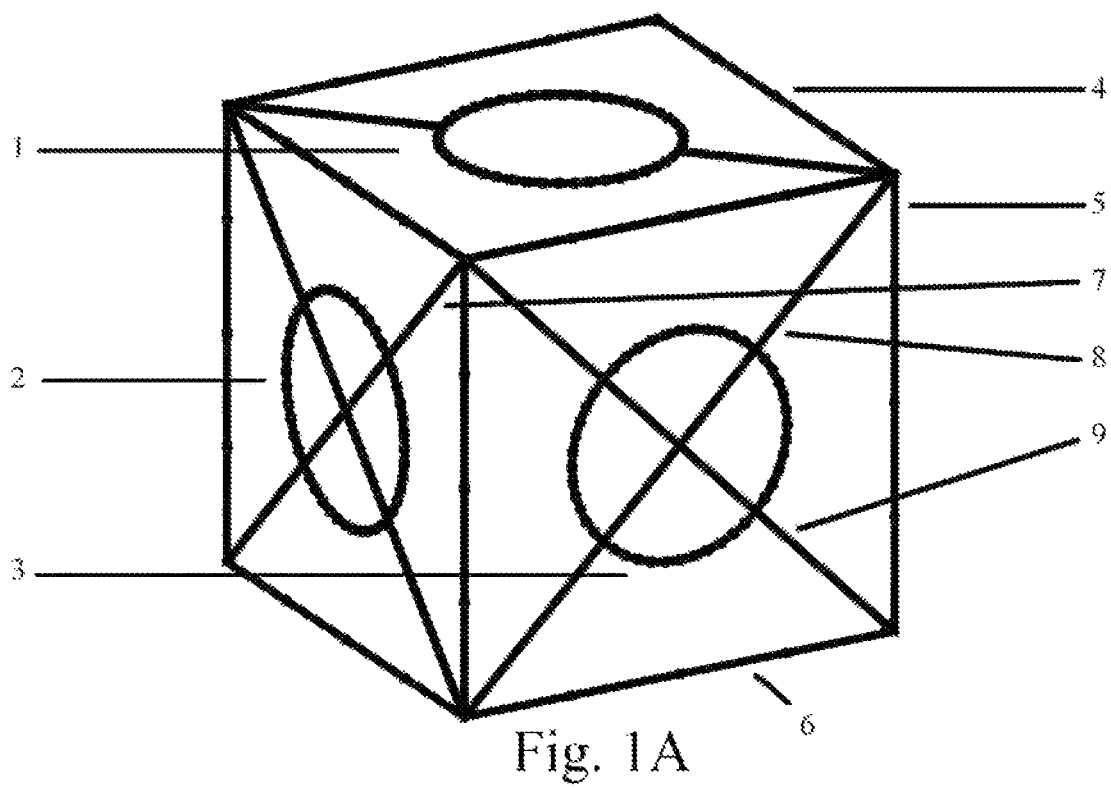
FIG. 1A is a cube that illustrates the basic parameters used by the Invention's pieces.

FIG. 1A illustrates the basic parameters used by the Invention's pieces. Like a pixel on a screen that displays 2D images, the Invention uses this basic cube for 3D constructions. The diameter of the circles on the sides of FIG. 1A (1, 2, 3) is exactly one half the length of the sides of the equilateral cube (4, 5, 6). Those circles can be protruded to form knobs or they can be recessed into the cube to form shafts. The slanted lines on the sides of FIG. 1A (7, 8, 9) are the lines along which the cube can be sliced to form a slanted side.

Figure 1B:
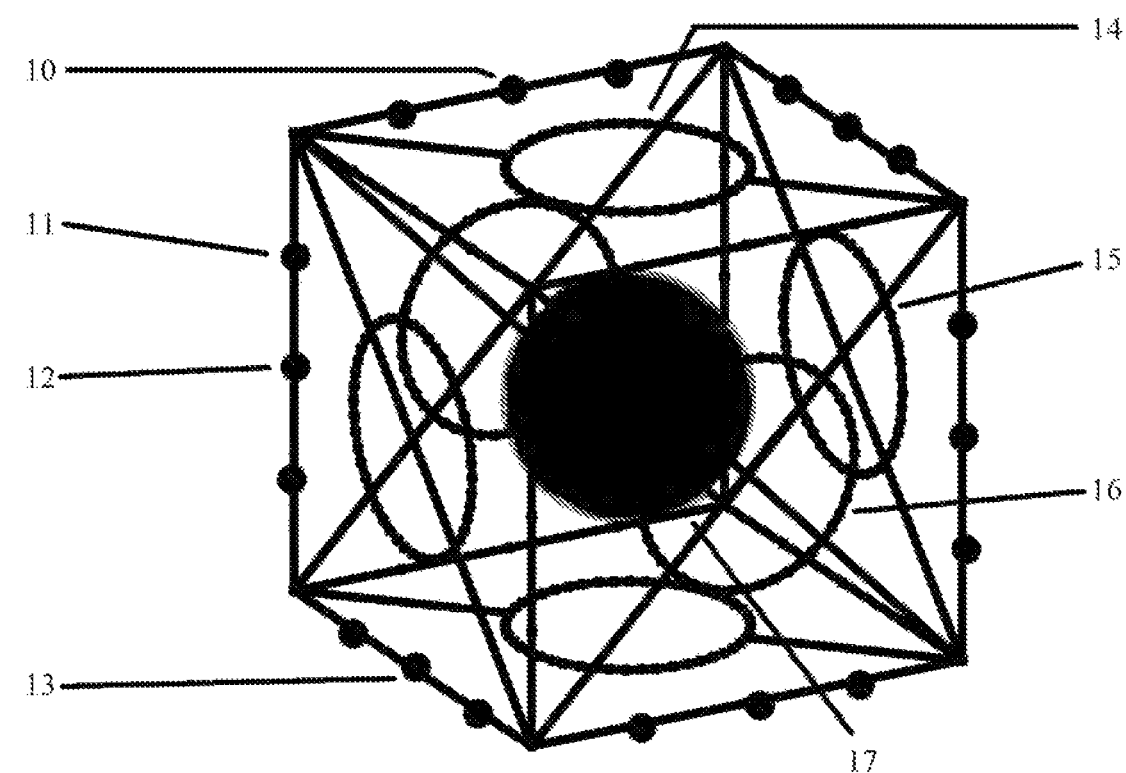
FIG. 1B shows a transparent FIG. 1A with a circle in the center to illustrate where spheres can be found in the Invention's pieces.

FIG. 1B shows the vertices, or dots, along the edges of the cube shown in FIG. 1A (10, 11, 12, 13) that divide the cube into four sections. This way the cube can easily be cut in half or into an object one fourth the size of the original cube. The circles on the sides of the cube (14, 15, 16) are rotated an even number of times to create the sphere that is visible in the middle of the cube (17) that is FIG. 1B. Each of the six sides of the cube have a formation of lines that is the same as the longitudinal lines on maps of the earth. This enables the sphere to be easily cut in half from any side of the cube's six sides and it enables a side shaft to be cut into the circle, with ease.

FIG. 1C is a profile view of the cube (18), the circles on the sides of the cube (19), and the sphere in the middle that is generated with rotated circles (19).

FIG. 2 is a cylinder that is as tall as its diameter, which causes it to occupy a cube space. It has a reversible knob on the top (20) which can fit into a female opening and it can also fit into itself because it has recesses (21, 22) that accommodate the protrusions on the knob. The knob is half the diameter of the cylinder it rests on. This is a basic example of how the Invention's 3D alphabet works. This is like the basic grammar of a written language: the Invention's 3D alphabet follows a specific set of rules to facilitate and enable the construction, re-construction, disassembly and re-assembly of 3D constructions by the average person or by robots that follow standard instructions or standard conventions. By being a cylinder, the piece can be rolled around, it saves space and construction materials, and it can be rotated once inserted into a cavity. Because it occupies an equilateral cube space, it can also be stacked with regular equilateral cubes that are the same size, twice the size or half its size. As with all pieces in the Invention, the relative size of the pieces and their features is what matters. The pieces do not have an absolute size. This is like alphabets, they do not come in an absolute "12-point size." By definition, an alphabet is a modular verbal took set that can be enlarged or made smaller depending on a particular circumstance. That is exactly how the Invention's dimensions work—independently of the exact size they may have at any given time.

FIG. 3 is a view of the sphere at the center of FIG. 1C that shows how each of the sides facing the six sides of a cube that it may go inside (23, 24, 25, 26, 27) have a pole configuration in terms of the vertices (or dots) that make up the sphere.

FIG. 4 is a simple panel with slanted sides (28) that has recessed areas (29, 30) into which knobs or magnetic discs can be inserted to affix the panel into other pieces that are also the panel, or into other pieces of the Invention. With magnets, or with knobs, the panels can be assembled to form a larger panel or they can be assembled into forming a cube. The panels can assemble into combinations of larger panels and cubes, or they can form a stairway by assembling into a series of parts at 90-degree angles. The panel's smooth areas (31), as with all smooth areas of the Invention's pieces, can be magnetized to follow the same "plus and minus" magnetic pole logic as that found on the slanted sides (28) to enable the slanted sides to also be affixed to the flat surfaces (31).

FIG. 5 is an example of how a knob (32) on a cylinder (33) like that found in FIG. 2 can also have hooks (34, 25) that fit into each of the six basic cube sides of the piece (36, 37, 38, 39). The knob at the top of FIG. 5 (32) fits into the circle at the front and middle of FIG. 5 (36) with the hooks at a diagonal orientation (45, 46). Then, the hooks can be rotated to hook into the piece. This can be done on each of the six basic cube sides: the protruding part of the top of FIG. 5 (32) fits into the recessed portion of the top of FIG. 5 (47), and it also fits into the right (38) and left (37) sides, and in the front and back sides (36), and it also fits into the bottom (39). Each place it fits into, it can also rotate to be securely hooked in place. These interfaces can be used interchangeably with cube pieces that do not have basic cylinder shapes and they can be used with poles, panels and other shapes.

FIG. 6 is a cube with shafts (40, 41, 42) that accommodate cylindrical pieces like the one illustrated in FIG. 5. The pieces are of the same size (like the top and bottom large holes at the front right of in FIG. 6 (43, 48)) or the pieces can be half (42) or one-fourth (40, 41) the size of those pieces. The diameter of the large holes in the front right side of FIG. 6 (43, 48) are themselves one fourth the length of the side of the cube (44).

Figure 7:
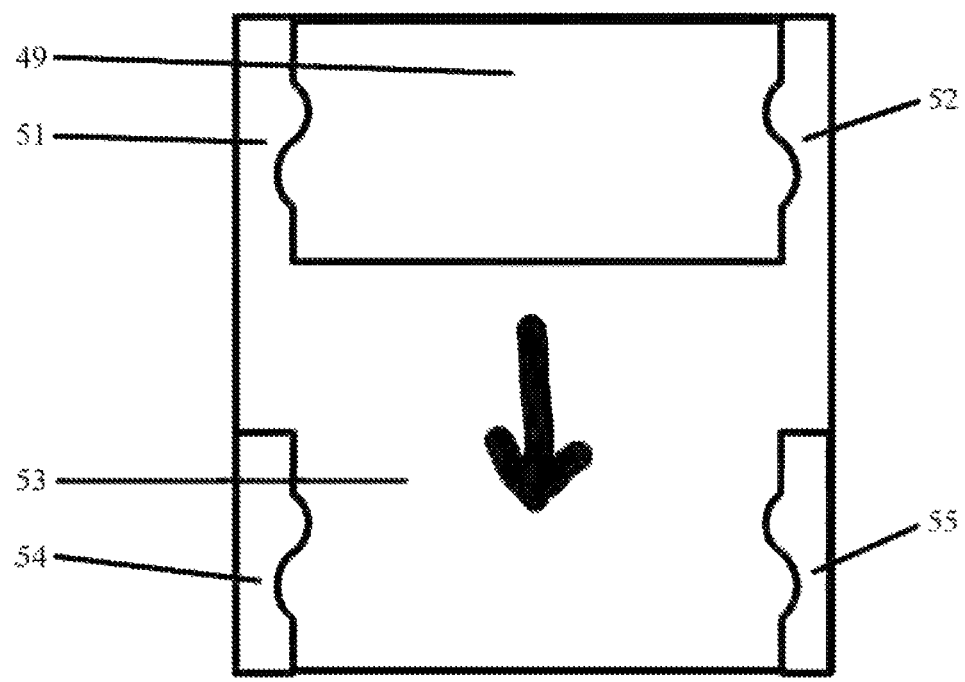
FIG. 7 is a diagram showing how a cylinder with "s" shaped snaps on its sides can fit into an opening with corresponding "s" snap geometries.

FIG. 7 shows a cylinder (49) with "s" shaped snaps on its sides (51, 52) can fit into an opening (53) with corresponding "s" snap geometries (54, 55). In FIG. 7 both the male and female part must be at least somewhat flexible because they must have "give" to allow them to move into place.

Figure 8:
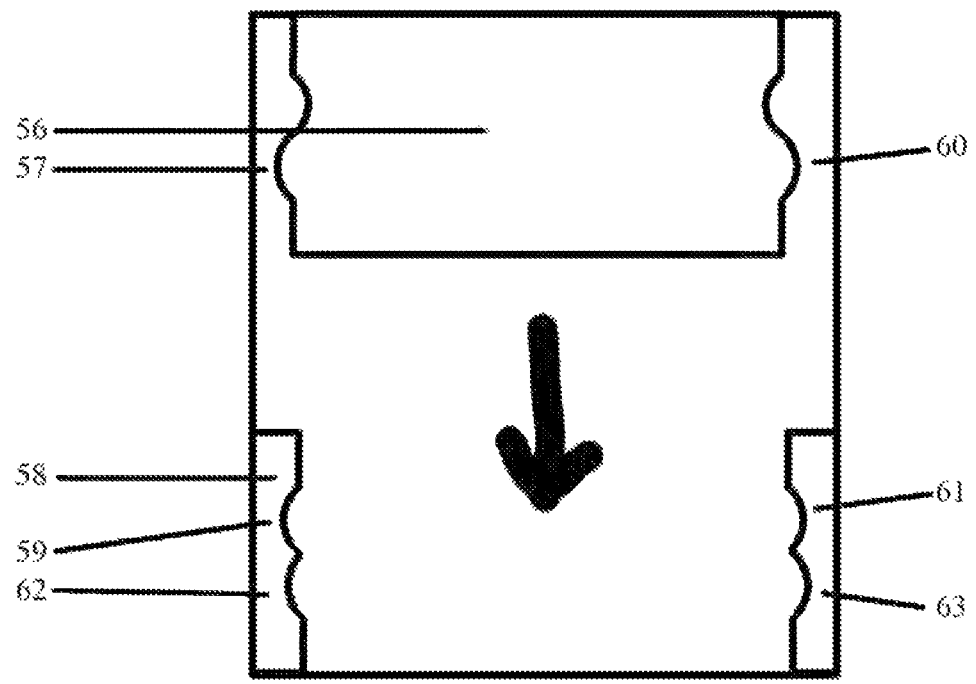
FIG. 8 is diagram of how a flexible male piece can be pushed down into a female piece made of rigid materials.

FIG. 8 is an example of how a flexible male piece (53) can be pushed down into a female piece (58) made of rigid materials. The protruding bumps on the sides of the male piece (57, 60) can be affixed into the top indentation area (59, 61) or the bottom indentation area (62, 63) in the female piece (58) it is pushed down into.

Figure 9:
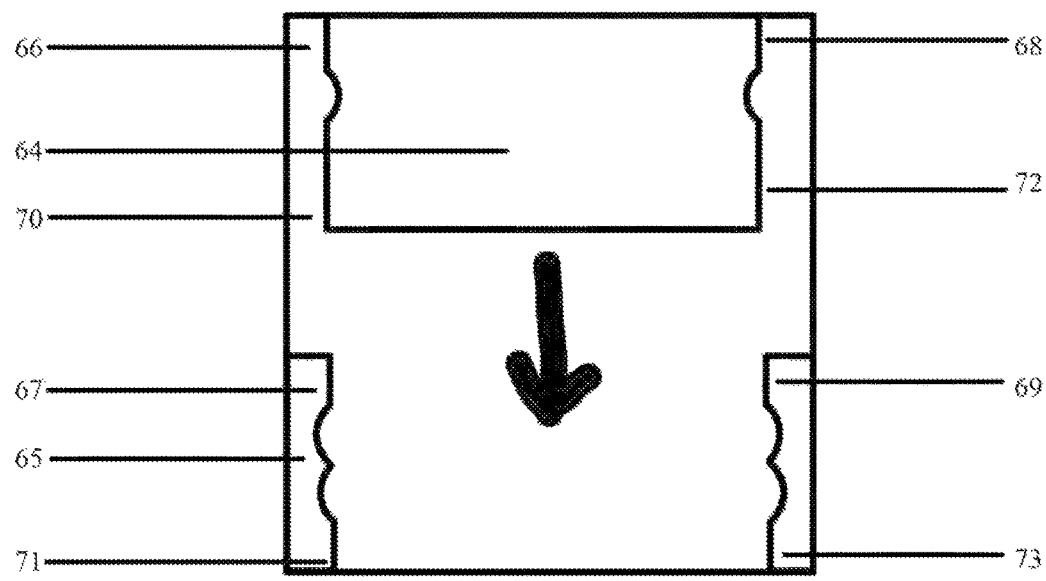
FIG. 9 is a demonstration of how two rigid materials pieces fit into each other.

FIG. 9 is a demonstration of how two rigid materials pieces (64, 65) fit into each other and are secured with the friction at the flat top (66, 67, 68, 69) and bottom areas (70, 71, 72, 73) of the intersecting part of the pieces.

Figure 10A:
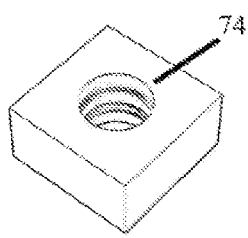
FIG. 10A is an example of a female flexible piece.

FIG. 10A is an example of a female (74) flexible piece.

Figure 10B:
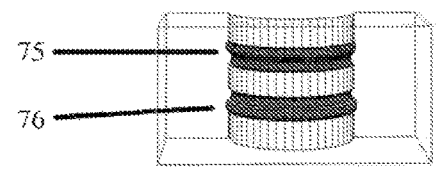
FIG. 10B is a wireframe view of one half of the object shown in FIG. 10A.

FIG. 10B is a wireframe view of one half of the object shown in FIG. 10A where its "s" snaps can be clearly seen (75, 76).

Figure 11A:
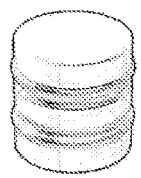
FIG. 11A is an example of a male flexible piece.

FIG. 11A is an example of a male flexible piece.

Figure 11B:
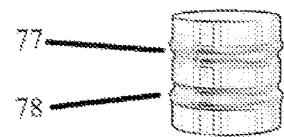

FIG. 11B is another example of a male flexible piece that is a near-profile view from the side where its "s" snaps can be clearly seen (77, 78).

Figures 12A, 12B, 12C, 13A, 13B:
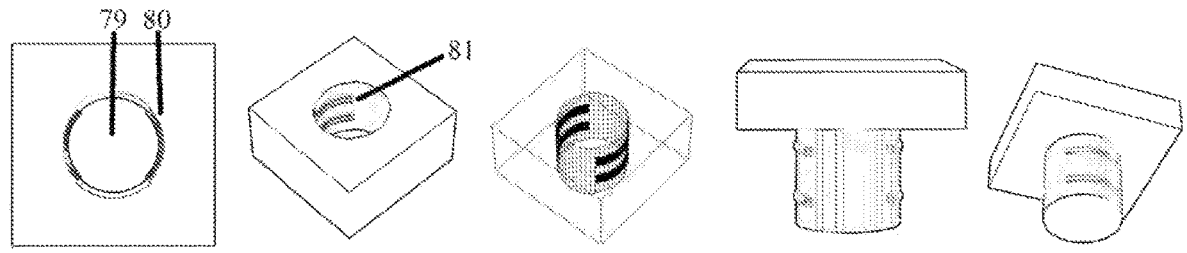
FIG. 12A is an example of a rigid materials female piece.
FIG. 12B is a view from the top corner angle of the piece in FIG. 12A.
FIG. 12C is a wireframe view of the piece in FIG. 12B.
FIG. 13A is an example of a rigid materials male piece that can be inserted into FIG. 12A.
FIG. 13B is a view from the bottom corner of the piece in FIG. 13A.

FIG. 12A is an example of a rigid materials female piece.

FIG. 12B is a view from the top corner angle of the piece in FIG. 12A.

FIG. 12C is a wireframe view of the piece in FIG. 12B.

FIG. 13A is an example of a rigid materials male piece that can be inserted into FIG. 12A (79) at one angle and then rotated into the hooking area (80, 81) to have more friction and grip. The female hooking area can also snap with male pieces made of flexible materials.

FIG. 13B is a view from the bottom corner of the piece in FIG. 13A.

Figure 14:
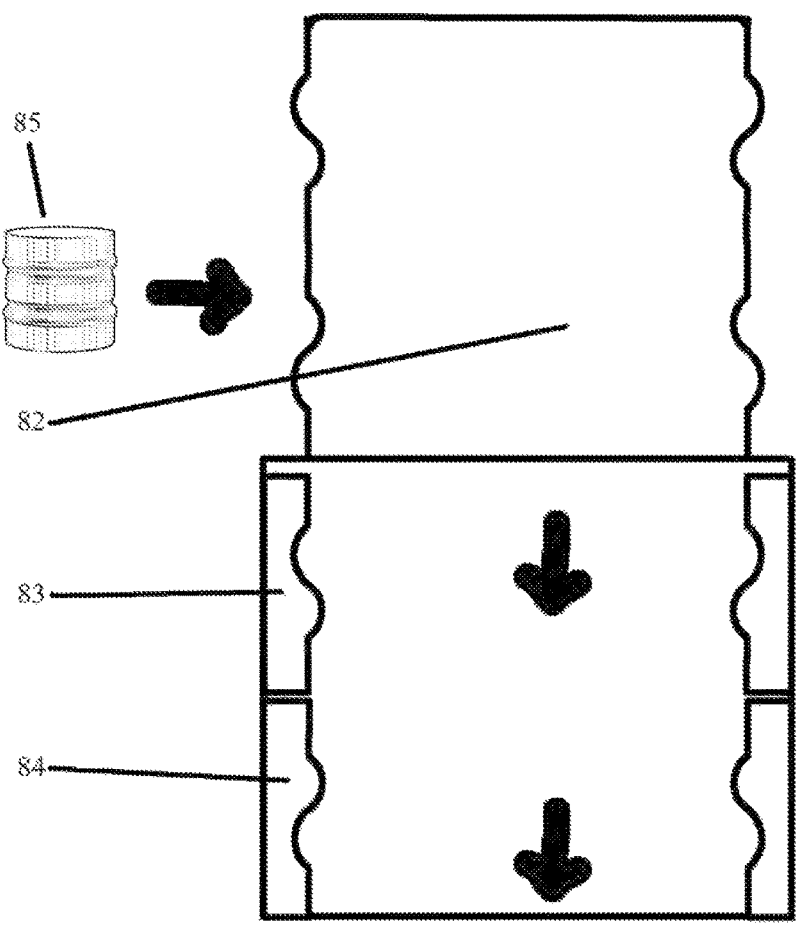
FIG. 14 is a diagram of how a flexible materials piece secures two female materials pieces together.

FIG. 14 is a demonstration, in a profile-view format (82), of how a flexible materials piece (85) secures two female materials pieces (83, 84) together when it is pushed into them.

Figure 15:
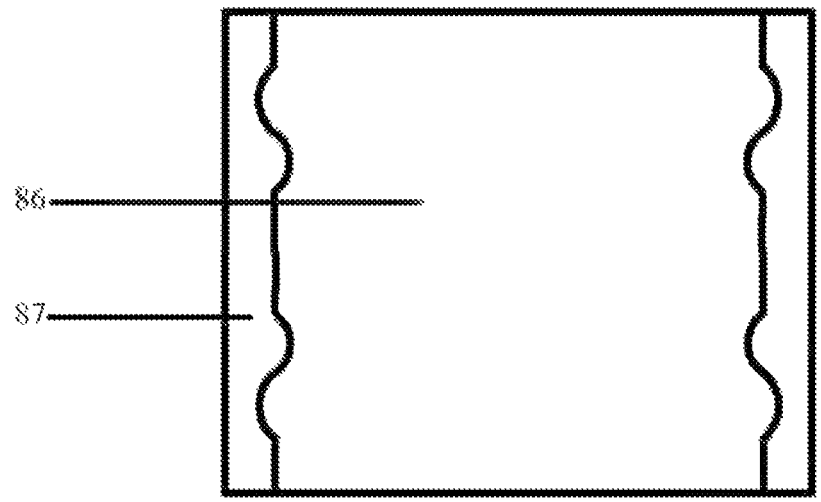
FIG. 15 shows how the assembled piece looks.

FIG. 15 shows how the assembled piece looks once the male piece (86) has been inserted to hold the pieces with female interfaces (87) together.

Figure 16:
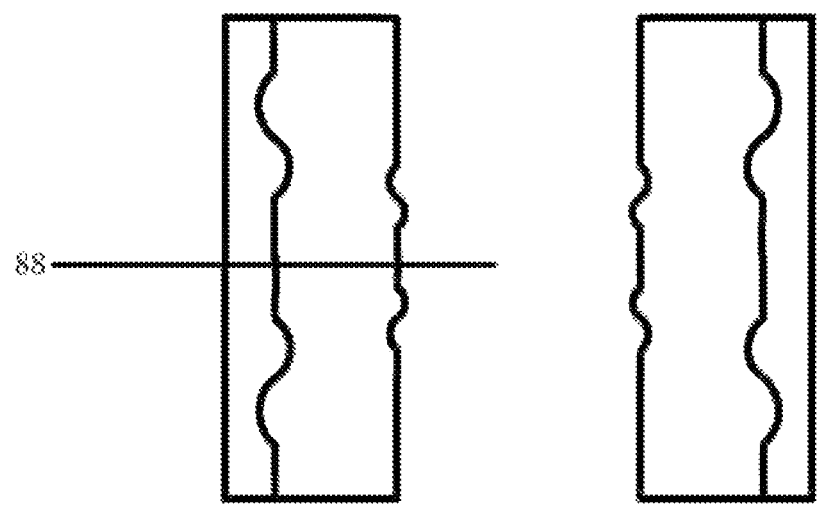
FIG. 16 is a cut-out profile view of how an additional shaft in the middle of FIG. 15 can have the same basic geometry, except at one-half the diameter of the opening filled by the center piece in FIG. 15.

FIG. 16 is a demonstration of how an additional shaft in the middle of these pieces (88) can have the same basic geometry, except at one-half the diameter of the opening filled by the male piece in FIG. 15 (86). That additional shaft in the middle (88) can be used to transport pieces, move spheres around, wiring, ventilation and other such things can be inserted there, and it can be used to be a place into which reinforcement pieces like shafts are inserted.

Figure 17:
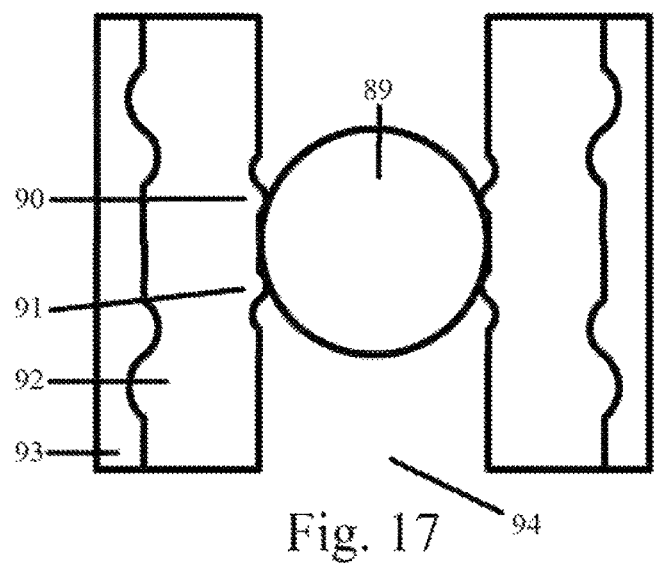
FIG. 17 demonstrates how a sphere can be inserted into the middle shaft.

FIG. 17 demonstrates how a sphere (89) can be inserted into the middle shaft and be held in place by the "s" snaps (90, 91). In this manner the sphere also presses the flexible material (92) onto the outer material (93). This has the effect of locking the pieces together. A smooth rigid materials shaft can also be inserted into this middle shaft (94) instead of a sphere. This is how the construction can be reinforced.

Figure 18:
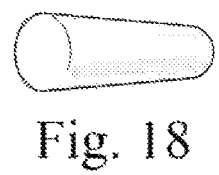
FIG. 18 is an example of a pole that can be inserted into the middle shaft of FIG. 17.

FIG. 18 is an example of a pole that can be inserted into the middle shaft (94) of FIG. 17. Short poles can operate as knobs (e.g., FIG. 18) and they can also take on the geometry of a nail (e.g., FIGS. 19 and 20).

Figure 19:
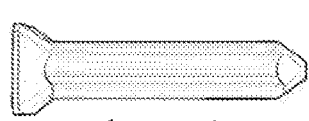
FIG. 19 is an example of how that pole can be given a geometry that looks like a nail.

FIG. 19 is an example of how that pole can be given a geometry that looks like a nail.

Figure 20:
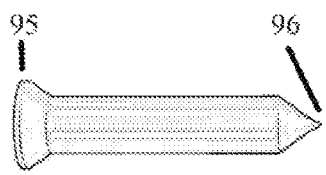
FIG. 20 is an example of a nail with rounded ends and a pointed insertion point.

FIG. 20 is an example of a nail with rounded ends (95) and a pointed insertion point (96).

Figure 21:
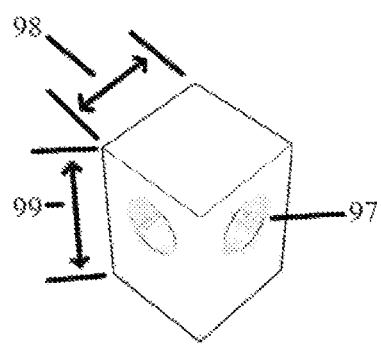
FIG. 21 is an example of how a cube can have female shafts inserted into it. The cube is twice as tall as it is wide.

FIG. 21 is an example of how a cube can have female shafts inserted into it (97). The cube is twice as tall (99) as it is wide (98).

Figure 22A:
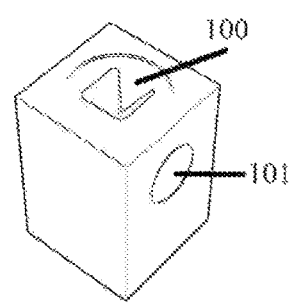
FIG. 22A shows how the cube can have an insertion point at the top for a nail.

FIG. 22A shows how the cube can have an insertion point at the top (100) for the nail which, once inserted, will push out the black circular area in the middle right face (101) of FIG. 22A. This will cause it to push into other shaft interfaces, like those on FIG. 21.

FIG. 22B is a view from the bottom corner of the object in FIG. 22A.

FIGS. 22B through 22H are different views of the same object that demonstrate how a nail pushed in the top (102, 103, 104, 105, 106, 107, 108) causes the sides to be pushed out (109, 110, 111, 112, 113, 114, 115) to lock with pieces on the sides. The knob area being pushed out can have an "s" snap configuration placed on it for greater strength, it can be magnetized with a positive charge so that it can hold onto negative charges of indented spaces it may be inserted into, etc. In short, these interfaces can be used in isolation, and in combination, with each other in a wide array of ways.

FIG. 22C is a profile view of the bottom of the piece in FIG. 22A.

FIG. 22D is a wireframe view from the top of the piece in FIG. 22A.

FIG. 22E is a side view from a top corner of a cutout of the piece in FIG. 22A.

FIG. 22F is a bottom side view of a cutout of the piece in FIG. 22A.

FIG. 22G is a top corner view of a cutout of the piece in FIG. 22A.

FIG. 22H is a bottom corner view of a cutout of the piece in FIG. 22A.

Figure 23:
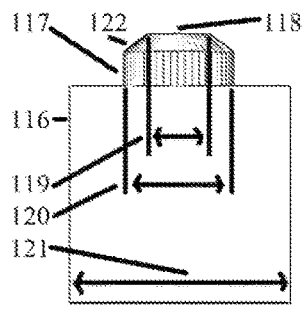
FIG. 23 is a profile view of a cube with a knob on top.

FIG. 23 is a profile view of a cube (116) with a knob on top (117). The knob has slanted sides (122) towards the top to help guide it into a hole (118). In addition, the top of that knob (118) is in the exact position necessary to support a pole or sphere in the cube area on top of the cube area of FIG. 23 for poles and spheres with diameters that are exactly half the size of the cube's edges (121). The knob's (117) diameter (120) is half the size of the cube (121) and the hole at the top of the knob (118) is half the diameter (199) of the knob's diameter (120)

Figure 24A:
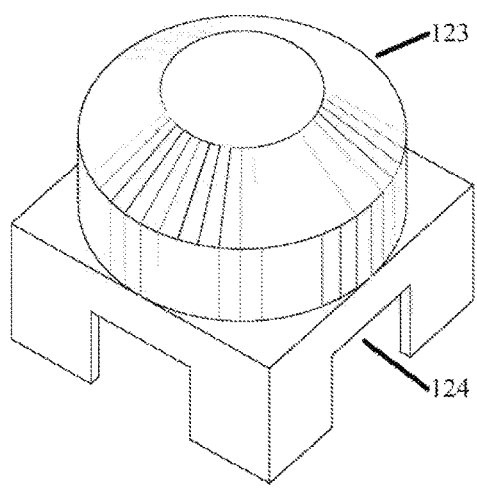
FIG. 24A is a minimalist male and female knob that fits into itself.

FIG. 24A is a minimalist male (123) and female knob (124) that fits into itself. It can form beams when assembled together.

Figure 24B:
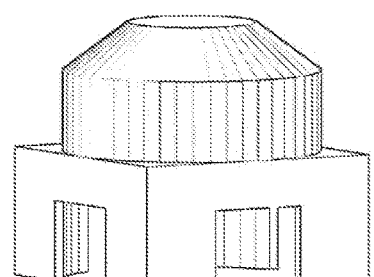
FIG. 24B is a side corner view of the piece that is in FIG. 24A.

FIG. 24B is a side corner view of the piece that is in FIG. 24A.

Figure 24C:
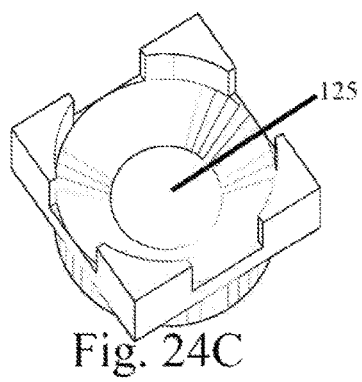
FIG. 24C is a bottom corner view of the piece that is in FIG. 24A.

FIG. 24C is a bottom corner view of the piece that is in FIG. 24A that shows the female knob (125), which is where the male knob (123) fits into.

Figure 24D:
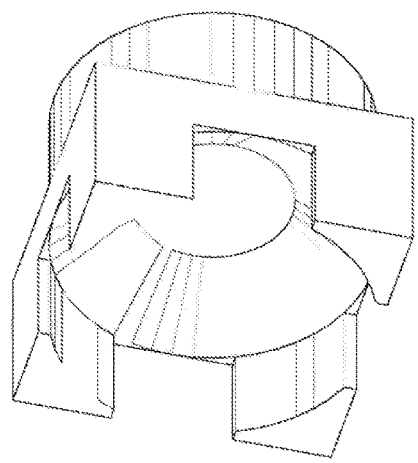
FIG. 24D is a view from the bottom and mostly to one side of the piece that is in FIG. 24A.

FIG. 24D is a view from the bottom and mostly to one side of the piece that is in FIG. 24A.

Figure 25A:
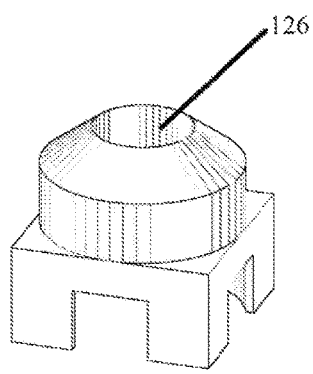
FIG. 25A is similar to FIG. 24A except it has a hollow center.

FIG. 25A is similar to FIG. 24A except it has a hollow center (126) that allows for a reinforcement rod to be inserted to strengthen its constructions. Spheres, wires and other internal building material can also go through the opening and the piece uses less material when it is manufactured.

Figure 25B:
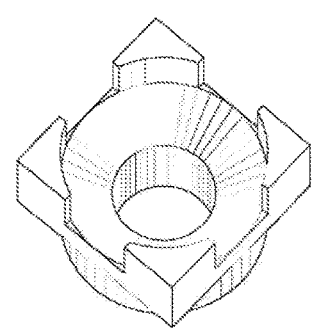
FIG. 25B is a view from the bottom of the piece that is FIG. 25A.

FIG. 25B is a view from the bottom of the piece that is FIG. 25A.

Figure 26A:
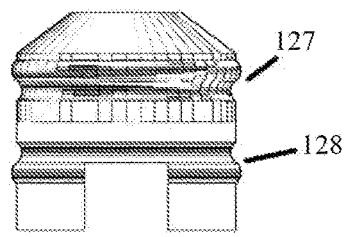
FIG. 26A is similar to FIG. 25A except it also holds itself together with snaps.

FIG. 26A is similar to FIG. 25A except it also holds itself together with "s" snaps (127, 128) of the kind discussed herein. These knob pieces at FIGS. 23, 24A, 25A and 26A are interchangeable. The cylindrical (127) or the square side (128) of FIG. 26A can be inserted into a larger cube's openings (129) in the manner shown in FIG. 27A (130) to secure those cubes to each other or to other pieces.

Figure 26B:
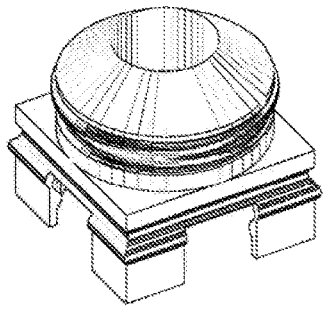
FIG. 26B is a top corner view of the object in FIG. 26A.

FIG. 26B is a top corner view of the object in FIG. 26A.

Figure 26C:
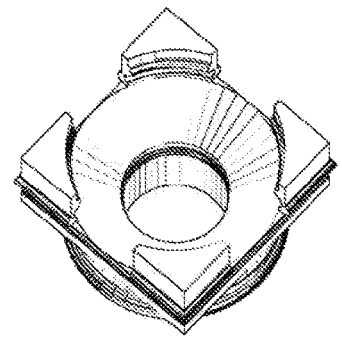
FIG. 26C is a bottom corner view of the object in FIG. 26A.

FIG. 26C is a bottom corner view of the object in FIG. 26A.

Figure 27A:
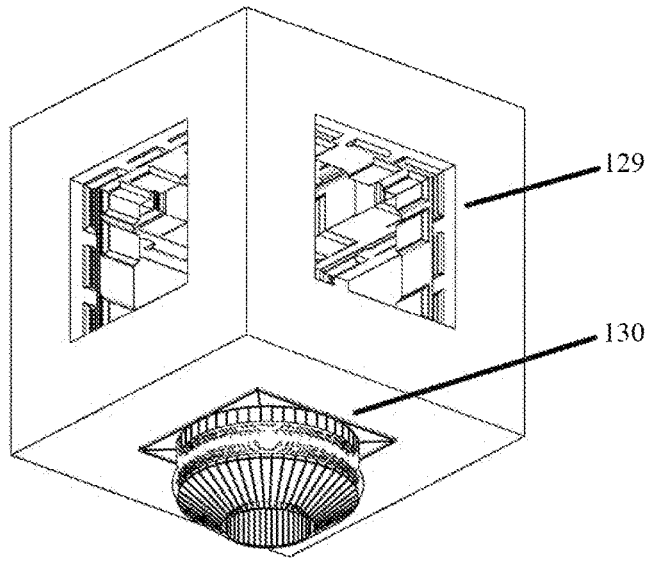
FIG. 27A shows how the cylindrical or the square side of FIG. 26A can be inserted into a larger cube.

FIG. 27A shows how the cylindrical or the square side of FIG. 26A can be inserted into a larger cube (130) to secure those cubes to each other or to other pieces.

Figure 27B:
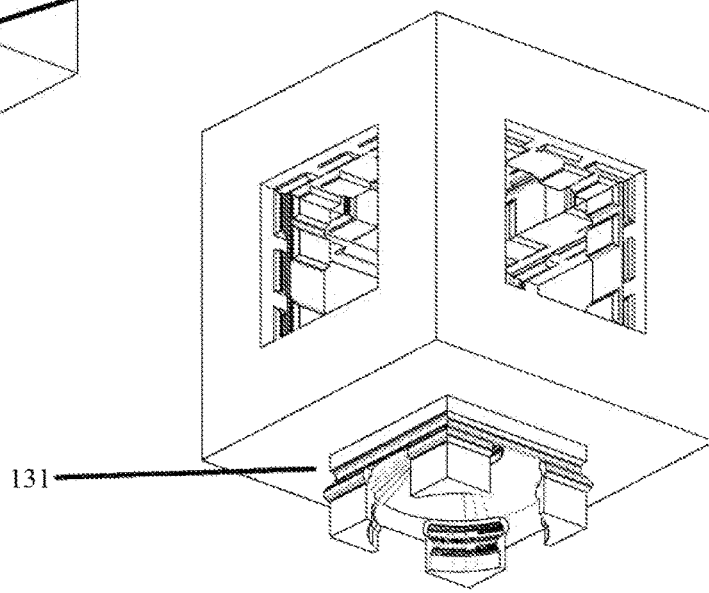
FIG. 27B shows how the other side of FIG. 26A can be inserted into the cube that is FIG. 27A.

FIG. 27B shows how the other side of FIG. 26A can be inserted into the cube (131) that is FIG. 27A.

Figure 28A:
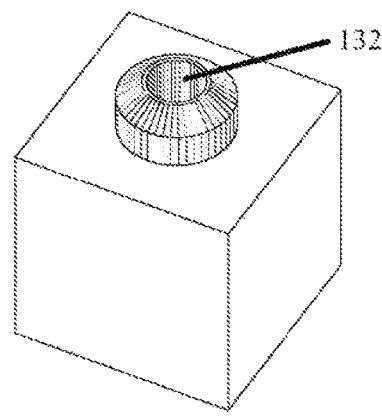
FIG. 28A is similar to FIG. 23 except it has a hollow knob.

FIG. 28A is similar to FIG. 23 except it has a hollow knob (132).

Figure 28B:
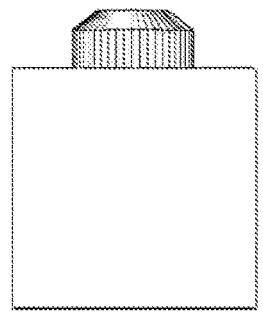
FIG. 28B is a profile view of the object in FIG. 28A.

FIG. 28B is a profile view of the object in FIG. 28A.

Figure 29A:
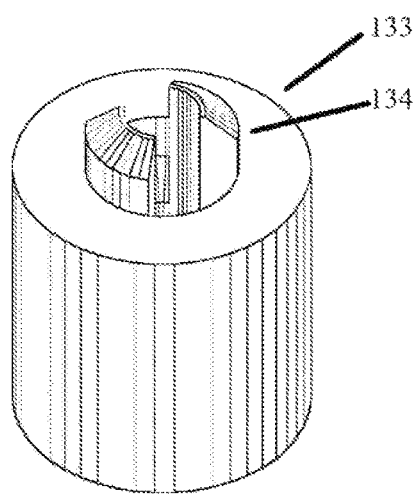
FIG. 29A is similar to FIG. 28A except its bottom area is a cylinder.

FIG. 29A is similar to FIG. 28A except its bottom area is a cylinder (133) and the knob in the middle (134) is reversible, meaning it can fit into itself in addition to being a knob that fits into recessed spaces.

Figure 29B:
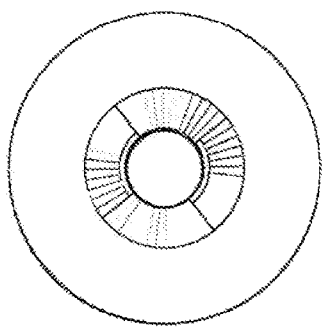
FIG. 29B is a profile view from the top of the object in FIG. 29A.

FIG. 29B is a profile view from the top of the object in FIG. 29A.

Figure 29C:
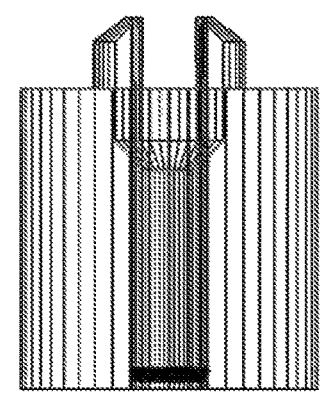
FIG. 29C is a profile wireframe view from the side of the object in FIG. 29A.

FIG. 29C is a profile wireframe view from the side of the object in FIG. 29A.

FIG. 30A is similar to FIG. 29A except it has "s" snaps on the outside of the knob (135) and on the inside (136). This allows FIG. 30A to be snapped to itself, to be locked in place with a sphere or cylinder inserted inside it once is snapped to itself, and it allows it to hold a pole(137) in the manner shown in FIG. 31. Tat pole is FIG. 32.

FIG. 30B is a near-profile view from the side of the top of the object in FIG. 30A.

FIG. 30C is a view from the top and to one side of the object that is in FIG. 30A.

FIG. 31 is a demonstration of how the object in FIG. 30A can have the pole that is FIG. 32 fit into it (137).

FIG. 32 is the pole that fits into FIG. 30A in the manner shown in FIG. 31 (137).

Figure 33A:
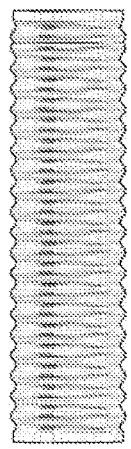
FIG. 33A is a profile view of the object that is FIG. 33B.
Figure 33B:
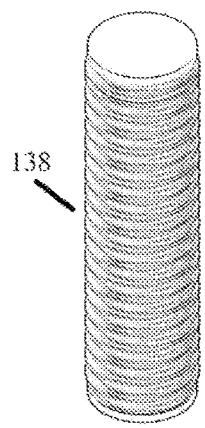
FIG. 33B is similar to FIG. 32 except the entire pole has a wavy pattern.

FIG. 33A is a profile view of the object that is FIG. 33B.

FIG. 33B is similar to FIG. 32 except the entire pole has a wavy pattern (138) to give it more grip and more settings at which it can hold other pieces together with "s" snap interfaces.

Figure 34A:
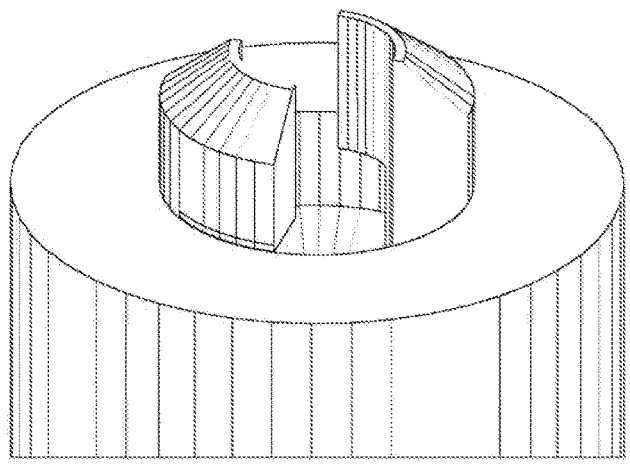
FIG. 34A is similar to FIG. 29A except FIG. 34A also hooks with itself.
Figure 34B:
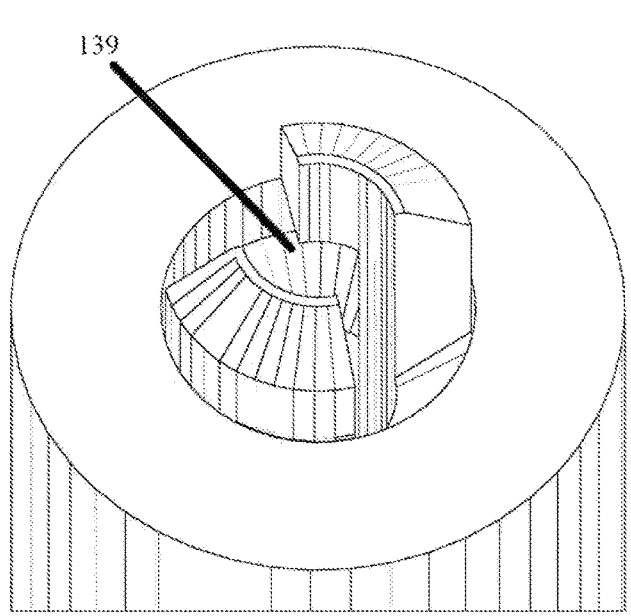
FIG. 34B is a top side view of the object in FIG. 34A.

FIG. 34A is similar to FIG. 29A except FIG. 34A also hooks with itself at the point denoted by element 139 in FIG. 34B.

FIG. 34B is a top side view of the object in FIG. 34A.

Figure 34C:
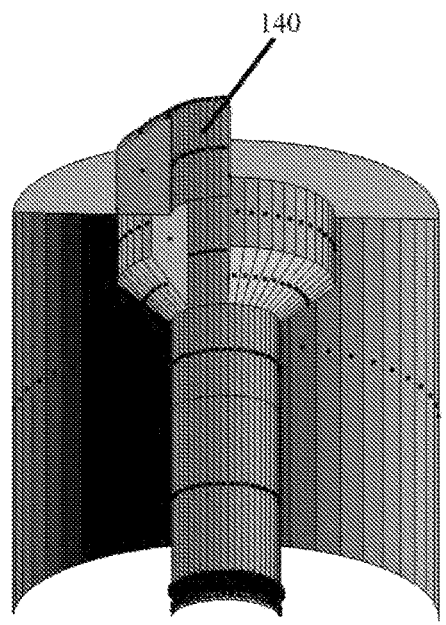
FIG. 34C is a profile view of half of the piece showing one of the two hooks.

FIG. 34C is a profile view of half of the piece showing one of the two hooks (140).

Figure 35A:
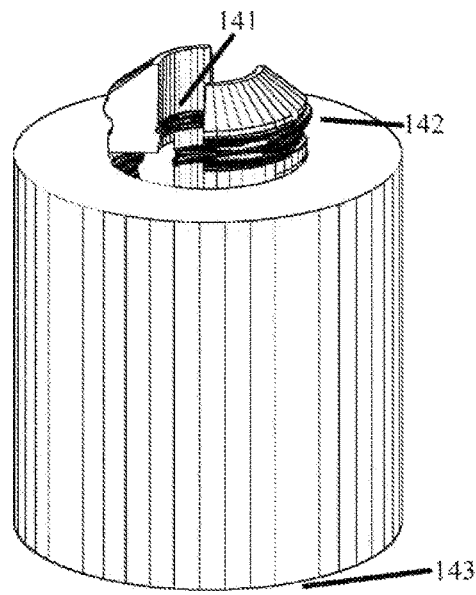
FIG. 35A is similar to FIG. 34A except it has snaps on inner and outer sides.

FIG. 35A is similar to FIG. 34A except it has "s" snaps on the inner (141) and outer (142) sides of the hook/knob and it also has a female opening at the bottom (143) where the hook/knob can be inserted and snapped into. FIG. 35D is a wireframe view of the male and female hook, snap and knob interfaces (144, 145).

Figure 35B:
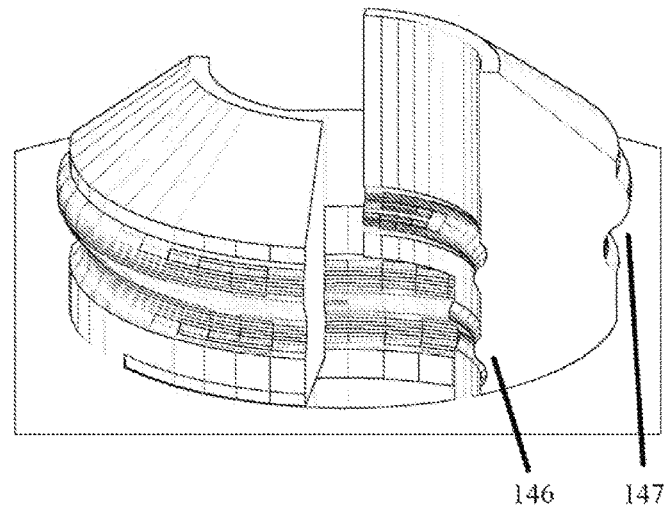
FIG. 35B is an up-close view of the top part of FIG. 35A.

FIG. 35B is an up-close view of the top part of FIG. 35A with inner (146) and outer (147) "s" snaps.

Figure 35C:
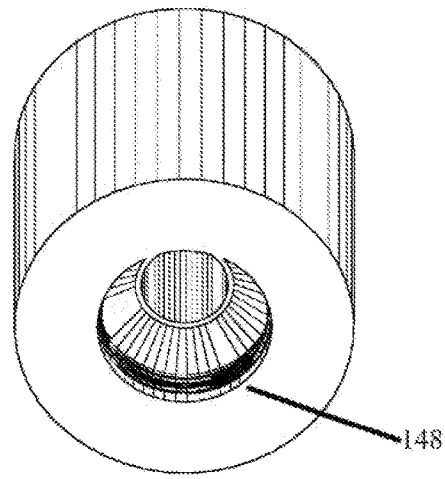
FIG. 35C is a bottom side view of the object that is in FIG. 35A.
Figure 35D:
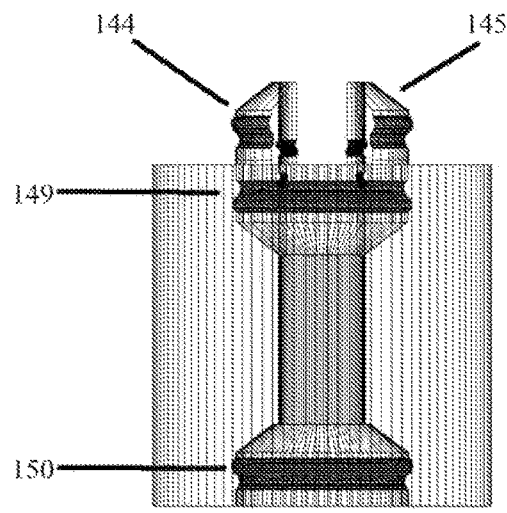
FIG. 35D is a wireframe side profile view of the object that is in FIG. 35A.

FIG. 35C is a bottom side view of the object that is in FIG. 35A that shows where the outside "s" snaps (142) insert into the female "s" snaps (148).

FIG. 35D is a wireframe side profile view of the object that is in FIG. 35A that shows the interior "s" snaps that are used when the top knob (144, 145) fits into itself (149) and when the top knob (144, 145) fits into the bottom of the object (150).

FIG. 36A is similar to FIG. 35A except that it is locked when a pole is inserted at a 90-degree angle through the top knob (151).

FIG. 36B is a top corner view of the object that is in FIG. 36A showing where the pole inserts (152).

FIG. 37A is similar to FIG. 36A except it has female interfaces on its bottom (153).

FIG. 37B is a profile view of the object in FIG. 37A.

FIG. 37C is a wireframe side profile view of the object that is in FIG. 36A.

FIG. 38 is an example of where a pole is inserted into FIG. 37A (154) to lock it when another FIG. 37A shape has been inserted to hook and snap into the top knob.

FIG. 38B shows how FIB. 36A (155), when snapped and hooked into FIG. 37A (156), is then locked with the insertion of a pole at 90-degrees in the middle (157).

FIG. 38C is a different view of this construction for clarity.

FIG. 38D is a profile view of FIG. 36A (158) that shows the shaft opening (159) that is created when the piece is assembled together with FIG. 37A (160) and then rotated to hook in place.

FIG. 37A's knob can be inserted into the female knob opening at the bottom of FIG. 37A (153) and that inserted knob can also be locked in place when a pole is inserted into the opening (161).

Figure 39A:
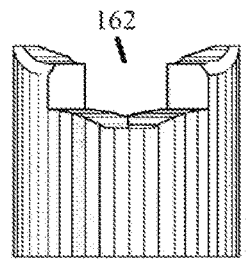
FIG. 39A is a simple knob that can fit into itself.

FIG. 39A is a simple knob that can fit into itself and that can hold a sphere or pole in the middle of it (162).

Figure 39B:
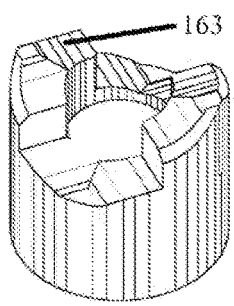
FIG. 39B is a top side view of the object in FIG. 39A.

FIG. 39B is a top side view of the object in FIG. 39A. The slanted top of the knob (163) allows it to hug poles that are inserted at 90-degrees on top of it and resist being rotated.

Figure 39C:
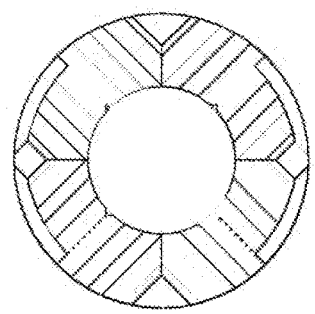
FIG. 39C is a profile view of the knob from the top.

FIG. 39C is a profile view of the knob from the top.

Figure 40A:
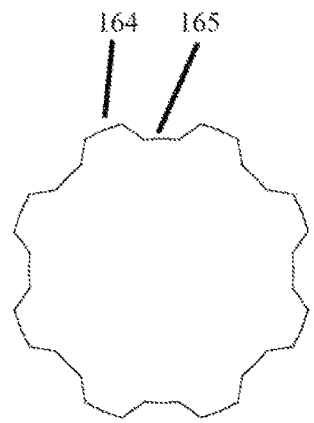
FIG. 40A is a top profile view of a knob with teeth.

FIG. 40A is a top profile view of a knob with teeth (164) that can add grip, allow for the female openings it goes into to have two sizes (the outer diameter size at element 164 and the inner diameter size at element 165 that the teeth create in the profile view at FIG. 40A). These teeth also allow the pole to lock constructions in one orientation so they do not rotate relative to each other.

Figure 40B:
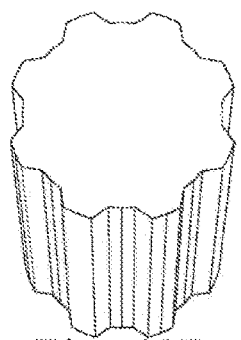
FIG. 40B is a top side view of the object in FIG. 40A.

FIG. 40B is a top side view of the object in FIG. 40A.

Figure 40C:
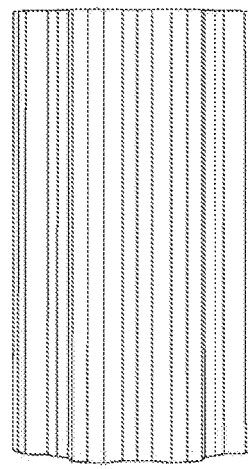
FIG. 40C is a side profile view of the object in FIG. 40A.

FIG. 40C is a side profile view of the object in FIG. 40A.

Figure 41A:
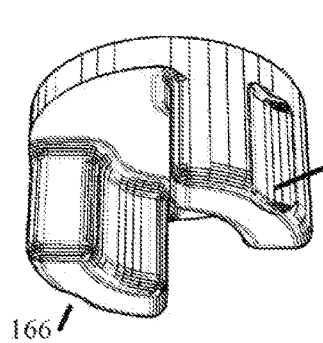
FIG. 41A is a simple reversible hollow knob that fits into openings to close them.

FIG. 41A is a simple reversible hollow knob that fits into openings to close them, it fits into itself to form a little compartment, and it can be affixed to a pole. The two indentations on its outer edge (166, 167) allow it to be assembled within larger constructions that have exponentially larger and smaller interfaces.

Figure 41B:
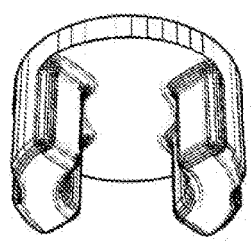
FIG. 41B is another bottom side view of the object in FIG. 41A.

FIG. 41B is a bottom side view of the object in FIG. 41A except from a different side angle.

Figure 42:
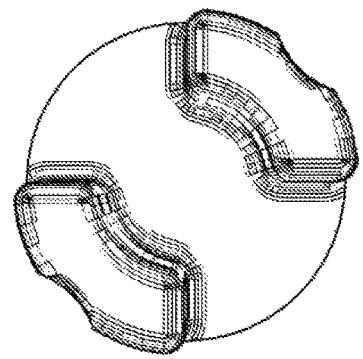
FIG. 42 is a profile view of FIG. 41A from the bottom.

FIG. 42 is a profile view of FIG. 41A from the bottom.

Figure 43A:
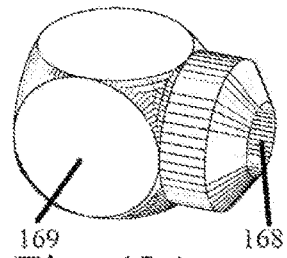
FIG. 43A is a simple hollow knob on a rounded cube.

FIG. 43A is a simple hollow knob (168) on a rounded cube (169) whose circular sides can easily plug holes and, when magnetized properly, interface with poles affixed to it.

Figure 43B:
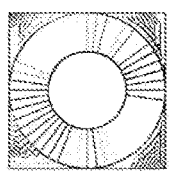
FIG. 43B is a profile view from the top of the object in FIG. 43A.

FIG. 43B is a profile view from the top of the object in FIG. 43A.

Figure 43C:
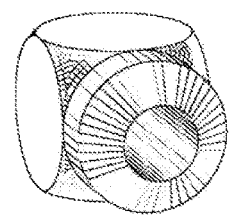
FIG. 43C is a top corner view of the object in FIG. 43A from a different angle.

FIG. 43C is a top corner view of the object in FIG. 43A from a different angle.

Figure 43D:
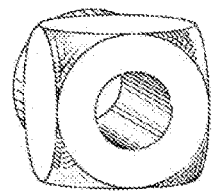
FIG. 43D is a view from a back corner of the object in FIG. 43A.

FIG. 43D is a view from a back corner of the object in FIG. 43A.

Figure 44A:
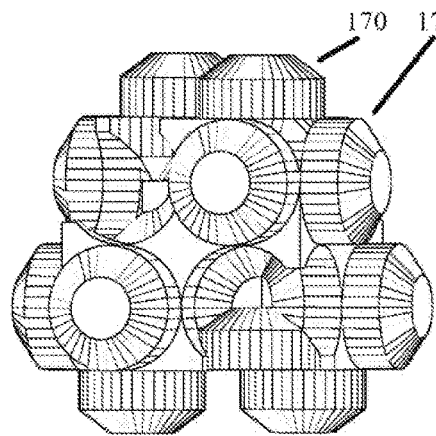
FIG. 44A is a simple reversible knob cube.

FIG. 44A is a simple reversible knob cube where each male knob (170, 171) also operates as a female interface to efficiently hold the cubes together.

Figure 44B:
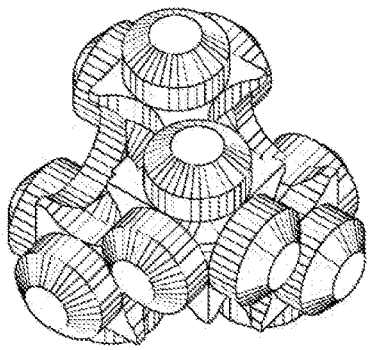
FIG. 44B is a top corner view of the object in FIG. 44A.

FIG. 44B is a top corner view of the object in FIG. 44A.

Figure 44C:
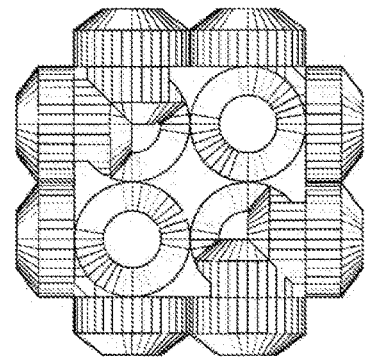
FIG. 44C is a side profile view of the object in FIG. 44A.

FIG. 44C is a side profile view of the object in FIG. 44A.

Figure 44D:
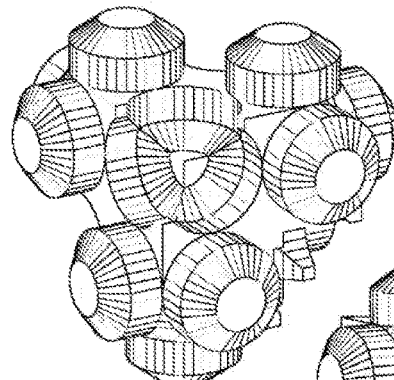
FIG. 44D is a top corner view of the object in FIG. 44A.

FIG. 44D is a top corner view of the object in FIG. 44A from a different angle than that shown in FIG. 44B.

Figure 44E:
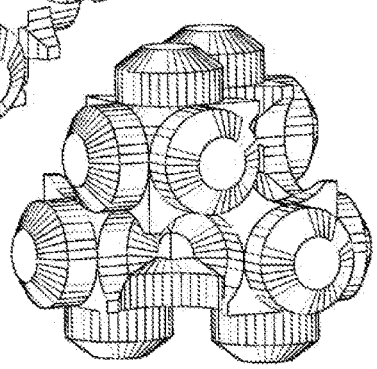
FIG. 44E is a side corner view of the object in FIG. 44A.

FIG. 44E is a side corner view of the object in FIG. 44A.

Figure 45A:
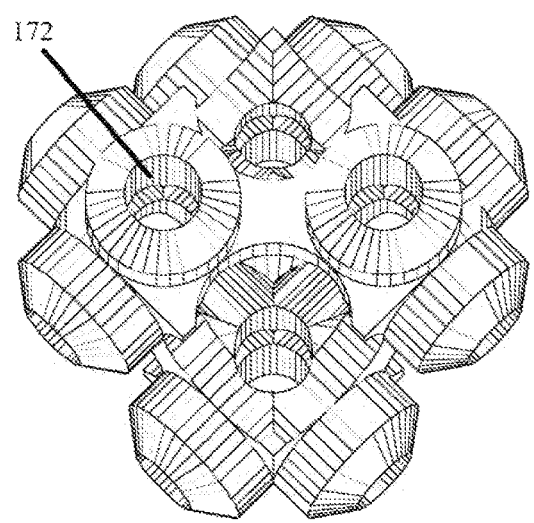
FIG. 45A is the same as FIG. 44A except it has hollow knobs.

FIG. 45A is the same as FIG. 44A except it has hollow knobs (172) that make for more efficient manufacture and allow it to be reinforced with poles (173) in the manner shown in FIG. 47B.

FIG. 45B is a side profile view of the object in FIG. 45A.

FIG. 45C is a top corner view of the object in FIG. 45A from a different angle.

FIG. 46A is a panel that makes the sides of the knob cubes flat (175) when affixed to them (174) in the manner shown in FIG. 47A.

FIG. 46B is a side profile view of the object in FIG. 46A.

FIG. 46C is a top corner view of the object in FIG. 46A.

FIG. 47A is a demonstration of how FIG. 45A (176) fits onto (174) FIG. 46A (177).

FIG. 47B is a demonstration of how the hollow pole in FIG. 48A (178) reinforces (173) the hollow knobs of FIG. 45A (179).

FIG. 48A is a side view of the hollow pole that can be inserted into FIG. 45A.

FIG. 48B is a top side view of the hollow pole that is in FIG. 48A.

Figure 49A:
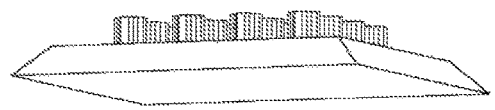
FIG. 49A is a larger panel than that of FIG. 46A.
Figure 50:
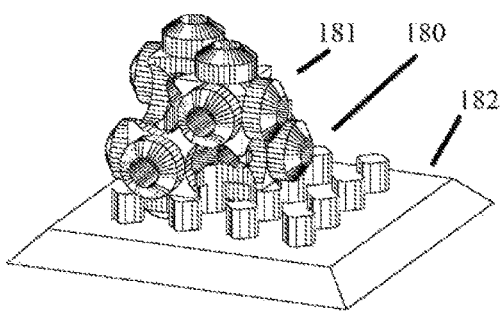
FIG. 50 is a demonstration of how FIG. 45A can fit onto FIG. 49A.

FIG. 49A is a larger panel than that of FIG. 46A which allows coverage of greater surface area and that strengthens more knob cubes when they are affixed to it in the manner shown in FIG. 50 (180). The larger surface area of this panel allows for more versatility of design for shapes that used it.

Figure 49B:
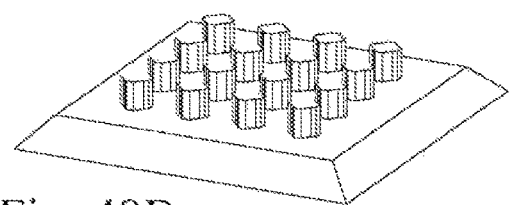
FIG. 49B is a top corner view of the object in FIG. 49A.

FIG. 49B is a top corner view of the object in FIG. 49A.

FIG. 50 is a demonstration of how FIG. 45A (181) can fit onto (180) FIG. 49A (182).

Figure 51A:
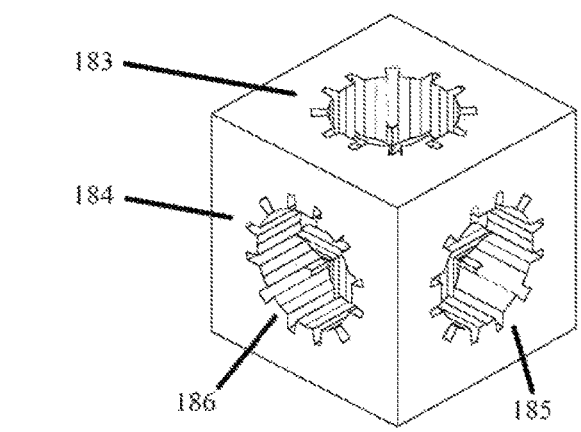
FIG. 51A is a cube with six shafts going through its sides.

FIG. 51A is a cube with six shafts going through its sides (183, 184, 185). The shafts have teeth (186) which allow for greater friction with poles that have corresponding teeth. It also allows for poles with corresponding teeth to lock in place. Teeth on poles is an interface that is also described elsewhere herein, including at FIG. 40A.

Figure 51B:
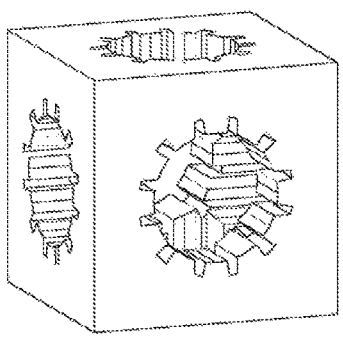
FIG. 51B is a side view of the object in FIG. 51A.

FIG. 51B is a side view of the object in FIG. 51A.

Figure 51C:
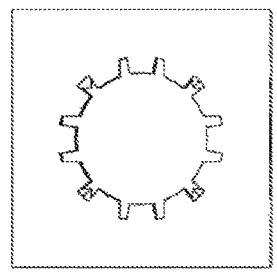
FIG. 51C is a side profile view of the object in FIG. 51A.

FIG. 51C is a side profile view of the object in FIG. 51A.

Figure 52A:
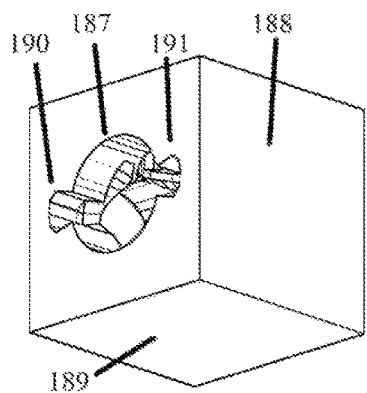
FIG. 52A is a cube with shafts that go through four of its sides.

FIG. 52A is a cube with shafts (187) that go through four of its sides, leaving the other two sides flat (188, 189). Its female hook interfaces (190, 191) are similar to those of FIG. 5 except FIG. 52A is a cube and not a cylinder.

Figure 52B:
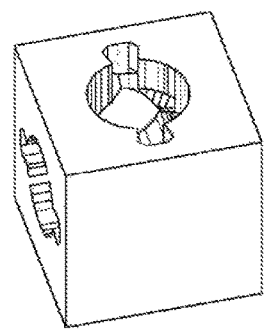
FIG. 52B is a top side view of the object in FIG. 52A.

FIG. 52B is a top side view of the object in FIG. 52A.

Figure 52C:
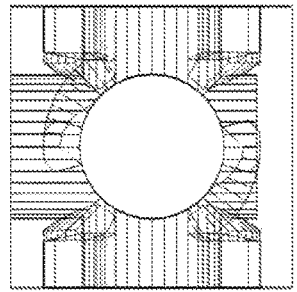
FIG. 52C is a wireframe side profile view of the object in FIG. 52A.

FIG. 52C is a wireframe side profile view of the object in FIG. 52A.

Figure 53A:
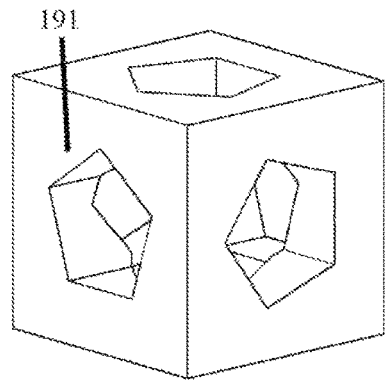
FIG. 53A is an example of how a standard shape—a pentagon—can be easily integrated into constructions.

FIG. 53A is an example of how a standard shape—a pentagon (191)—can be easily integrated into constructions.

Figure 53B:
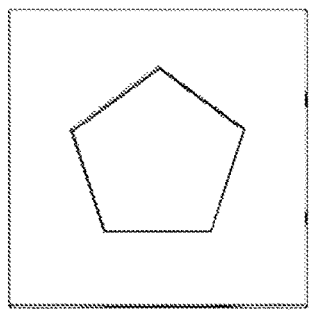
FIG. 53B is a side profile view of the object in FIG. 53A.

FIG. 53B is a side profile view of the object in FIG. 53A.

Figure 53C:
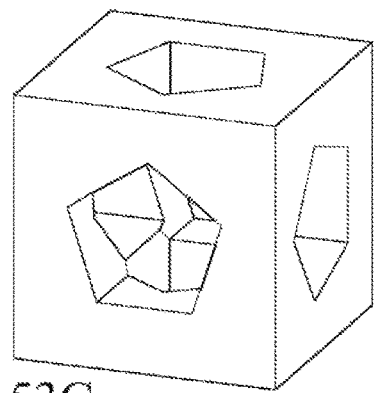
FIG. 53C is a top corner view of the object in FIG. 53A.

FIG. 53C is a top corner view of the object in FIG. 53A.

Figure 54:
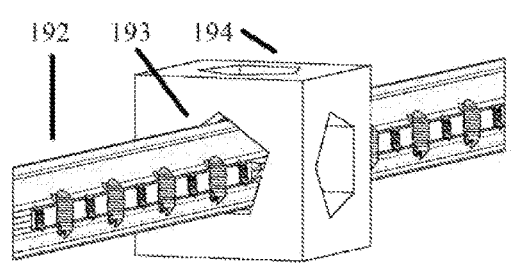
FIG. 54 shows how FIG. 53A has a pole with a diameter exactly one half the size of the edges of the cube at FIG. 54 inserted through the pentagon.

FIG. 54 shows how FIG. 53A (194) has a pole (192) with a diameter exactly one half the size of the edges of the cube at FIG. 54 inserted through the pentagon (193).

FIG. 55A is a simple cube (195) with male knobs protruding from each side (196, 197).

Figure 55B:
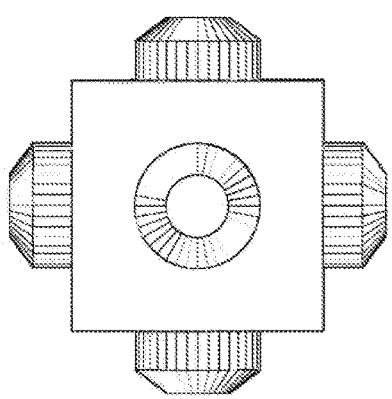

FIG. 55B is a side profile view of the object that is FIG. 55A.

Figure 56A:
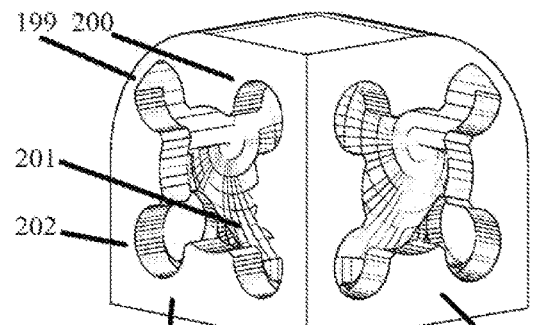

FIG. 56A is a curved corner piece (198) that interfaces with four female knob indentations (199, 200, 201, 202) on three of its size sides (203, 204, 205).

Figure 56B:
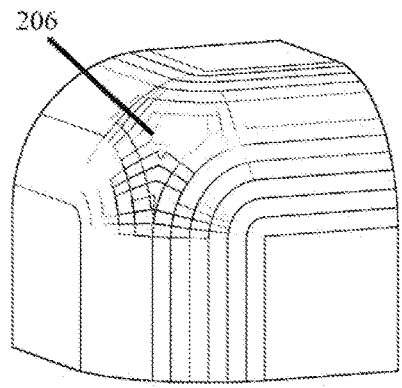

FIG. 56B is the rounded corner side (206) view of the object that is FIG. 56A from a different angle.

Figure 56C:
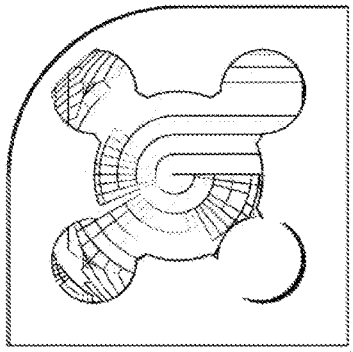

FIG. 56C is a side profile view of the object that is FIG. 56A.

Figure 56D:
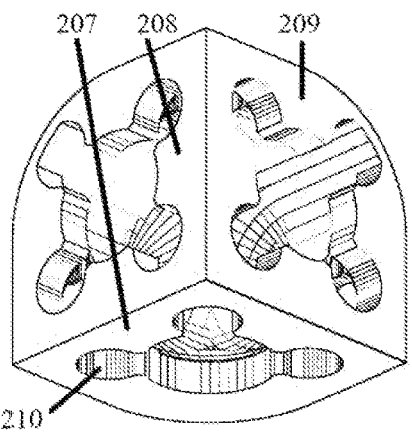

FIG. 56D is a bottom corner view of the object that is FIG. 56A that clearly shows the three sides (207, 208, 209) that have female knob indentations (210).

Figure 57A:
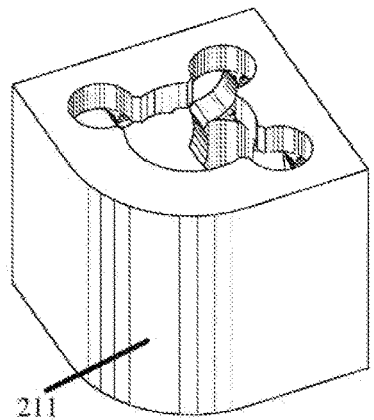

FIG. 57A is similar to FIG. 56A except it is only a curved edge (211) and not a curved corner piece. On the sides on which the curved edge runs there is only room for three holes.

Figure 57B:
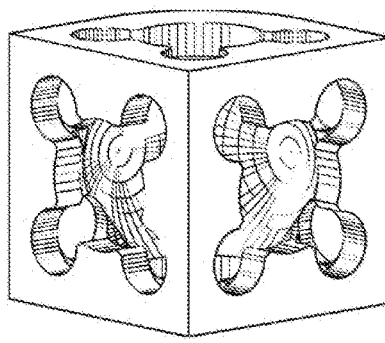

FIG. 57B is a side corner view of the object that is FIG. 57A except from a different angle.

Figure 57C:
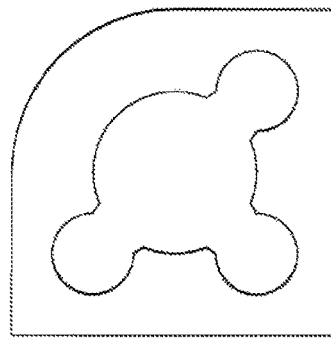

FIG. 57C is a top profile view of the object that is FIG. 57A.

Figure 57D:
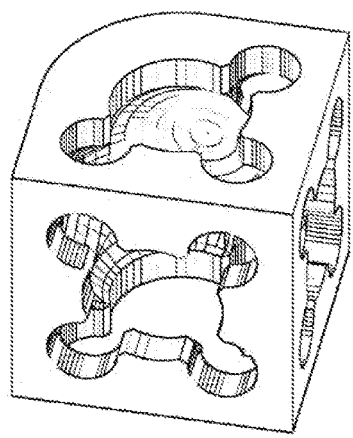

FIG. 57D is a top corner view of the object that is FIG. 57A.

FIG. 58A is a cube with knobs of a diameter that is one fourth (212) the length of the side of the cube (213). This cube has exponentially more features than prior knob cubes, like FIG. 55A, but it is not necessarily larger than those cubes with less features. FIG. 55A could be made larger than FIG. 58A and the Invention does not assign an absolute size to any of its pieces. The pieces are generally assembled in these FIGS. from simpler to more complex, but they are not assembled by size. They are an interlocking modular system in which the blocks are interchangeable and in which the features on the blocks are also interchangeable. The cubes shown are the equivalent of only an alphabet. The alphabet can be arranged, and rearranged and rearranged again, into an infinite number of combinations to form all manner of objects.

Figure 58B:
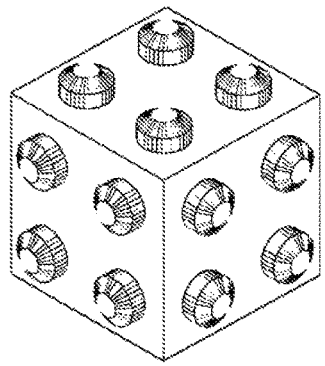

FIG. 58B is a top corner view of the piece that is FIG. 58A.

FIG. 59A is similar to FIG. 58A except it has a hole in the middle (214) for more efficient construction of the piece and to give room for a shaft, sphere, etc.

FIG. 59B is a side profile view of the object that is FIG. 59A.

FIG. 60A is like FIG. 59A except it has reversible knobs (215, 216) that both protrude (217) to be inserted into holes, and that also recede (218) to accept knobs into them. A closeup view of these knobs is in FIG. 60C. The pattern of the positioning of the male (217) vs. female (218) parts of the knobs on FIG. 60A allows for the piece to be assembled into a wide array of objects that go in every direction of the three dimensions.

FIG. 60B is a side profile view of the object that is FIG. 60A.

FIG. 60C is a close-up view of a reversible knob on FIG. 60A.

FIG. 61A is similar to FIG. 60A except it has hollow knobs (219).

FIG. 61B is a side corner view of the object that is FIG. 61A.

FIG. 62A is similar to FIG. 61A except it has large hollow circular openings (220) that have a diameter (221) one half the size of the cube edges (222).

FIG. 62B is a side profile view of FIG. 62A.

FIG. 63A is similar to FIG. 55A except it is two cubes (223, 224) fused together.

FIG. 63B is a side profile view of the object that is FIG. 63A.

FIG. 63C is a top corner view of the object that is FIG. 64B.

FIG. 64 is similar to FIG. 63A except it is four FIG. 55A cubes (225, 226, 227, 228) fused together.

FIG. 65A is a profile view of the object that is FIG. 65B.

FIG. 65B is similar to 59A except its knobs are in-set, which pushes each set of three knobs close together (229), to allow for thicker panels and other objects to be affixed to them more easily.

FIG. 65C is a top corner view of the object that is FIG. 65B.

FIG. 66A is a cylinder shape with reversible knob/hooks where the height of the cylinder (230) is one half the diameter of the cylinder (231). The entry point of the hooks are denoted by element 232 on FIG. 66A and element 233 on FIG. 66B. One of the hooks on the knobs is at element 234 on FIG. 66B.

FIG. 66B is a top side view of the object that is FIG. 66A.

FIG. 66C is another top side view of the object that is FIG. 66A except from a different angle.

FIG. 66D is a profile view of the piece as seen from the bottom beneath the hook/knob interface. Elements 235 and 236 on FIG. 66D are "s" snaps in a circular configuration that snap together when the hook at element 234 on FIG. 66B is inserted into the opening at element 233 on that FIG. and then rotated.

FIG. 66E is a hollow cylindrical piece with two female hook/knob interfaces (one on each side at elements 237 and 238) with no male hook/knobs.

FIG. 66F is a top side view of the object that is FIG. 66E except from a different angle.

FIG. 67A is similar to FIG. 66B except the hooks on the ends of the cylinder (239, 240) hook onto themselves and not into a larger cylinder casing. A piece that is exactly half the size of FIG. 67A can be inserted and hooked into the hollow center (241) of FIG. 67A. Such a smaller piece can also hook into the hook/knob openings on the sides of FIG. 67A (242, 243), as can FIG. 67A pieces that are one fourth the size of FIG. 67A.

FIG. 67B is a top profile view of the object that is FIG. 67A.

FIG. 67C is a side view of one of the ends of the object that is FIG. 67A.

FIG. 67D is a side view of the object that is FIG. 67A except up closer and at a different angle.

FIG. 68A is a pole with endings (244) that are twice the diameter of the rest of the pole (245).

FIG. 68B is a view from the bottom, and at a different angle, of the hook on the object that is FIG. 68A.

FIG. 68C is a view from the top side, and at a different angle, of the hook on the object that is FIG. 68A. The endings (250) fit into themselves (251), the hook endings (246, 247) fit into themselves (248, 249) and the endings (250) fit into other circular openings in the Invention that have simple protrusions on the sides onto which the FIG. 68A hooks can hook to hold pieces together.

FIG. 69A is a top profile view of the object that is FIG. 69B.

FIG. 69B is a pole with teeth (252) protruding in the middle. Those side teeth push into the middle of the pole (253) when the pole is inserted into a shaft and then they move out to hook into recesses (254) like those found in FIG. 70A. Once hooked into such recesses, FIG. 69A is locked in place if another pole is inserted into its hollow center (253), or if a sphere is inserted there.

FIG. 69C is a bottom side view of the object that is FIG. 69B.

FIG. 70A is a square tile with a hollow center (255) with a receded groove (254) into which the hooks on the pieces that are FIGS. 69A and 71A can hook into.

FIG. 70B is a wireframe view of the object that is FIG. 70A.

FIG. 70C is a top wireframe profile view of the object that is FIG. 70A. At element 256 it clearly shows where the teeth denoted at FIG. 69B element 252 push into the groove at FIG. 70A element 254 to lodge there (256).

FIG. 71A is similar to FIG. 69B except four of the protruding teeth (257) are longer than the others for maximum grip. Those longer teeth go into the deeper recesses at the corners of FIG. 70A that are most clearly visible in the wireframe views at FIGS. 70B and 70C, element 256.

FIG. 71B is a top view of the object that is FIG. 71A.

FIG. 71C is a top profile view of the object that is FIG. 71A.

FIG. 72A is an interlocking panel with reversible hooks (258) that can also snap together.

The reversible nature of the hooks and snaps is most clearly visible in FIG. 72E where the reversible hooks (259, 260) and snaps (261, 262) appear in a profile view. Once the panels are hooked or snapped together, they can be locked with poles inserted into the round cavities on the left and right ends of FIG. 72E. These panels can be assembled into walls, roofs, floors and into any other larger flat surface. The longer and curved nature of the interlocking hooks helps them hold liquids because they arrest the free flow of water so it gets caught in grooves (263).

Constructions can therefore be water resistant or, if the pieces are affixed together strongly enough, waterproof.

FIG. 72B is a side view of the panel that is FIG. 72A.

FIG. 72C is a bottom view of the panel that is FIG. 72A.

FIG. 72D is a view from an end of the object that is FIG. 72A.

FIG. 72E is a profile view from an end of the object that is FIG. 72A.

FIG. 73A is similar to FIG. 72A except the hooks and snaps on the sides (264, 265) are more compact.

FIG. 73B is a top view at an angle of the panel that is FIG. 73A.

FIG. 73C is a top view from another angle of the panel that is FIG. 73A.

FIG. 73D is a profile view of an end of the panel that is FIG. 73A.

FIG. 74A is a reversible hook that protrudes out in a semicircle (266) to hook with itself while also enclosing the hooks in a sphere (267).

FIG. 74B is a top corner view from a different angle of the object that is FIG. 74A.

FIG. 74C is a side profile view of the object that is FIG. 74A in which the hook is clearly visible (268).

FIG. 74D is a top side wireframe view of the object that is FIG. 74A.

FIG. 75A is a cube with the FIG. 74A hook pattern around it so it can build walls and other structures.

FIG. 75B is a side profile view of the object that is FIG. 75A.

FIG. 75C is a top corner view of the object that is FIG. 75A.

FIG. 76A is a hook pattern on the end of a beam (271) that hooks together to form a straight beam in the manner shown in FIG. 77A and in a perpendicular manner shown in FIG. 77B. Once hooked together manner it can be locked and reinforced with poles and/or spheres.

Figure 76B:
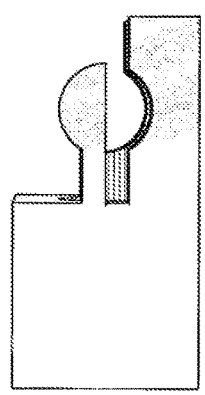

FIG. 76B is a side profile view of the object that is FIG. 76A.

FIG. 77A is an example of how two pieces that are FIG. 76A (272, 273) fit together to form a straight beam.

FIG. 77B is an example of how two pieces that are FIG. 76A (274, 275) fit together in a perpendicular manner.

FIG. 78A is an example of a simple hook (276) that follows the Invention's size conventions and that can be reinforced or locked with spheres or a pole once it is assembled with itself.

FIG. 78B is a side profile view of the object that is FIG. 78A.

FIG. 78C is a bottom corner view of the object that is FIG. 78A.

FIG. 78D is a bottom corner view from a different angle of the object that is FIG. 78A.

FIG. 79A is side profile view of the object that is FIG. 79B.

FIG. 79B is a cube with flexible teeth (277, 278, 279, 280) that bend inward from each of the holes on its sides (281). When a sphere or pole is inserted into those holes, the inserted object pushes the teeth out in the manner shown in FIG. 79B (277, 278). When those teeth push out they grab onto female pyramid indentations (282) that are also on FIG. 79B at the openings of the holes and next to the protruding teeth (283). The location of the teeth is such that they will not push into other teeth but will instead push into female recesses onto which they grab to hold the cubes together.

FIG. 79C is an up-close view of a side hole of the object that is FIG. 79A that shows the teeth (284) and the pyramid indentations that they fit into (285).

FIG. 80A is a cube with only female indented pyramids (286) that hold the teeth protruding from FIG. 79A.

FIG. 80B is a corner view from a different angle of the object that is FIG. 80A.

FIG. 80C is a side profile view of the object that is FIG. 80A.

FIG. 81A is a side profile view of the object that is FIG. 81C.

FIG. 81B is a profile view from an end of the object that is FIG. 81C.

FIG. 81C is an example of a pole that can be inserted into FIG. 79A to push its teeth to the sides with its slanted ends (287, 288) wherein the teeth go through its grooves (289). This FIG. 81A can be inserted into the holes on FIG. 79A in any direction, from the outside in and from the inside out.

FIG. 82 is a beam with holes that have a diameter one half (300) the height of the beam (301) and that are separated from each other by a distance (302) that is one half the diameter of the holes (300). This modular arrangement follows the Invention's basic parameters and also enables gears to be inserted into the holes at a distance so that the gears in FIG. 83A can turn each other at both horizontal angles (w % ben they are side-by-side) and at perpendicular angles (90-degrees to each other).

FIG. 83A is a basic form of gear that can be inserted into Invention holes and turn each other when they are side-by-side, at perpendicular angles to each other, and when they are facing each other.

FIG. 83B is a bottom side (303) view of the object that is FIG. 83A.

FIG. 83C is another bottom view (304), but from a different angle, of the object that is FIG. 83A.

FIG. 83D is a bottom profile view of the object that is FIG. 83A.

FIG. 84A is similar to FIG. 83A except it can be turned with a screwdriver or Philips head at the location of element 305. The top of the gear (306) also fits into itself (307) and into the bottom of the piece through the openings that are visible in FIGS. 84E (308) and 84F (309).

FIG. 84B is a side view of the object that is FIG. 84A.

FIG. 84C is another side view, but from a different angle, of the object that is FIG. 84A.

FIG. 84D is an upside-down view of the object that is FIG. 84A.

FIG. 84E is a bottom side view of the object that is FIG. 84A.

FIG. 84F is a bottom profile view of the object that is FIG. 84A.

FIG. 84G is a side view, from a different angle, of the object that is FIG. 84A.

FIG. 84H is a side view, from a different angle, of the object that is FIG. 84A.

FIG. 84I is a side view, from a different angle, of the object that is FIG. 84A.

FIG. 843 is an upside-down view, from a different angle, of the object that is FIG. 84A.

FIG. 85A is similar to FIG. 84A except it has a higher leverage ratio between the width of the center shaft (310) and the outer radius of the gear (311).

FIG. 85B is a top view, from a different angle, of the object that is FIG. 85A.

FIG. 85C is a bottom view from the side of the object that is FIG. 85A.

FIG. 85D is a bottom profile view of the object that is FIG. 85A.

FIG. 86A through 86E is a hollow gear that can turn in a manner similar to FIG. 83A except it also has a hollow center (312, 313, 314) that is half the size of the diameter (315) of the outer parts of the gear (316). This gear can be inserted into female knob holes to secure itself in those holes. This gear can also fit into itself to connect securely by inserting the protruding parts (317) into the receding parts (318). Once connected it can then be inserted into a hole to be even more secure.

FIG. 86A is a top profile view of the object that is FIG. 86B.

FIG. 86B is a hollow gear that can turn in a manner similar to FIG. 83A except it also has a hollow center that is half the size of the diameter of the outer parts of the gear.

FIG. 86C is a top side view, from a different angle, of the object that is FIG. 86B.

FIG. 86D is a top side view, from a different angle, of the object that is FIG. 86B.

FIG. 86E is a bottom side view (319) of the object that is FIG. 86B.

FIGS. 86F and 86G are similar to FIG. 86A through 86E except the gears are more leveraged and they have a solid center (320, 321).

FIG. 86F is similar to FIG. 86A through 86E except the gears are more leveraged and they have a solid center.

FIG. 86G is similar to FIG. 86A through 86E except the gears are more leveraged and they have a solid center.

FIG. 87A is similar to FIG. 86A through 86E except FIG. 87A is a gear with greater leverage.

FIG. 87B is a bottom side view of the object that is FIG. 87A.

FIG. 88A is a side profile view of the object that is FIG. 88B.

FIG. 88B is similar to FIG. 86A through 86E except it has even more leverage. FIG. 88A can fit into FIGS. 86A and 87A.

FIG. 88C is a top side view, from a different angle, of the object that is FIG. 88B.

FIG. 89 is a tire that, when made with flexible material, can be placed on FIG. 88B so the gear protrusions of FIG. 88B (322) insert into the cavities (323) of FIG. 89.

FIG. 89A is a profile view of the object that is FIG. 90B.

FIG. 90B is a pole that can unite, or strengthen, Invention blocks. Its protruding ends that have the shape of the letter "p" (324) push into recessed areas that include recessed "s" snap areas and recessed areas where other pieces hook into. Those "p" interfaces are reversible, meaning they can fit hold blocks and then another FIG. 90B piece can be inserted into the openings on the ends of FIG. 90B (325) to further reinforce how the blocks are held together.

FIG. 90B is locked when a sphere is inserted in its middle shaft (326) to press the "p" interfaces out into the sides of a block. A pole accomplishes the same task and it also reinforces FIG. 90B.

FIG. 90B that is half the size (327) of other FIG. 90Bs (328) can operate as such a pole to secure the larger FIG. 90B pieces in place.

FIG. 90C is a side view, but form a different angle, of the object that is FIG. 90B.

FIG. 91A is a simple pole with protruding bumps (329) that secure the pole in recessed areas where there are "s" snaps and where other pieces hook into throughout the Invention's constructions.

FIG. 91B is a side view, but from a different angle, of the object that is FIG. 91A.

FIG. 91C is a side profile view of the object that is FIG. 91A.

FIG. 92A is a profile wireframe view from the side of the object that is FIG. 92B.

FIG. 92B is similar to FIG. 90B except one end of the pole is round (330), which enables it to be more easily pushed throughout constructions. When the spherical side is magnetized, it can hold onto a metallic or magnet sphere that can guide it through a construction of the Invention. The "s" snap configuration at the center, which can be easily seen in the darker areas of the wireframe at FIG. 92A (331, 332), allow it to be locked in place when a sphere is inserted there, or when a pole is inserted there in a manner that follows the basic "s" snap convention of the Invention.

FIG. 92C is a bottom side view of the object that is FIG. 92B.

FIG. 92D is a top profile view of the object that is FIG. 92B.

FIG. 92E is a side view from the bottom, but from a different angle, of the object that is FIG. 92B.

FIG. 93A is a simple plug that affixes itself to the "s" snap patter in pieces and to the recessed hook area of pieces (the "p" shape towards the top of FIG. 93D at element 333 goes into the hook recesses). The Invention's design is flexible such that the holes this piece are inserted into do not necessarily have to have the "s" snap configuration or the hook recesses. This piece can plug a simple shaft.

FIG. 93B is a side view of the object that is FIG. 93A.

FIG. 93C is a top profile view of the object that is FIG. 93A.

FIG. 93D is a view from a side angle of the object that is FIG. 93A.

FIG. 93E is a view from another side angle of the object that is FIG. 93A.

FIG. 94A works like FIG. 93A except it secures two pieces together with each of its ends (334, 335) instead of plugging a hole.

FIG. 94B is a view from a top and side angle of the object that is FIG. 94A.

FIG. 94C is a view from the top (336) of the object that is FIG. 94A.

FIG. 94D is a side angle of the object that is FIG. 94A.

FIG. 94E is a profile view from the top of the object that is FIG. 94A.

FIG. 95A is a profile view of the end of the object that is FIG. 95D.

FIG. 95B is a profile side view of the object that is FIG. 95D.

FIG. 95C is a side view of the object that is FIG. 95D.

FIG. 95D is a beam made up of a compact assembly of reversible "s" snap interfaces (337, 338) that fit into themselves to build walls, beams and much more.

FIG. 95E is a side view from another angle of the object that is FIG. 95D.

FIG. 96A is an assembly of reversible "s" snaps similar to FIG. 95D except they are in a "+" configuration (339) and the "s" snap interfaces reversibly hook with each other at the point shown in element 340 in FIG. 96D. FIG. 96D is another view of the same object that is FIG. 96A.

FIG. 96B is a view from one end of the object that is FIG. 96A.

FIG. 96C is a profile view of the end of the object that is FIG. 96A.

FIG. 96D is a view from the side of the end of the object that is FIG. 96A.

FIG. 96E is an up-close view of the protruding side of the object that is FIG. 96A.

FIG. 97A is a checkered pattern with reversible "s" snaps on the edges (341). The "s" snap interfaces follow the standard parameters of the Invention: all sides are of the same length, they fit into themselves, they can be made of flexible materials or can be altered to be made of rigid materials, etc.

FIG. 97B is a view from the top corner of the object that is FIG. 97A that shows the "s" snaps more clearly (342).

FIG. 97C is a view from the side end of the object that is FIG. 97A.

FIG. 98A is an example of how the reversible "s" snap interface can be placed on the slanted side edges of a panel (343) so it can assemble into a larger panel or into a cube or other constructions that require pieces to assemble at 180 degrees and 90-degrees. Once assembled into cubes, those cubes can in turn be affixed to each other with the reversible block pattern that is visible in FIGS. 98D, 98E and 99. That pattern can be reinforced with poles pushed through the holes that align when the pieces are assembled that way. Those holes are in pairs of two that are most easily visible in FIG. 100C (344, 345), which has the same pattern on this side of the panel.

FIG. 98B is a top side view of the object that is FIG. 98A.

FIG. 98C is a profile view from the bottom of the object that is FIG. 98A.

FIG. 98D is a view from the bottom side of the object that is FIG. 98A.

FIG. 98E is a view from a bottom corner of the object that is FIG. 98A.

FIG. 99 is a view from the top side of the object that is FIG. 98A but at a lower angle than that of FIG. 98B.

FIG. 100A is a demonstration of how the "s" snap configuration on FIG. 98A can be altered to be built with rigid materials. FIG. 100A is compatible with FIG. 98A built with flexible materials. For FIG. 100A to fit together securely using entirely rigid materials it must have a shaft inserted into the oval openings at the top right side of FIG. 100B (346) once the pieces are assembled at perpendicular degrees (as is demonstrated by FIG. 101A, element 346) and at 180 degrees (as is demonstrated in FIG. 101B, element 347).

FIG. 100B is a profile view of the part of the object shown in FIG. 100A.

FIG. 100C is a profile view from the side of the entire object, a portion of which is shown in FIG. 100A.

FIG. 101A is a demonstration of how two pieces that are FIG. 100A fit together securely when assembled at perpendicular degrees (346).

FIG. 101B is a demonstration of how two pieces that are FIG. 100A fit together securely when assembled horizontally (347).

FIG. 102A is a simple panel, without slanted sides, that has the interlocking cubes (348) that can be seen on the bottom of FIG. 100C (349).

FIG. 102B is a view from the top of the object that is FIG. 102A.

FIG. 103A is a reversible "s" snap that looks like a dimple (350). This allows it to be placed on surfaces to also give traction and to be an artistic pattern.

FIG. 103B is a side view from the top of the object that is FIG. 103A.

FIG. 103C is a side view from the top, but at a lower angle, of the object that is FIG. 103A.

FIG. 103D is a view from the side, but at an even lower angle, of the object that is FIG. 103A.

FIG. 104A is similar to FIG. 103A except the protruding "dimple" (351) is more pronounced and is narrower.

FIG. 104B is a view from the top of the object that is FIG. 104A that shows the "dimple" from a different angle (352).

FIG. 104C is a view from the top corner of the object that is FIG. 104A.

FIG. 105A is a view of the top part of the object that is FIG. 105B.

FIG. 105B is a view from the top and one side of the object that is FIG. 104B.

FIG. 105C is similar to FIG. 104A except FIG. 105A has different arrangements of the protrusions (353, 354) to give more stability under different circumstances. It also has holes (355) that allow for debris to fall through and not gum up the "s" snap interface.

FIG. 105D is a view from the bottom of the object that is FIG. 105C.

FIG. 106A is similar to FIG. 104A except FIG. 106A has different arrangements of the protrusions (356, 357) to give more stability under different circumstances. It also has holes (358) that allow for debris to fall through and not gum up the "s" snap interface.

FIG. 106B is a view from the top corner of the object that is FIG. 106A.

FIG. 106C is a view from the bottom of the object that is FIG. 106A.

FIG. 107A is a wireframe profile view from the side of the object that is FIG. 107C.

FIG. 107B is a cutout side view from the top of the object that is FIG. 107C.

FIG. 107C is a square male "s" snap interface (359) on a flat surface that fits into the female "s" snap interface at FIG. 108D (360).

FIG. 107D is a close-up view from the top of FIG. 107C.

FIG. 108A is a cutout view from the side profile of the object that is shown in FIG. 108B that shows the female "s" snap (361).

FIG. 108B is a female "s" snap interface on a flat surface (362) that fits into the male "s" snap interface at FIG. 107C.

FIG. 108C is a cutout view from the top side of the object that is FIG. 108B.

FIG. 108D is a solid view of FIG. 108B.

FIG. 109A is a round female "s" snap interface (363) similar to FIG. 108A that fits into FIG. 10A.

FIG. 109B is a top corner view of the object that is in FIG. 109A.

FIG. 109C is a view from the side of the object that is FIG. 109A.

FIG. 110A is a profile view from the top of an object with a round "s" snap male interface (364) that fits into the object in FIG. 109A.

FIG. 110B is a side view from the top of the object that is FIG. 110A.

Figure 110C:
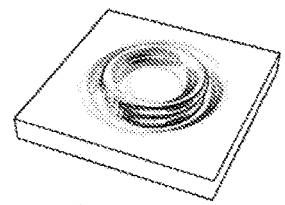

FIG. 110C is a side view of FIG. 110A.

FIG. 111A is a simple knob with a male "s" snap ending (365) that can fit into FIG. 109A.

FIG. 11B is a view from the side and at a different angle of the object in FIG. 111A.

FIG. 111C is a view from the "s" snap male top of the piece that is FIG. 111A.

FIG. 111D is a view from the side of the "s" snap top (366) of the piece that is FIG. 111A.

FIG. 112A is a profile view from the side of the object that is FIG. 112C.

FIG. 112B is a profile view from the top of the object that is FIG. 112C.

FIG. 112C is a combination of the male (367) and female (368) "s" snap interfaces in FIGS. 107A through 111A that can fit together like those interfaces do. It can also fit into itself when built with rigid materials that hook together. The protruding part (367) fits into the recessed part (368), and then when it is rotated (369) to go below the female part on the opposite side of the circle, it hooks together.

FIG. 112D is a view from the top side of the object that is FIG. 112C.

FIG. 112E is a view from the top corner of the object that is FIG. 112C.

FIG. 113A is a side profile view of the object that is FIG. 113C.

FIG. 113B is a top profile view of the object that is FIG. 113C.

FIG. 113C is similar to FIG. 112C except the female side protrudes out (370) to give it more strength.

FIG. 113D is a view from the top side of the object that is FIG. 113C.

FIG. 113E is another view of FIG. 112D.

FIG. 114A is a profile view from the side of the object that is FIG. 114B.

FIG. 114B is similar to FIG. 112C except the interfaces are on the sides of cubes (371, 372, 373) so that the cubes can be held together when aligned, or when staggered to build a wall in the manner many brick walls are built. FIG. 114B is most versatile when built with flexible materials because some of the male pieces (372) can protrude in a manner that does not allow other blocks to rotate.

FIG. 114C is a view from the top corner of the object that is FIG. 114B.

FIG. 114D is a view from the top side of the object that is FIG. 114B.

FIG. 115A solves the problem with FIG. 114B because FIG. 115A has more recessed places (374, 375, 376) to allow rigid materials male pieces to rotate to hook the cubes together.

FIG. 115B is a side profile view of the object that is FIG. 115A.

FIG. 115C is a top corner view of the object that is FIG. 115A.

FIG. 115D is a top corner view, from a different angle, of the object that is FIG. 115A.

FIG. 116A is a geometry that allows for semi-rigid materials to bend slightly to accommodate poles and spheres inserted into them (377). The bent tubes inside FIG. 116 (378) hold poles and spheres of a wide range of sizes when they are made of flexible materials.

FIG. 116B is a view from a bottom corner of the object that is FIG. 116A that also shows the opening (379) and the bent tubes (380).

FIG. 116C is a view from an end of the object that is FIG. 116A.

FIG. 116D is a view from a side angle of the object that is FIG. 116A.

FIG. 116E is a profile view of the end of the object that is FIG. 116A.

FIG. 117A has the bent tubes of FIG. 116A (381) arranged in a manner that allows FIG. 117A to hold poles and to hold spheres in a location that is between two FIG. 117A shapes.

FIG. 117B is a view from the top side of the object that is FIG. 117A.

FIG. 117C is a view from a top corner of the object that is FIG. 117A.

FIG. 118A is a simple hollow (382) cylinder with a simple "s" snap interface (383) that protrudes (383) and that recedes (384). This simple object can hold a sphere, keep a pole in place, and the "s" snap rigidity can be adjusted by having larger or smaller protrusions (383). The protruding part (383) can in fact be fully leveled to allow for rigid materials pieces to slide into each other while also allowing a flexible piece with a protruding "s" snap bump to be inserted into the rigid material "s" snap recessed place (384).

FIG. 118B is a solid view from the top side of the object that is FIG. 118A.

FIG. 119A has "s" snaps on its inside (385) and has "teeth" (386) that allow shafts of two different sizes to be inserted. Poles held together at the smaller diameter can be smooth and poles that reach to the outer diameter must accommodate the teeth (386) on the side of the inside shaft.

FIG. 119B is a view from a side corner of the object that is FIG. 119A.

FIG. 120A is similar to FIG. 119A except it is a cube and not a cylinder and its inner teeth go across the entire piece (387).

FIG. 120B is a view from the front of the object that is FIG. 120A.

FIG. 121A is a hollow knob that fits into itself with "s" snaps on its ends (388).

FIG. 121B is a view from the top and one side of the object that is FIG. 121A but from a different angle.

FIG. 121C is a view from the top and one side, but at a slightly different angle, of the object that is FIG. 121A.

FIG. 121D is a side view of FIG. 121A. FIG. 122A fits into the hollow shaft of FIG. 118A (382). FIG. 122A is locked with a pole or sphere inserted into its hollow shaft, which is visible in FIG. 122B (389), which is a different view of FIG. 122A.

FIG. 122B is a view from the top side of the object that is FIG. 122A.

FIG. 122C is a view from the top side, but at a lower angle, of the object that is FIG. 122A.

FIG. 123A has a checkered "s" snap male pattern (390) that can fit between a corresponding female checkered pattern that is on FIG. 124A (391). This way the interfacing pieces can have a rigid interface (the male "s" snap protruding parts holding onto the protruding parts of the other piece) and they can have a less rigid interface (with the male "s" snap pieces only fitting into the female "s" snap pieces of the other piece).

FIG. 123B is a view from a top side of the object that is FIG. 123A.

FIG. 123C is a profile view from the side of the object that is FIG. 123A.

FIG. 124A is a female piece into which the male FIG. 123A inserts and snaps into (391).

FIG. 124B is a view from the top corner of the object that is FIG. 124A.

FIG. 124C is a wireframe view from the side of the object that is FIG. 124A.

FIG. 125A is a skeletal pole that uses "s" snaps in every direction of its protruding parts (392) to increase its versatility. It can snap into female shafts that are smooth or that have corresponding "s" snaps. Once inserted into such a shaft it can be locked with the insertion of a sphere or a pole into its hollow middle (393). It can also perform those tasks while inserted into its own receding areas (394). In other words, FIG. 125A can fit into itself to form a smoother pole, then that pole can be inserted into a shaft and locked with spheres and poles, or reinforced with poles, or the opening can be used to transport additional materials, wires, ventilation, etc.

FIG. 125B is a top side view of the object that is FIG. 125A but from a different angle.

FIG. 125C is a view from the side of the object that is FIG. 125A.

FIG. 125D is a view from the bottom side of the object that is FIG. 125A.

FIG. 125E is a view from the bottom of the object that is FIG. 125A.

FIG. 125F is a profile view from the bottom of the object that is FIG. 125A.

FIG. 126A is a combination of hooks and snaps that use "s" configurations on the perimeter of circles (395, 396, 397). The protruding interface at FIG. 126D (399) fits into its receding parts (400) and snaps into the round openings in FIG. 126A (395, 397), and it also slides into those openings (398) if snapping is not possible because of the rigidity of the materials with which it is built.

FIG. 126B is a top corner view, from a different angle, of the object that is FIG. 126A.

FIG. 126C is a view from the bottom corner angle of the object that is FIG. 126A.

FIG. 126D is an up-close view of the circular "s" snaps (401) at the center of the sides of the object that is FIG. 126A.

FIG. 126E is a view from the side of the object that is FIG. 126A.

FIG. 126F is a near-profile view from the side of the object that is FIG. 126A.

FIG. 127A is a pole that has the interface of FIG. 126D on its ends (402, 403).

FIG. 127B is a close-up view of the end of the object that is FIG. 127B.

FIG. 127C is a side view from a corner of the object that is FIG. 127A.

FIG. 127D is a profile view of the end of the object that is FIG. 127A.

FIG. 128A is a combination of cube (404) and pole (405) similar to how FIG. 126A would assemble with FIG. 127A, except it does not have hooks.

FIG. 128B is a different view from the side of the object that is FIG. 128A.

FIG. 128C is a side profile view of the object that is FIG. 128A.

FIG. 129A is similar to FIG. 128A except FIG. 129A can hook together by sliding protruding pieces at element 406.

FIG. 129B is a view of the object that is FIG. 129A from a corner angle.

FIB. 129C is a view from the front of the object that is FIG. 129A.

FIG. 130A is a reversible checkered pattern (407) that is a simpler version of FIG. 97A.

FIG. 130B is a view from a top corner of the object that is FIG. 130A.

FIG. 131A is a pole with a spherical protruding area (408) that bends and fits into cubes.

FIG. 131B is a view from the side, at less of an angle, of the object that is FIG. 131A.

FIG. 131C is a view from the side of the object that is FIG. 131A.

FIG. 131D is a profile view from the side of the object that is FIG. 131A.

FIG. 132A is similar to FIG. 131A except its protruding sphere (409) is on the end of a pole.

FIG. 132B is a view from the top side of the object that is FIG. 132A.

FIG. 132C is a view from the top of the object that is FIG. 132A.

FIG. 132D is a profile view from the top of the object that is FIG. 132A.

FIG. 133A is similar to FIG. 131A except it has grooves (410, 411) that give it more grip and that can lock it so that it cannot be rotated. The sphere snap also can be locked with a pole being inserted into it at a perpendicular angle (412).

FIG. 133B is a view from the bottom side of the object that is FIG. 133A.

FIG. 133C is a view from the corner side of the object that is FIG. 133A.

FIG. 133D is a near-profile view from the end of the object that is FIG. 133A.

FIG. 134A is similar to FIG. 132A except the half sphere at the end of the pole (413, 414) can fit into itself by pushing the protruding spherical parts (413, 414) into the receding parts (415) to form a sphere in the manner shown in FIG. 135 (416). Once connected in that manner it can be locked with the insertion of a pole or large flexible sphere into the middle of the sphere (417).

FIG. 134B is a view from a top corner of the object that is FIG. 134A.

FIG. 134C is a view from the side of the object that is FIG. 134A.

FIG. 134D is a profile view from the side of the object that is FIG. 134A.

FIG. 135 is a demonstration of how objects that are FIG. 134A (418, 419) fit into each other horizontally.

FIG. 136 is a pole that can be inserted in to assembled FIG. 137A pieces (420, 421) that are shown in FIG. 138A. FIG. 136 locks those assembled pieces when inserted into the four holes shown in FIG. 138CA (422, 423, 424, 425).

FIG. 137A is a flat surface (426) with objects that are FIG. 134A affixed to it (427).

FIG. 137B is a top corner view of the object that is FIG. 137A.

FIG. 138A is a demonstration of how objects 137A (420, 421) fit into each other.

FIG. 138B is a demonstration of how objects 137A (428, 429) and FIG. 136 (430) fit into each other.

FIG. 138C is a profile view from the side of how objects 137A (431, 432) fit into each other.

FIG. 139A is a panel with a reversible sphere pattern (433) that also locks with poles when the poles are inserted into the holes visible in FIG. 140A (434). FIG. 140B is a different angle of the assembled piece, which holds itself together when the spheres in FIG. 139A (433) push out against each other (i.e., the pieces do not have to be locked with a pole for them to remain together).

FIG. 139B is atop side view of the object that is FIG. 139A.

FIG. 139C is a top view of the object that is FIG. 139A.

FIG. 139D is a side profile view of FIG. 139A.

FIG. 140A is a demonstration of how FIG. 139A panels create openings (434) that lock with poles.

FIG. 140B is a top corner side view of the object that is FIG. 140A.

FIG. 140C is a side profile wireframe view of the object that is FIG. 140A.

FIG. 141A demonstrates how the recessed parts of FIG. 139A can be extended down more to accommodate the insertion of the male piece to have the four holes visible in FIG. 141A (435).

FIG. 141B is a profile side wireframe view of the object that is FIG. 141A.

FIG. 141C is a top side corner view of the object that is FIG. 141A.

FIG. 142A is a panel with a reversible circular "s" snap pattern (436) that can also provide traction and grip. The circular center of the circle patterns (437) also hold poles in place.

FIG. 142B is a side view of the object that is FIG. 142A.

FIG. 142C is a top corner view of the object that is FIG. 142A.

FIG. 143A is a reversible pattern similar to FIG. 142A except FIG. 143A has less protruding pieces (438, 439) and it can also simply rest on top of itself at element 440 (without having to be snapped together, although it can also snap together when it is assembled at the right orientation placing its protruding parts at elements 438 and 439 into the receding places at elements 441 and 442).

FIG. 143B is a close-up view of the "s" snaps (443) in FIG. 143A.

FIG. 143C is a view from a top side of the object that is FIG. 143A.

FIG. 144A is a disc that increases the snap strength of the assembled pieces when place at the center of the circular areas of FIG. 145A.

FIG. 144B is a top side view of the object that is FIG. 144A.

FIG. 144C is a side profile view of the object that is FIG. 144A.

FIG. 144D is another view of FIG. 144A.

FIG. 145A is similar to FIGS. 142A and 143A except the edges of the circles (444, 445) are flatter and rise more gradually. This provides less traction and grip, but it can also facilitate cleaning.

FIG. 145B is a top corner view of the object that is FIG. 145A.

FIG. 145C is a top side view of the object that is FIG. 145A.

FIG. 145D is a near-profile side view of the object that is FIG. 145A.

FIG. 146A is similar to FIG. 145A except it allows for the pieces to simply rest on top of each other when protruding parts (446) rest in empty receding parts (447).

FIG. 146B is a top corner view of the object that is FIG. 146A.

FIG. 146C is a top side view of the object that is FIG. 146A.

FIG. 146D is a near-profile side view of the object that is FIG. 146A.

FIG. 147A is like FIG. 132A except FIG. 147A can be locked with the insertion of a pole at a 90-degree angle at its hollow center (448).

FIG. 147B is a view from a top side of the object that is FIG. 147A.

FIG. 147C is a view from a top corner of the object that is FIG. 147A.

FIG. 147D is a view from the side of the object that is FIG. 147A.

FIG. 147E is a near-profile view from the side of the object that is FIG. 147A.

FIG. 148A is a beam with a reversible snap pattern on its side (449, 450) that assembles into itself as is shown in FIG. 149.

FIG. 148B is a view from the front corner of the object that is FIG. 148A.

FIG. 149 is an example of how objects in the shape of FIG. 148A (451, 452) fit together.

FIG. 150A is a square with slanted sides (453) that can snap into themselves at 180-degree angles or at 90-degree angles to form cubes. Panels and tubes can be inserted into its center part to form flat surfaces or to have bars over an opening. FIG. 150A shows how the left (454) and right sides (453) of this piece have protruding male snaps and receding female snap interfaces and the other two sides (455, 456) only have receding snap interfaces. These receding (457) and protruding (458) snap interfaces are shown close up in FIG. 150C. These snap interfaces are strengthened, or locked, when a sphere or pole is inserted into the hollow area (459) of an assembled piece.

FIG. 150B is a side view from at top angle of the object that is FIG. 150A.

FIG. 150C is a close up view of the side of the object that is FIG. 150A.

FIG. 151A is a snap interface that fits into itself (460, 461) in the manner shown in FIG. 152A that is also locked when poles or spheres are inserted into the circular openings in the middle of FIG. 152A (462). FIG. 153A shows how a rounded version of FIG. 151A (463) can also fit into FIG. 151A (464). FIG. 154A is two rounded versions of FIG. 151A (465, 466) snapped together (466) to form a cylinder that itself forms a pole that can be used throughout the Invention. FIG. 155A is the rounded version of FIG. 151A.

FIG. 151B is a view from the top back of the object that is FIG. 151A.

FIG. 151C is a view from the top front of the object that is FIG. 151A.

FIG. 151D is a profile view from the side of the object that is FIG. 151A.

FIG. 152A is an example of how objects that are the shape of FIG. 151A (460, 461) snap into themselves.

FIG. 152B is a slightly different view of the object that is FIG. 152A.

FIG. 153A is an example of how objects that are FIG. 155A fit into objects that are FIG. 151A.

FIG. 153B is a profile view from the side of the assembled objects in FIG. 153A.

FIG. 154A is an example of how objects that are FIG. 155A (465, 466) fit into themselves (467).

FIG. 154B is the assembled objects of FIG. 154A but viewed from a different angle.

FIG. 155A is like FIG. 151A except FIG. 155A is cylindrical in shape.

FIG. 155B is a different view of the object that is FIG. 166A.

FIG. 155C is a side profile view of the object that is FIG. 155A.

FIG. 155D is a front corner angle view of the object that is FIG. 155A.

FIG. 156A is a profile view of the end of the object that is FIG. 156B.

FIG. 156B is a cylinder that into which panels with football-shaped snap/hooks like the one shown in FIG. 157A (468) can be affixed to in the manner shown in FIG. 158A (469, 470).

FIG. 156C is a side view of the object that is FIG. 156A.

FIG. 156D is a side profile view of the object that is FIG. 156A.

FIG. 157A is a panel with a football-shaped snap/hook (468).

FIG. 157B is a top corner view of the object that is FIG. 157A that clearly shows the football shaped snap (471).

FIG. 157C is a bottom side view of the object that is FIG. 157A.

FIG. 158A is a wireframe example of how objects that are FIG. 157A (469, 470) assemble.

FIG. 158B is an example of how objects that are FIG. 157A (472, 473) assemble into FIG. 156A (474). The football snap of the FIG. 157A object denoted by element 472 can be seen at element 477.

FIG. 158C is an example of how objects that are FIG. 157A assemble without a circular magnet surrounding the neck of the base of the football snap (475).

FIG. 158D is a wireframe side profile view of the assembled objects shown in FIG. 158B.

FIG. 159 is a magnetic cylinder that can be placed on the panel in the manner shown in FIG. 158A (476), which is then inserted in the manner shown in FIG. 158B (the panel arrangement without the magnet is shown in FIG. 158C, the absence of the magnet is evident at element 475). This magnet, combined with other magnets in other pieces that are configured to attract to each other, can be used to disassemble pieces once they are assembled by dislodging them.

FIG. 160A is a beam that has a hook on the end (478) that is secured in place with the snap to one side (479). It can be affixed to itself to form a square or other construction and it can be affixed to other holes that follow the conventions of the Invention.

FIG. 160B is a view from a different angle of the object that is FIG. 160A.

FIG. 161A is a female screw (480) that follows the conventions of the Invention in that, in addition to holding screws, it can hold a knob whose diameter is one half the size (482) of the total length of each side of the square (481). The height of this piece is one fourth the size of its length on each side.

FIG. 161B is a top corner view of the object that is FIG. 161A.

FIG. 161C is a side wireframe view of the object that is FIG. 161A.

FIG. 161D is a top corner view, from a different angle shown in FIG. 161B, of the object in FIG. 161A.

FIG. 161E is a view from the top of the object that is FIG. 161A.

FIG. 161F is a wireframe view from a top corner of the object shown in FIG. 161A.

FIG. 162 is a screw that is half as tall (483) as it is wide (484).

FIG. 163 is as tall as it is wide.

FIG. 164A is cube with screw interfaces (485) on four sides and FIG. 165A has screw interfaces (486) on six sides.

FIG. 164B is a view from the top side of the object that is FIG. 164A.

FIG. 164C is a wireframe side view of the object that is FIG. 164A.

FIG. 164D is a top corner view from a different angle of the object shown in FIG. 164A.

FIG. 165A is a similar to FIG. 164A except it has holes coming out (486) of all six of its sides.

FIG. 165B is a solid view of the object that is FIG. 165A.

FIG. 165C is a view from the top side of the object that is FIG. 165A.

FIG. 165D is a side view of the object that is FIG. 165A.

FIG. 166A has a screw (487) interface on each side that also holds poles with a diameter that is one-half the length of the sides of the cube and it has smooth holes (488) whose diameter is one-fourth the size of each side of the cube. FIG. 167A is a screw that can be screwed into FIG. 166A in the manner shown in FIG. 168A (489) and then locked in place with the insertion of knobs into the smaller smooth holes (490). It can also be locked in place by the insertion of a pole through the large hole in the cube because the top of FIG. 167A has an undulating surface (489) that holds such pole.

FIG. 166B is a view of the object that is FIG. 166A from a slightly different angle.

FIG. 166C is a view from the side of the object that is FIG. 166A.

FIG. 166D is a view from the side and a slight angle to the right of the object that is FIG. 166A.

FIG. 167A is a screw (491) that goes into FIG. 166A.

FIG. 167B is a side view of the object that is FIG. 167A.

FIG. 167C is a view from the top of FIG. 167A.

FIG. 168A is an example of how FIG. 167A (489) can be inserted into FIG. 166A (492).

FIG. 168B is a different view of the object that is FIG. 168A.

FIG. 169A is a male screw piece that can be screwed into the pieces at FIG. 163, FIG. 164A (485) and FIG. 165A (486) to form constructions with near-flat surfaces. FIG. 169A is twice as tall (493) as it is wide (494) and its rings go around eight times from top to bottom (493), which means the size of the rings as a ratio to the size of the overall piece is an even number.

FIG. 169B is a view from an end of the object (495) that is FIG. 169A.

FIG. 169C is a view from the top (496) of the object that is FIG. 169A.

FIG. 170A is a male screw piece that can screw into FIGS. 164A and 165A and can then be locked with a pole being inserted at a perpendicular angle (497) to the top of the screw.

FIG. 170B is another view of FIG. 170A.

FIG. 170C is a side view of FIG. 170A.

FIG. 171A is a male screw that has an interface into which a screwdriver can be inserted (498) to screw the piece in place. The bottom of FIG. 171A also contains such an interface (499), so the screw can be screwed in or out from the top and bottom.

FIG. 171B is a view from the top side of FIG. 171A.

FIG. 171C is a view from the bottom corner of FIG. 171A.

FIGS. 172A, 173 and 174A are pieces that work together to form the latch mechanism demonstrated in FIG. 175.

FIG. 172A is a piece into which the latch is affixed as can be seen in FIG. 175A (500) and FIG. 175B (501).

FIG. 172B is a different view of the object that is FIG. 172A.

FIG. 173 is an object performs a latch function as shown in FIG. 175A (502) and FIG. 175B (503).

FIG. 174A is a part of the latch functionality demonstrated in FIG. 175A (504) and FIG. 175B (505).

FIG. 174B is a different view of the object that is FIG. 174A.

FIG. 175A is a demonstration of how the pieces at FIG. 172A (500), FIG. 173 (502) and FIG. 174A (504, 506) work together to perform latch functionality.

FIG. 175B is a demonstration of the latch functionality described in FIG. 175A except with the latch closed.

FIGS. 176A, 177A and 178 are a latch that assembles in the manner shown in FIG. 180 and that has additional stabilizing features like "s" snaps (507) and sphere snaps (508) that anchor the latch into Invention pieces that are latched together.

FIG. 176A is a piece of the latch functionality shown in FIG. 180 (510).

FIG. 176B is a side profile view of the object that is FIG. 176A.

FIG. 177A is a profile view of the complete object that performs the latching function described in FIG. 180 (509).

FIG. 177B is a close-up view of a portion of the object that is FIG. 177A.

FIG. 178 is a latch that assembles in the manner shown in FIG. 180.

FIG. 179 is a close-up view of how FIG. 177B (511) assembles into FIG. 176A (512) before it creates the latch functionality shown in FIG. 180.

FIG. 180 is a demonstration of latch functionality.

FIG. 181A is a pole with magnetized ends (513, 514) that can also work as knobs that can be inserted into recessed holes like those on FIG. 182B to build things. This is a combination of knob and magnet interfaces. In addition, simple knobs can be inserted into FIG. 182B (515), or magnet discs can be inserted into those holes (515) to form a smooth magnetic surface. FIG. 182B can be magnetized, but does not necessarily have to be magnetized.

FIG. 181B is a different view of the same pole that is FIG. 181A.

FIG. 182A is a close-up view of FIG. 182B.

FIG. 182B is a panel of recessed magnetic holes (515) into which FIG. 181A can be inserted.

FIG. 183 is a small triangle magnet on the right side (516) that holds a larger metal triangle piece on the left side of FIG. 183. The small triangle magnet is affixed inside the female triangle shaft shown at element 517 in FIG. 184A. From that recessed position it holds the longer metal triangle, which is protruding from the larger shape that is shown in FIG. 184A.

FIG. 184A is a panel that can be assembled into smooth surfaces or into cubes and, once assembled, it can be locked in place with the larger metal triangle shaft. The larger triangle piece (518) must initially be placed fully inside another shaft of the large FIG. 184A piece (517) and then joined with an interface that has the magnet inside. Once it does so, the longer triangle piece must slide over to be held by the small triangle magnet. It will be held in the position shown in FIG. 184A and, in that position, it will lock in place other FIG. 184A pieces that are assembled at 180-degrees or at 90-degrees to the position shown in FIG. 184A. FIG. 184B is a wireframe view from the top that shows the small triangle magnet (519) just to the right of the larger triangle piece (520) in the bottom center. This is the locked position for this magnet triangle interface. If the pieces are shaken to dislodge the larger triangle piece from the magnet and slide to the left, then the FIG. 184B piece that is locked with another piece of the same geometrical shape will become unlocked.

FIG. 184B is a wireframe profile view from the top of the object that is FIG. 184A.

FIG. 185A is a basic Kawai Tsugite interface that follows the Invention's parameters in that it is on a pole (521) that, when it is affixed to another pole at 90-degree or 180-degree angles as is shown in FIG. 187A, the area of the interface is an equilateral cube.

FIG. 185B is a side view of the object that is FIG. 185A.

FIG. 185C is a side view from the top of the object that is FIG. 185A.

FIG. 185D is a side view from a front corner of the object that is FIG. 185A.

FIG. 185E is another view from the front corner, at a little different angle, of the object that is FIG. 185A.

FIG. 186A is similar to FIG. 185A except FIG. 186A is locked when a pole or sphere are inserted into the circular opening in FIG. 186A at the center of the interlocking interface (522).

FIG. 186A also has reversible "s" snap interfaces on the sides of the triangular interfaces (523) that snap into place to make them hold together with more strength. FIGS. 186D, E and F are similar to the prior FIG. 186A except there are shafts at FIG. 186D (524), 186E (525) and 186F (526) through which locking spheres can be transported. In this way, once the pieces are assembled in the manner shown in FIG. 187B, they can be locked with a sphere being inserted through the openings on each side of the construction (for example, at element 524).

FIG. 186B is a view from the end of the object at FIG. 186A.

FIG. 186C is a view from the side of the object at FIG. 186A.

FIG. 186D is a view from the front corner of the object that is FIG. 186A.

FIG. 186E is a closer view from the front corner of the object that is FIG. 186A.

FIG. 186F is a wireframe view of the object that is FIG. 186A.

FIG. 187A is an example of how two FIG. 186A shapes (527, 528) assemble into themselves at a perpendicular angle.

FIG. 187B is a wireframe view of the assembled piece that is FIG. 187A that shows the shafts (529, 530) into which, and out of which, spheres can travel to reach the mid point between the pieces where they lock when they are affixed between the two sets of "s" snaps (531).

FIG. 187C is an example of how two FIG. 186A shapes (532, 533) assemble into a horizontal piece.

FIG. 187D is a wireframe view of the assembled object that is FIG. 187C where two FIG. 186A shapes (534, 535) assemble into themselves horizontally with "s" snaps that lock the pieces in place when a sphere is inserted through one of the shafts (536, 537) and is held in place by the "s" snaps in the middle of the assembled piece (538).

FIG. 188A is similar to FIG. 186A except the interfaces (539, 540) are on a beam.

FIG. 188B is a different view from the side of the object that is FIG. 188A.

FIG. 188C is a view from the end (541) and to one side of the object that is FIG. 188A.

FIG. 188D is another view from the side of the object that is FIG. 188A.

FIG. 189A is similar to FIG. 188A except the beams (542, 543) are arranged to form a cube. Once the cubes are assembled with each other, they can be locked in place with beams, poles or spheres inserted into the open center shafts of FIG. 189A (544) because for the pieces to disassemble they must slide at angles to each other. Beams, poles and spheres inserted inside (544) will keep them from sliding.

FIG. 189B is a view from the side of the object that is FIG. 189A.

FIG. 189C is a profile view from the side of the object that is FIG. 189A.

FIG. 189D is a view from a top corner of the object that is FIG. 189A.

FIG. 189E is a view from a top corner, but at a different angle, of the object that is FIG. 189A.

FIG. 190A is a panel (545) with Kawai Tsugite interfaces (546) that follow Invention parameters.

FIG. 190B is a close-up view from the top of the object that is FIG. 190A.

FIG. 190C is a close-up view from a corner of the object that is FIG. 190A.

FIG. 190D is a close-up view from the side and top of the object that is FIG. 190A. FIG. 190E is a profile view from the bottom of a panel (547) with Kawai Tsugite interfaces (548) on the sides.

FIG. 191A is a panel (549) with reversible hinges on its edges (550) that follows the Invention's parameters. The hinges are "s" snap interfaces arranged in a circular manner. The hinges on the pieces at FIG. 191C (551) and FIG. 191D (552) have rising (553) and declining (554) undulations that hold the hinges in place more securely at 90-degree angles and at 180-degree angles. The "s" snap dimensions, and the degrees to which those dimensions are altered to achieve the functionality of this piece, are all ratios that are divisible by 2.

FIG. 191B is a close-up view of the panel that is FIG. 191A.

FIG. 191C is a top corner view of a panel that is similar to FIG. 191A except it has wavy circular "s" snaps (551) and recessed areas for spheres to affix themselves in the hollow cylindrical areas on its sides (555).

FIG. 191D is a close-up view of the wavy (or undulating) "s" snaps (553, 554) on FIG. 191C.

FIG. 192A is a sphere snap (556) pole (557) that strengthens the panels in the manner shown in FIG. 192B when they are affixed together (558).

FIG. 192B is a demonstration of how FIG. 192A (559) fits into (558) FIG. 191C (560).

FIG. 193A is a demonstration of how the hinges affixed to FIG. 194A (561, 562) fit together to hold two panels together by being able to insert into the sides of two panels (563, 564) and allow them to rotate with the hinge interface.

FIG. 193B is a view of the back side of FIG. 193A.

FIG. 193C is a side view of FIG. 193A.

FIG. 194A is an individual piece that fits into itself in the manner shown in FIG. 193A.

FIG. 194B is a different view of FIG. 194A.

FIG. 194C is another view of FIG. 194A.

FIG. 194D is a profile view from the side of FIG. 194A.

FIG. 195 is a demonstration of how the pole that is FIG. 192A (565) fits into FIG. 194C (566).

FIG. 196 is a triangular configuration with hinges on the blocks on its edges (567) that allows the pieces to form larger circles, and that allows for panels that rotate a series of different ways. The holes in the piece (568, 569) or the holes formed by the pieces (570, 571, 572) are all larger or smaller than each other in ratios that are divisible by two.

The default assembly of interfaces at the bottom of FIG. 197 (573) is to allow the hook at the top (574) to be inserted into the bottom (573) and rotate like a hinge. The other openings (575, 576, 577) can be converted into hinge openings also to allow the piece to rotate in a full circle relative to itself when it is inserted into the five holes in the bottom cylinder section of the piece (573, 575, front and back of the piece at 576, and 577).

FIG. 198A is a panel that uses "s" snap shapes (578) that are stretched to form a shingle that allows water to flow across it and onto another FIG. 198A panel.

FIG. 198B is a view from the top corner of FIG. 198A.

FIG. 198C is a view from the top side of FIG. 198A.

FIG. 198D is another view from the top side of FIG. 198A.

FIG. 199A is like FIG. 198A except it has a hook (579) that can fit into itself in the manner shown in FIGS. 199E and 202A and be secured in place with a knob of a roof or other structure it is affixed to.

FIG. 199B is a view from a top corner of FIG. 199A that more clearly shows the hook (580) and the receding area it fits into (581).

FIG. 199C is another view from a top corner of FIG. 199A.

FIG. 199D is a near-profile view from the top of FIG. 199A.

FIG. 199E is a demonstration of how the parts of FIG. 199A are reversible in that they fit into themselves. The protruding hook (582) fits into the receding area at element 583 and the bottom left of the piece (584) covers the top right (585).

FIG. 200 is an incline adjuster that can hold up Invention shingles.

FIG. 201 is a demonstration of how FIG. 200 (586) can hold up Invention shingles (587).

FIG. 202A is a demonstration of how the inclined pieces fit together, like FIG. 202C, which is a profile view from the side of how the inclined shapes fit together.

FIG. 202B is a profile view from the bottom of some of the shingles (588, 589) that are assembled in FIG. 202A.

FIG. 202C is a profile view from the side of the shingles (590, 591) assembled in the manner shown in FIG. 202A. The incline adjuster object that is FIG. 200 is at element 592.

FIG. 202D is a profile view from the bottom of the shingles (593, 594) assembled in FIG. 202A.

FIG. 202E is a side view from the bottom of the shingles (595, 596) assembled in FIG. 202A.

FIG. 202F is a close-up view of the assembled pieces in FIG. 202A (597) with the support of the piece in FIG. 200 (598).

FIG. 203A is a more compact version of FIG. 198A that also holds itself up at an incline.

FIG. 203B is aside view of FIG. 203A that shows the support that holds it up at an incline (599).

FIG. 203C is a view from the bottom side of FIG. 203A.

FIG. 203D is a view from the bottom side, but from a different angle, of FIG. 203A.

FIG. 203E is a view from the top and side of FIG. 203A.

FIG. 203F is a view from the end sloping down (600) of the shingle that is FIG. 203A.

FIG. 203G is a profile view from the bottom of FIG. 203A.

FIG. 204A is a solid incline adjuster that is like FIG. 200.

FIG. 204B is a view of the top of FIG. 204A

FIG. 205A is an incline adjuster that can hold multiple knob interfaces (601, 602).

FIG. 205B is a view from the top side of FIG. 205A.

FIG. 205C is a view from the bottom side of FIG. 205A.

FIG. 206A is an even more compact version of FIG. 198A.

FIG. 206B is a view from the bottom side of FIG. 206A.

FIG. 206C is a profile view from the side of FIG. 206A.

FIG. 206D is a view from the bottom side, but from a different angle, of FIG. 206A.

FIG. 207A is similar to FIG. 206A except it has slanted areas (603, 604) and protruding (605) and receding (606) areas on its ends to help water to flow over it without seeping in or leaking through the assembled pieces.

FIG. 207B is a view of the bottom of FIG. 207A.

FIG. 207C is a view of the top of FIG. 207A.

FIG. 207D is another view of the bottom, but from a slightly different angle, of FIG. 207A.

The invention claimed is:

1. A connector configured to be used with building blocks, said connector comprising:

a body having a cylindrical shape defining an outer surface, a first end, a second end, a diameter and a height, said height and said diameter having the same dimension;

an opening in said first end extending into said body;

a knob having a first portion and a second portion, said portions being diametrically opposed about said opening and extending in a direction substantially perpendicular from said first end;

said outer surface having a concave annular indentation proximate a convex annular protrusion, said annular protrusion being between said annular indentation and said second end of said body; and an object selected from the group consisting of a sphere, pole and nail configured to be received between said first portion and said second portion.

2. A panel configured to be formed from a plurality of building blocks, said panel comprising:

each said plurality of building blocks having a substantially cuboidal shape defining six faces, each of said six faces having a substantially square-shaped opening with a perimeter, said perimeter having a concave indentation proximate a convex protrusion, at least one of said openings having an insert with a base that substantially conforms to said one of said openings and having a complementary concave indentation proximate a concave protrusion with respect to said substantially square-shaped opening, said insert furthering having a substantially cylindrical protrusion extending from said base with an opening extending therethrough;

said plurality of building blocks being assembled to form a body of said panel;

said panel further having a perimeter portion tapering in a direction away from said body, an upper surface of said perimeter portion having a concave indentation proximate a convex protrusion.

\* \* \* \* \*